(12) United States Patent
Matsuoka et al.

(10) Patent No.: US 8,711,297 B2
(45) Date of Patent: Apr. 29, 2014

(54) DISPLAY DEVICE AND METHOD OF REPAIRING DISPLAY DEVICE

(75) Inventors: Kohji Matsuoka, Kanagawa (JP);
Takumi Yamaga, Kanagawa (JP);
Akishige Murakami, Kanagawa (JP);
Naoyuki Ueda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 236 days.

(21) Appl. No.: 13/144,789

(22) PCT Filed: Feb. 18, 2010

(86) PCT No.: PCT/JP2010/052912
§ 371 (c)(1),
(2), (4) Date: Jul. 15, 2011

(87) PCT Pub. No.: WO2010/098368
PCT Pub. Date: Sep. 2, 2010

(65) Prior Publication Data
US 2011/0275270 A1    Nov. 10, 2011

(30) Foreign Application Priority Data

Feb. 26, 2009    (JP) .................................. 2009-044706

(51) Int. Cl.
*G02F 1/136259*    (2006.01)
(52) U.S. Cl.
USPC .......................................... 349/54; 349/192
(58) Field of Classification Search
USPC ............................................ 349/192, 54–55
See application file for complete search history.

(56) References Cited

U.S. PATENT DOCUMENTS

| 5,600,460 | A | 2/1997 | Yamamoto et al. |
| 6,961,111 | B1 * | 11/2005 | Kuramasu ...................... 349/152 |
| 2001/0006722 | A1 | 7/2001 | Sakai et al. |
| 2005/0195338 | A1 * | 9/2005 | Matsumoto et al. ............ 349/40 |
| 2006/0012729 | A1 | 1/2006 | Tanaka et al. |

FOREIGN PATENT DOCUMENTS

| JP | 05 066416 | 3/1993 |
| JP | 05 127191 | 5/1993 |
| JP | 08 050268 | 2/1996 |
| JP | 08 082808 | 3/1996 |
| JP | 09 101539 | 4/1997 |
| JP | 09101539 A * | 4/1997 |
| JP | 2004 198718 | 7/2004 |

(Continued)

OTHER PUBLICATIONS

International Search Report issued Apr. 6, 2010 in PCT/JP10/052912 filed Feb. 18, 2010.

(Continued)

*Primary Examiner* — Bumsuk Won
*Assistant Examiner* — Jia Pan
(74) *Attorney, Agent, or Firm* — Oblon, Spivak, McClelland, Maier & Neustadt, L.L.P.

(57) ABSTRACT

A display device includes a substrate; a matrix of scan lines and signal lines formed on the substrate; switching elements formed in pixel areas defined by the scan lines and the signal lines crossing each other; a first insulating film formed over the scan lines, the signal lines, and the switching elements; and display elements to be driven by the switching elements. The pixel areas are located in a display area and the first insulating film has openings above the scan lines or the signal lines in an outer area outside of the display area.

2 Claims, 65 Drawing Sheets

(56) References Cited

FOREIGN PATENT DOCUMENTS

| | | |
|---|---|---|
| JP | 2005 249993 | 9/2005 |
| JP | 2006 030627 | 2/2006 |
| JP | 2006 053451 | 2/2006 |
| JP | 2006 100398 | 4/2006 |
| JP | 2007 019105 | 1/2007 |
| JP | 2007 123534 | 5/2007 |
| JP | 2007 165647 | 6/2007 |
| JP | 2007 281998 | 10/2007 |

OTHER PUBLICATIONS

Extended Search Report issued Jan. 17, 2012 in Europe Application No. 10746247.5.

* cited by examiner

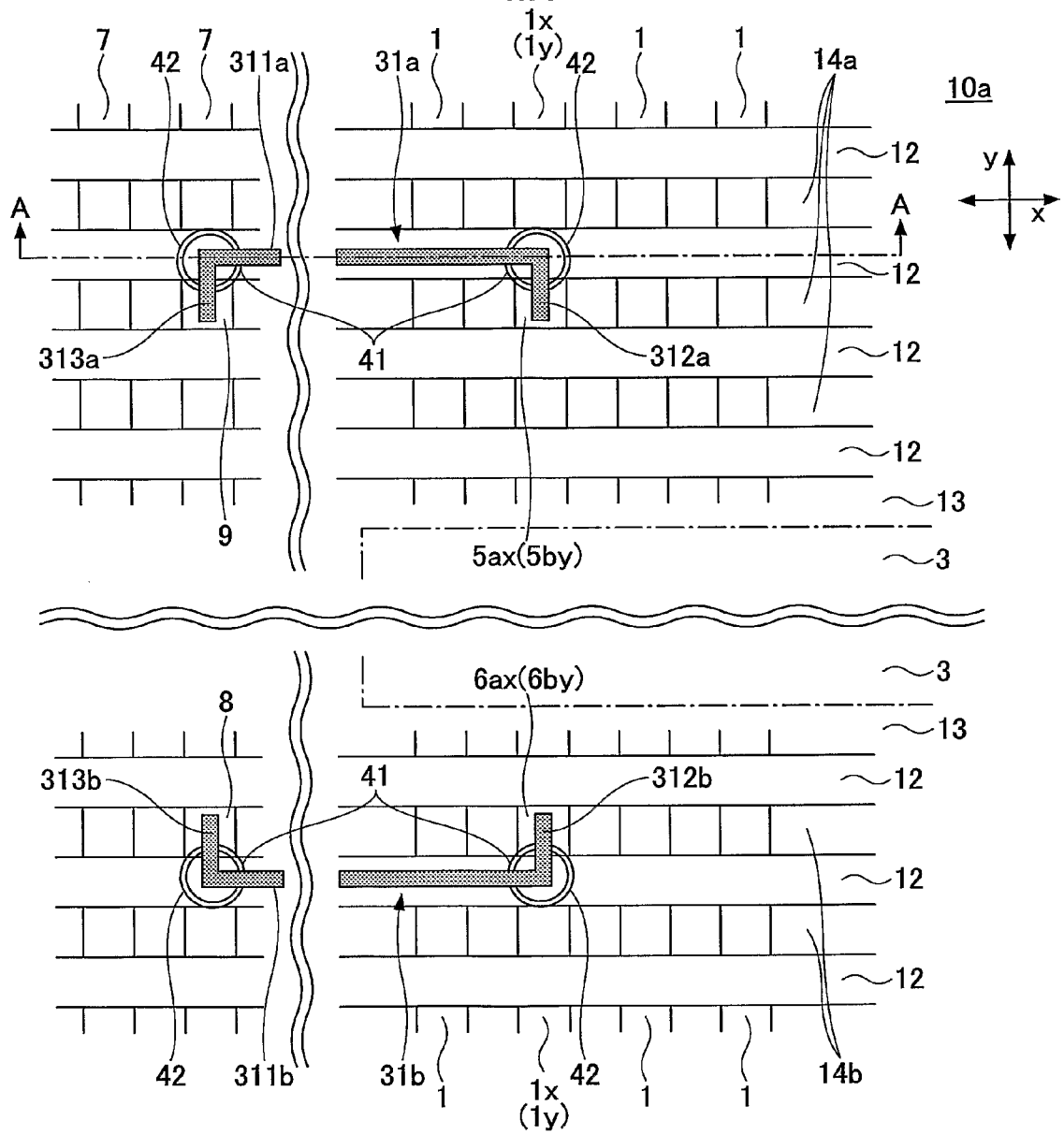
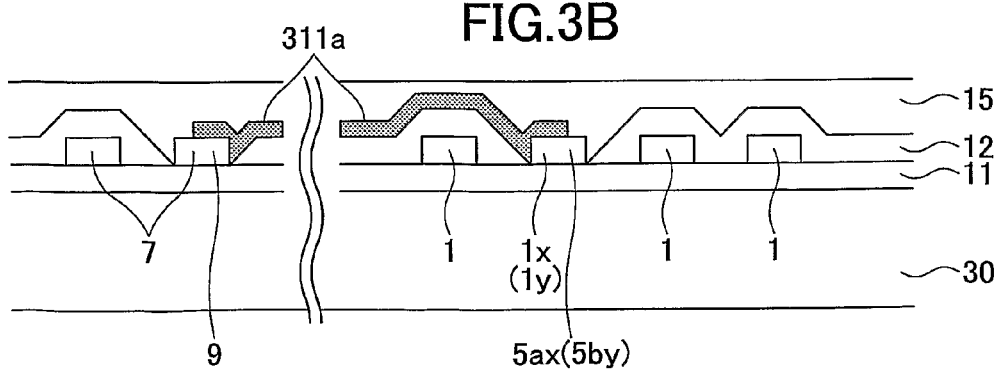

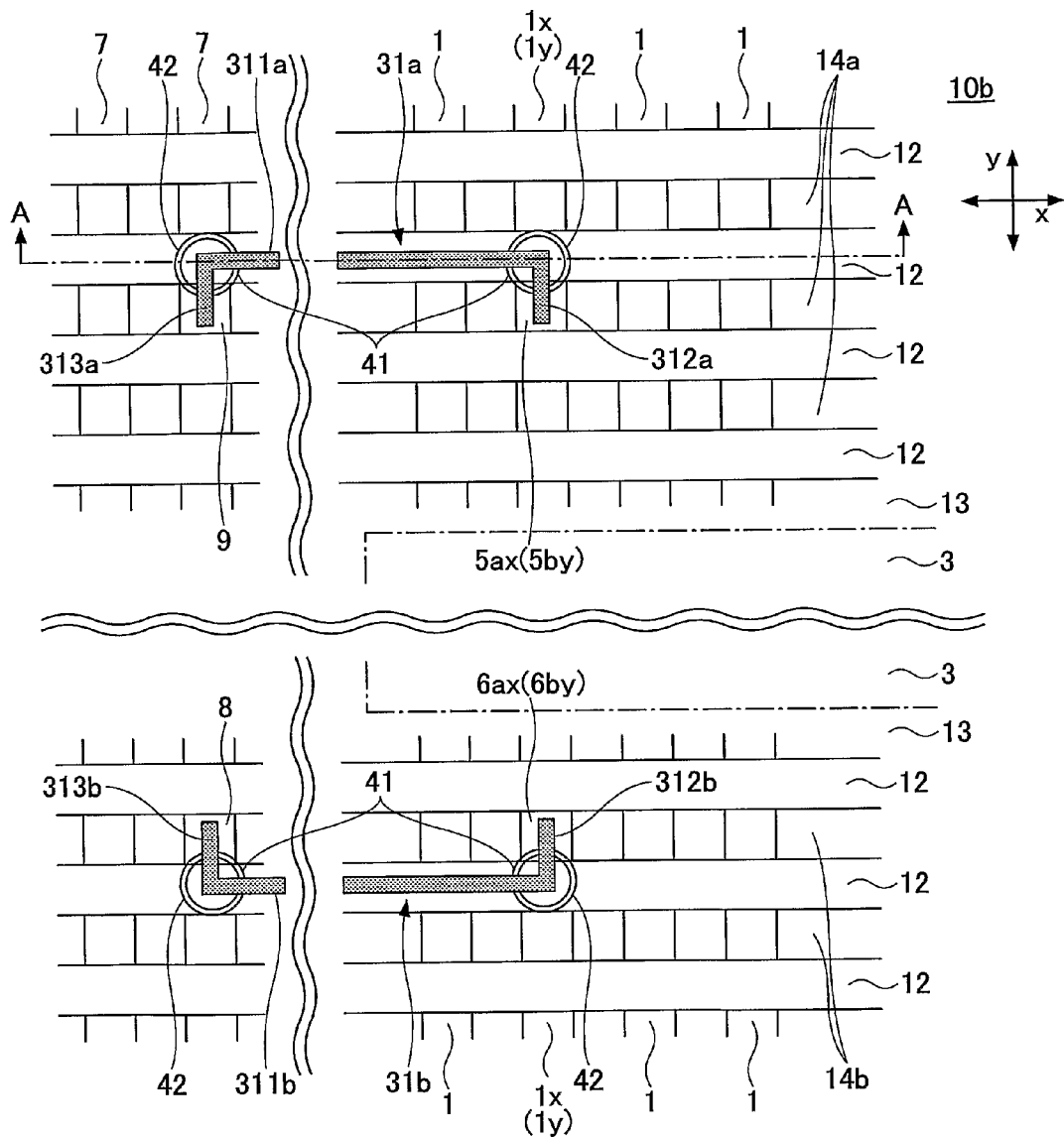
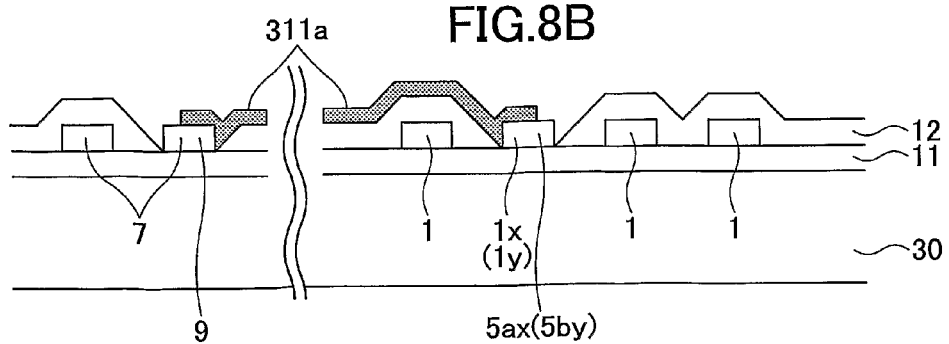

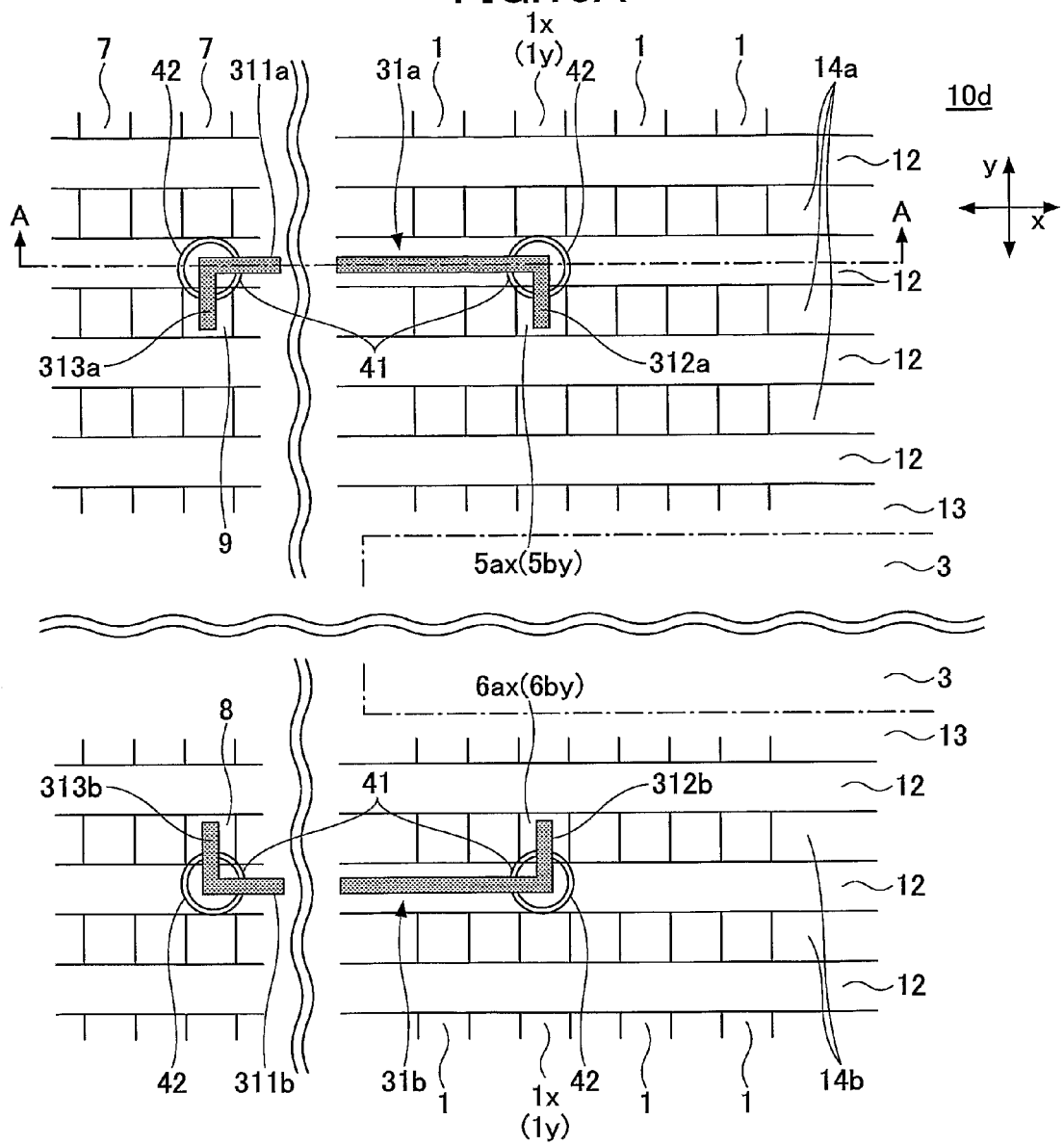
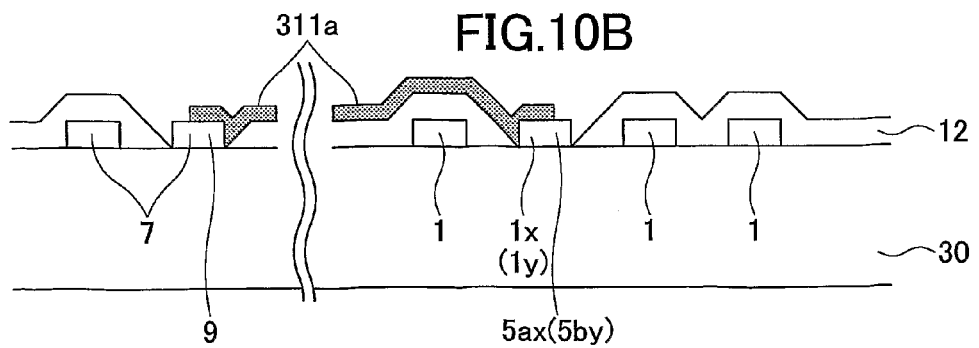

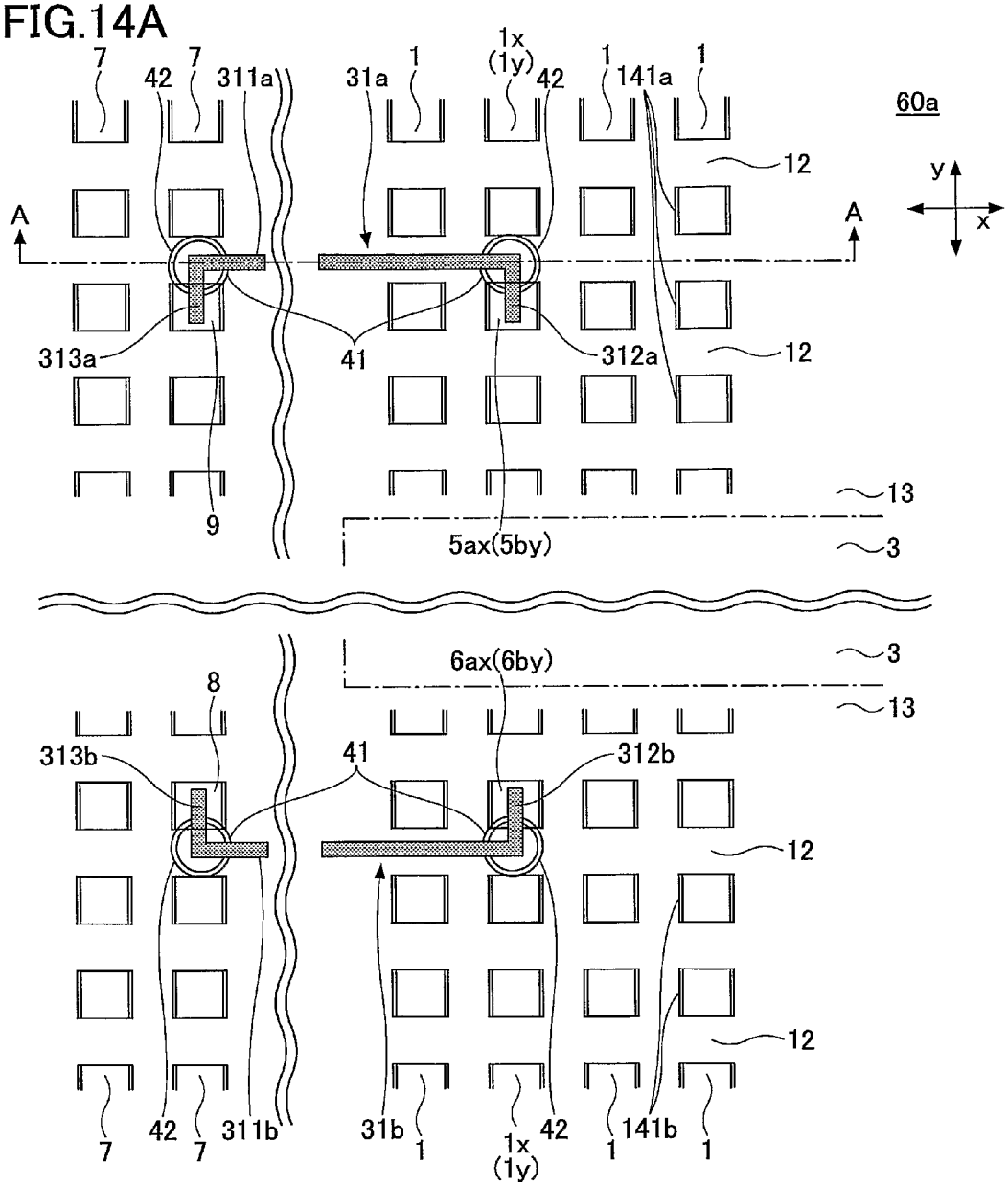
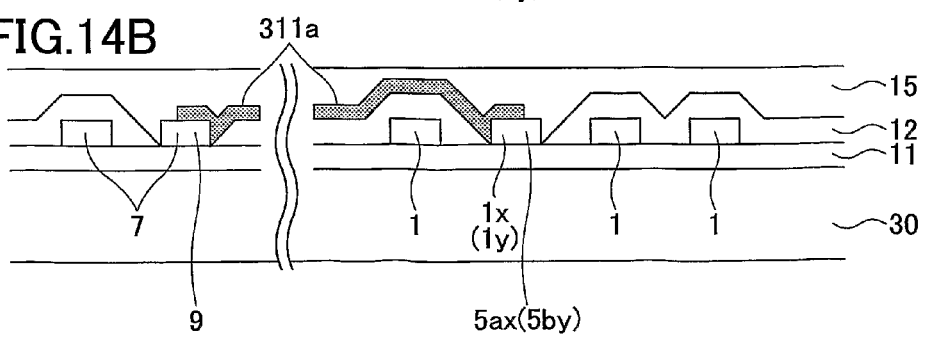

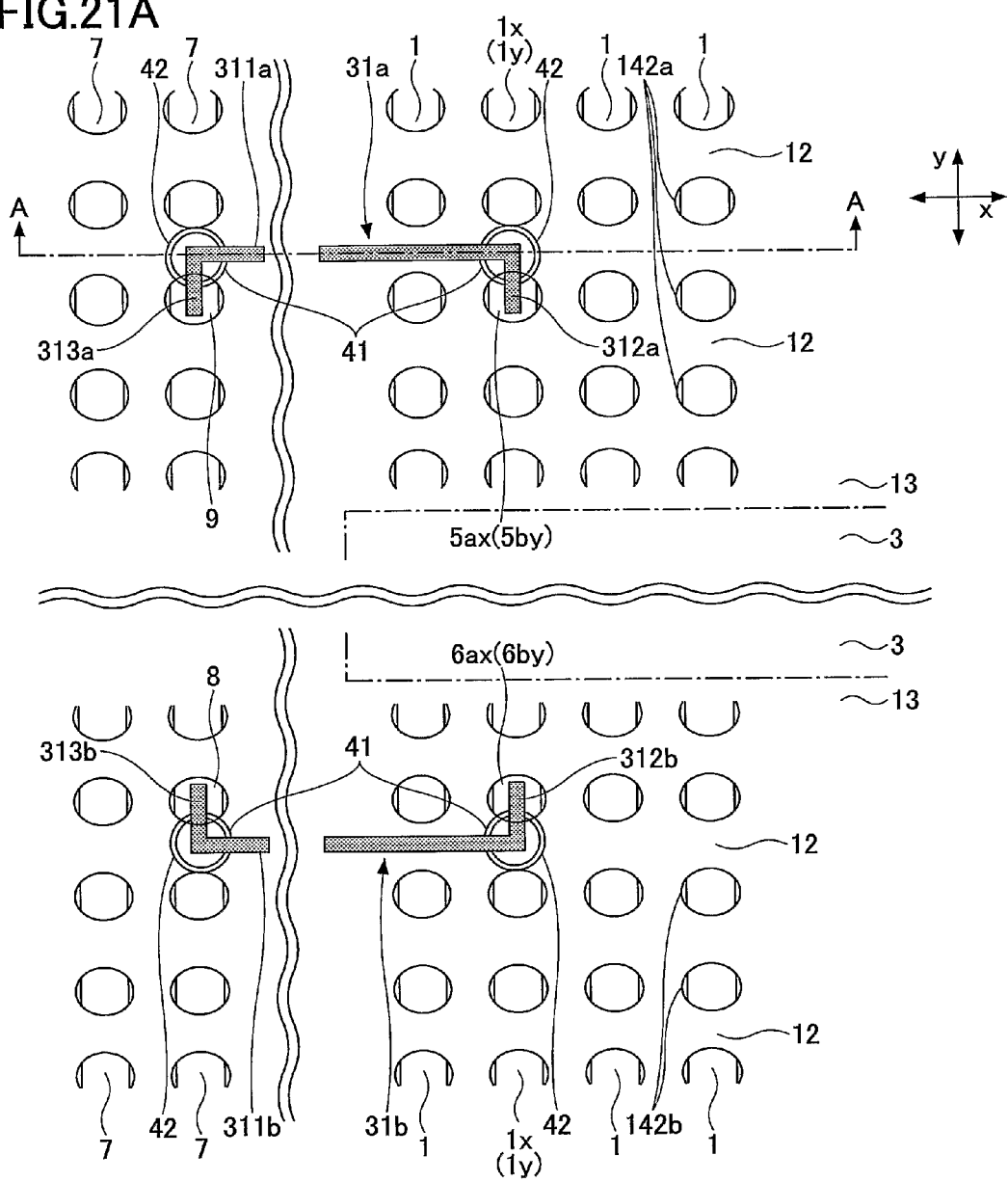
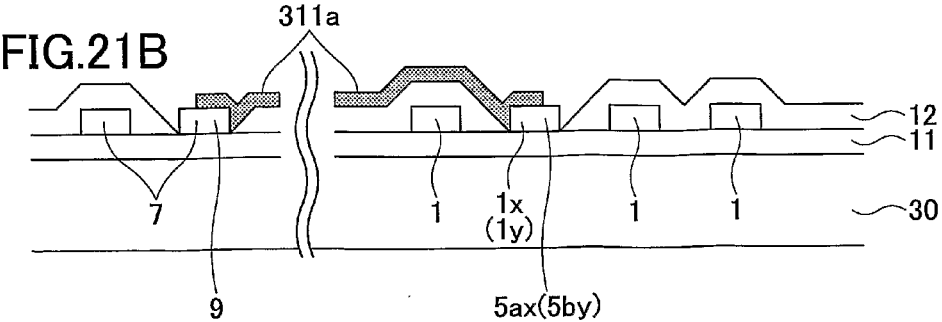

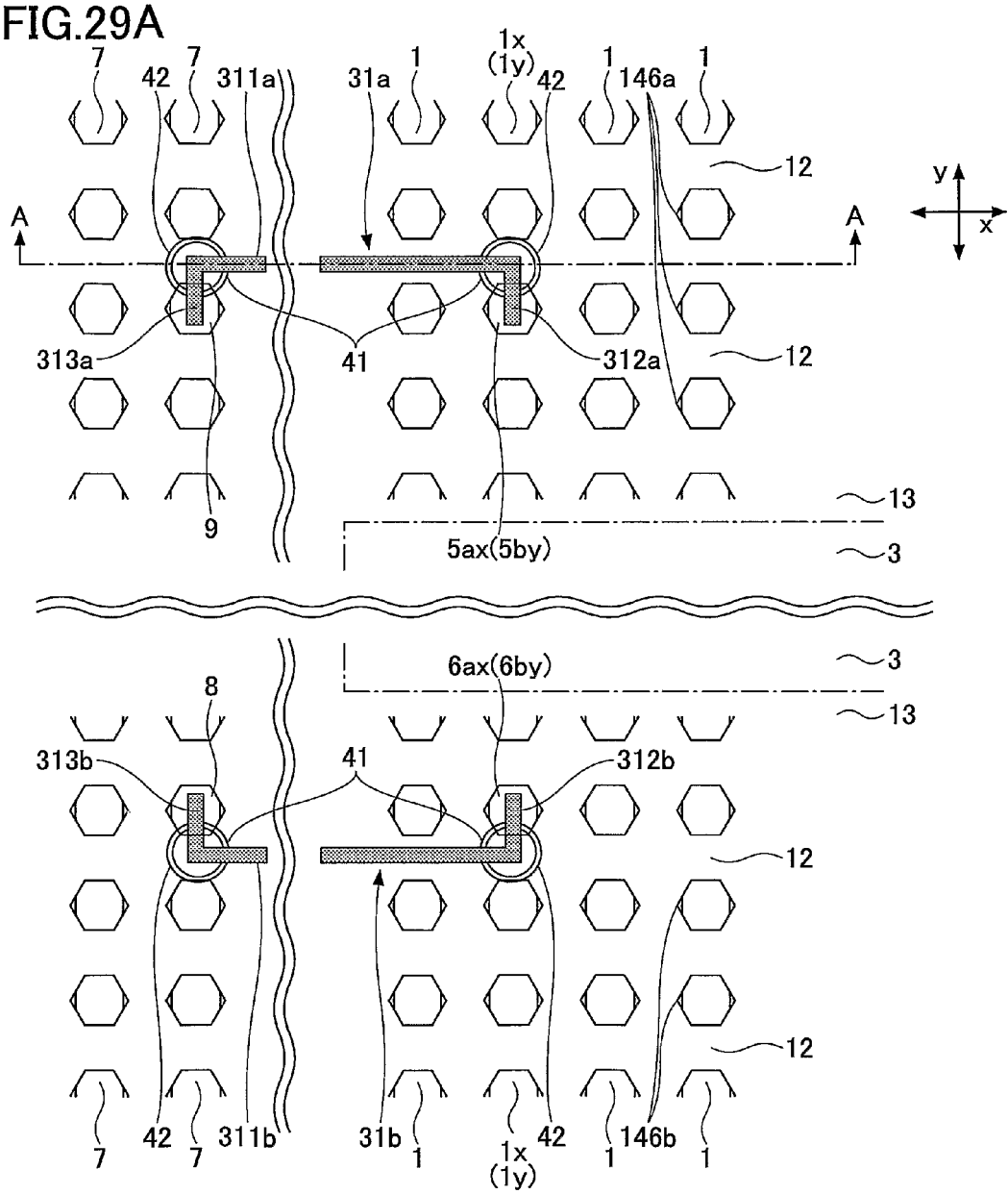
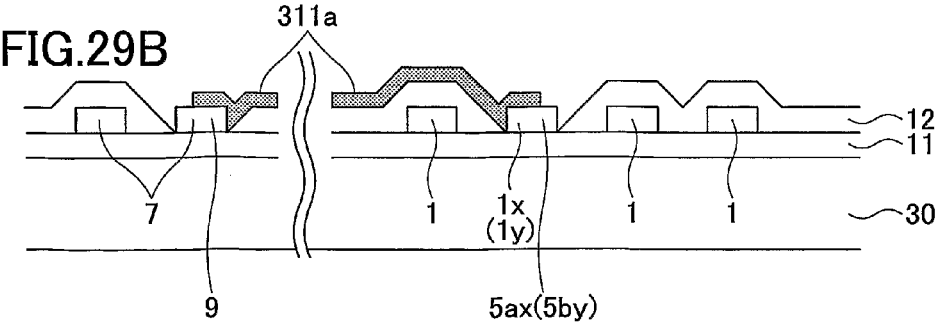

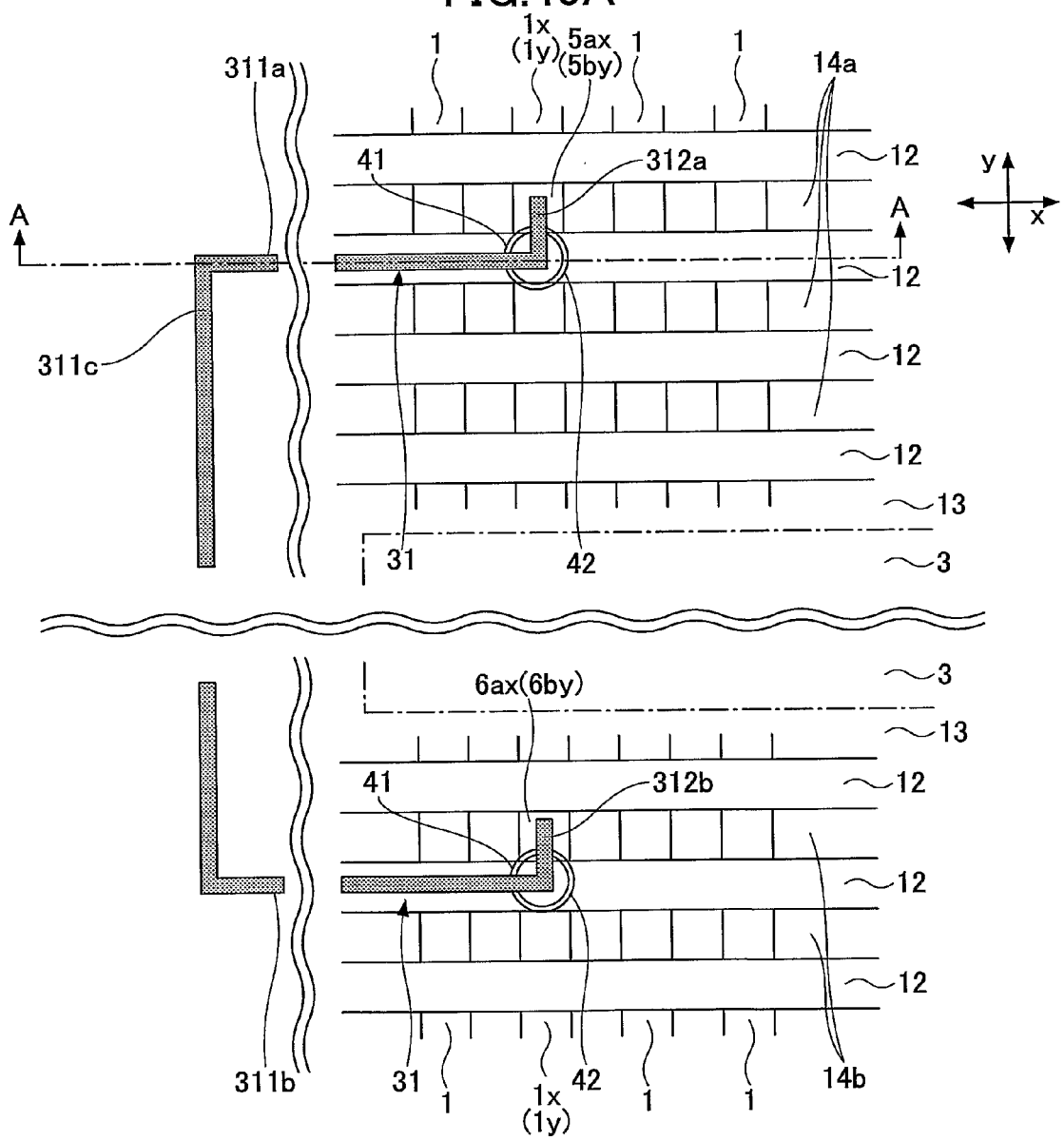
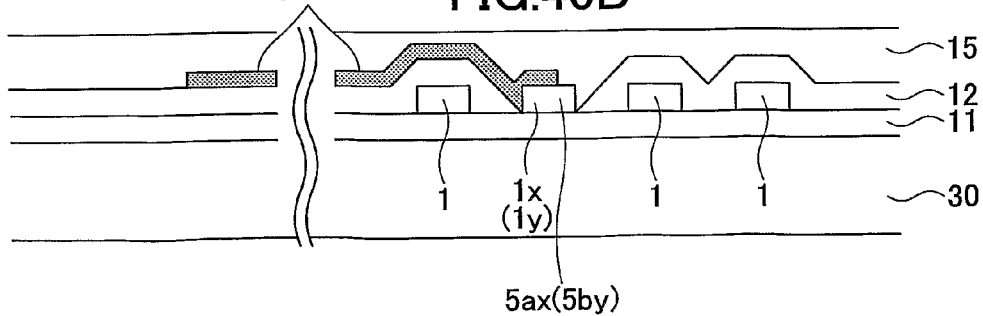

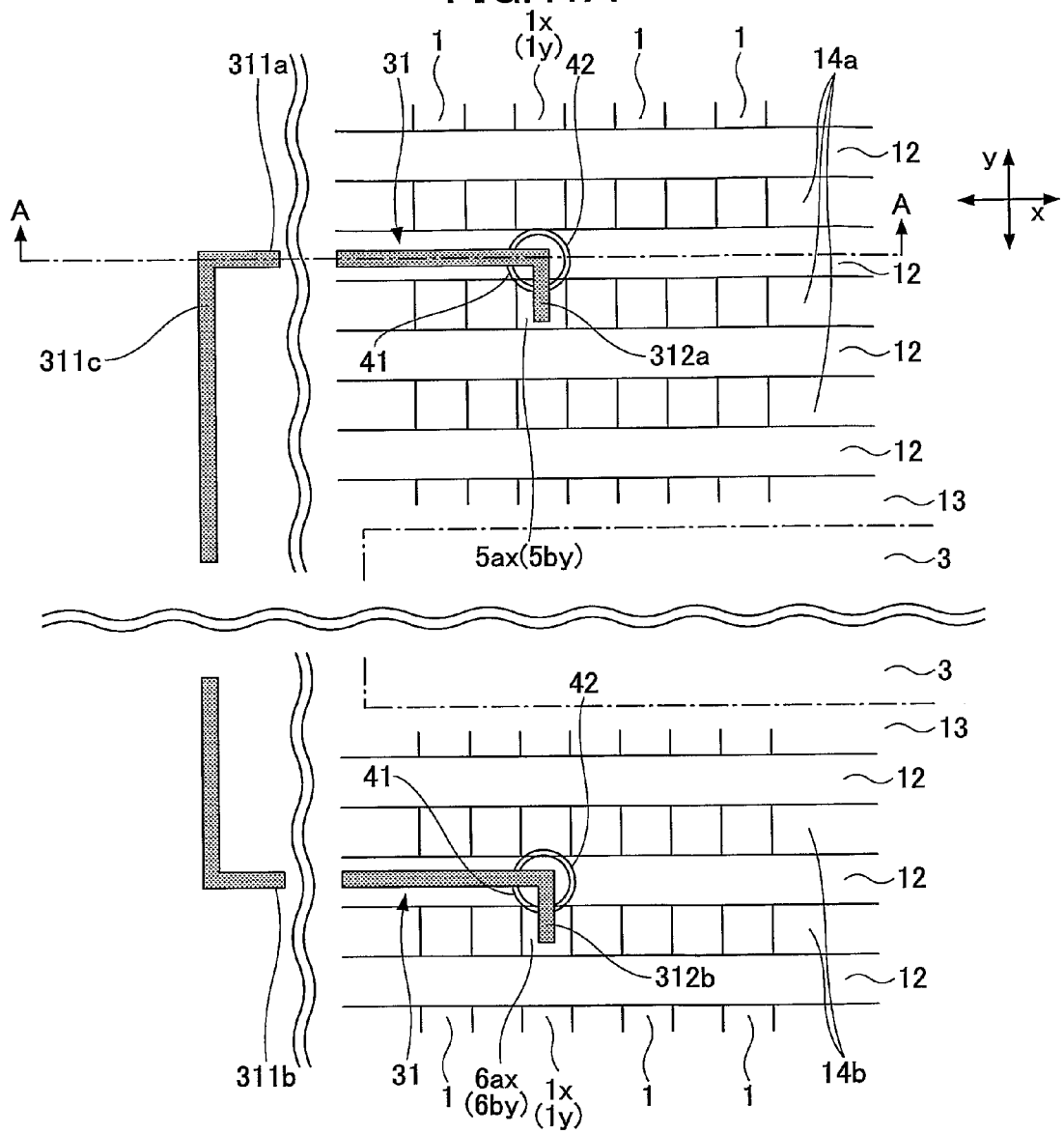
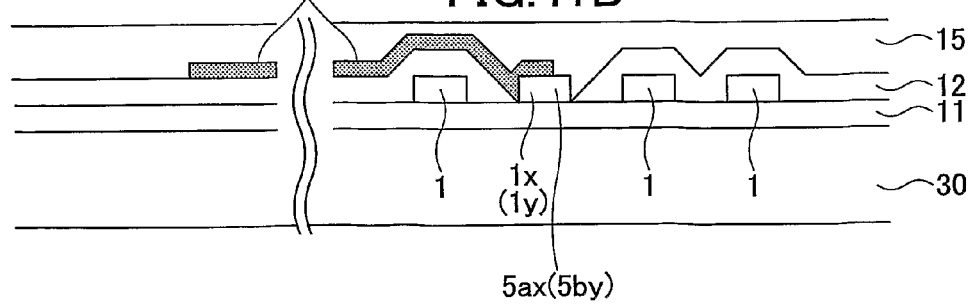

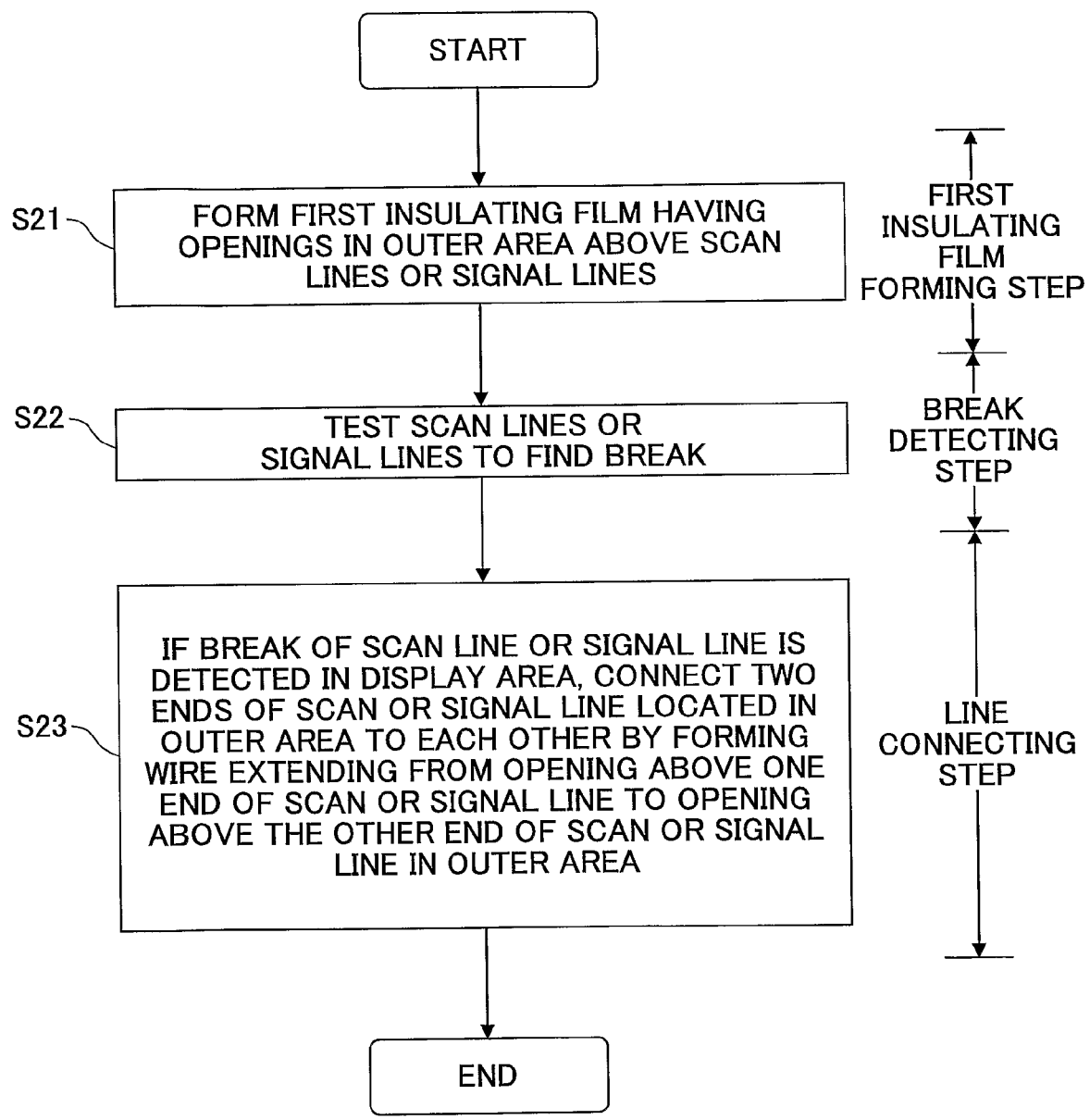

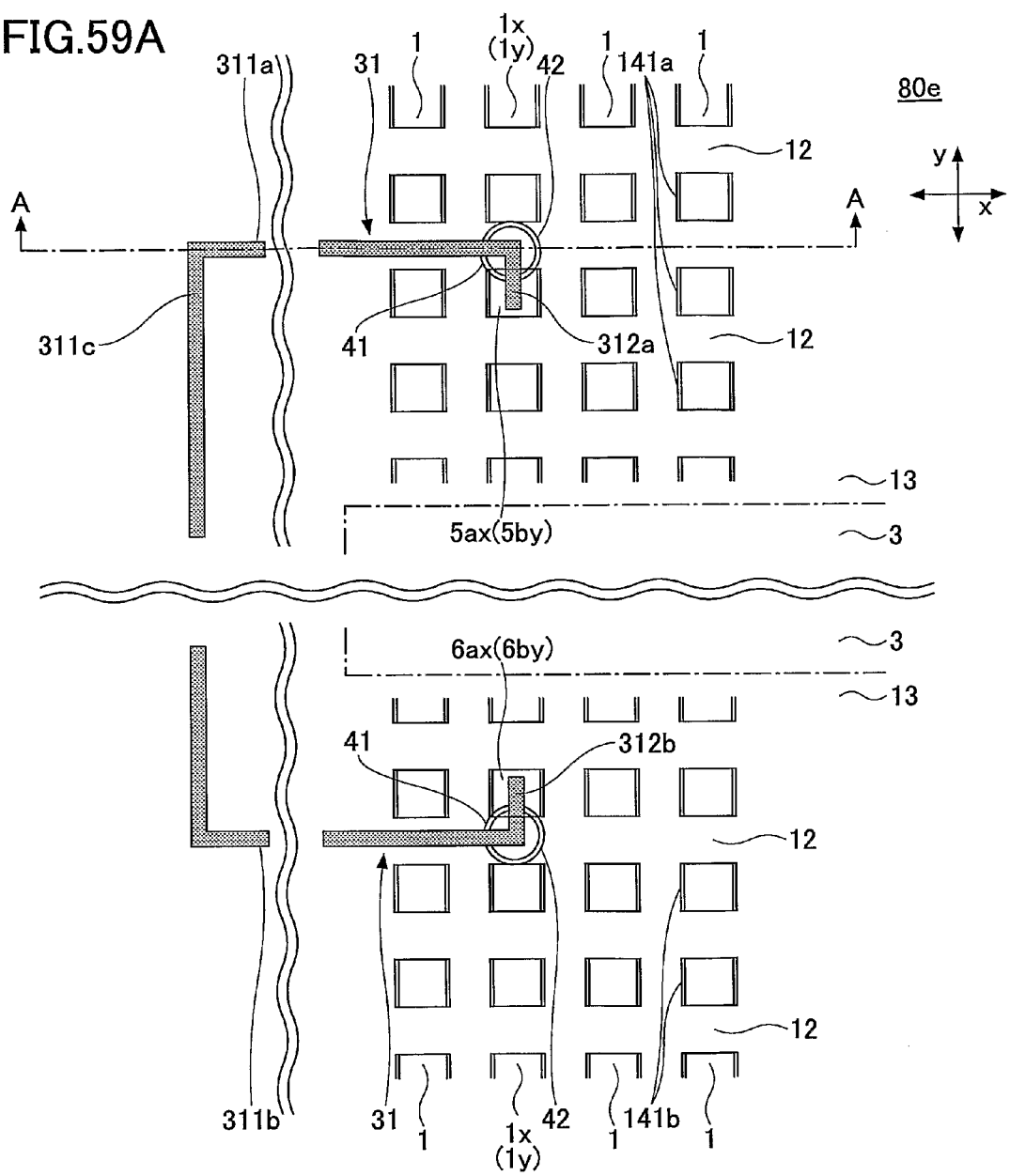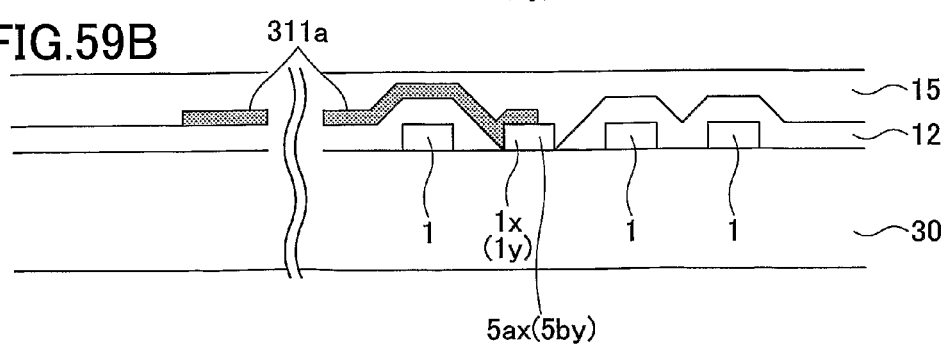

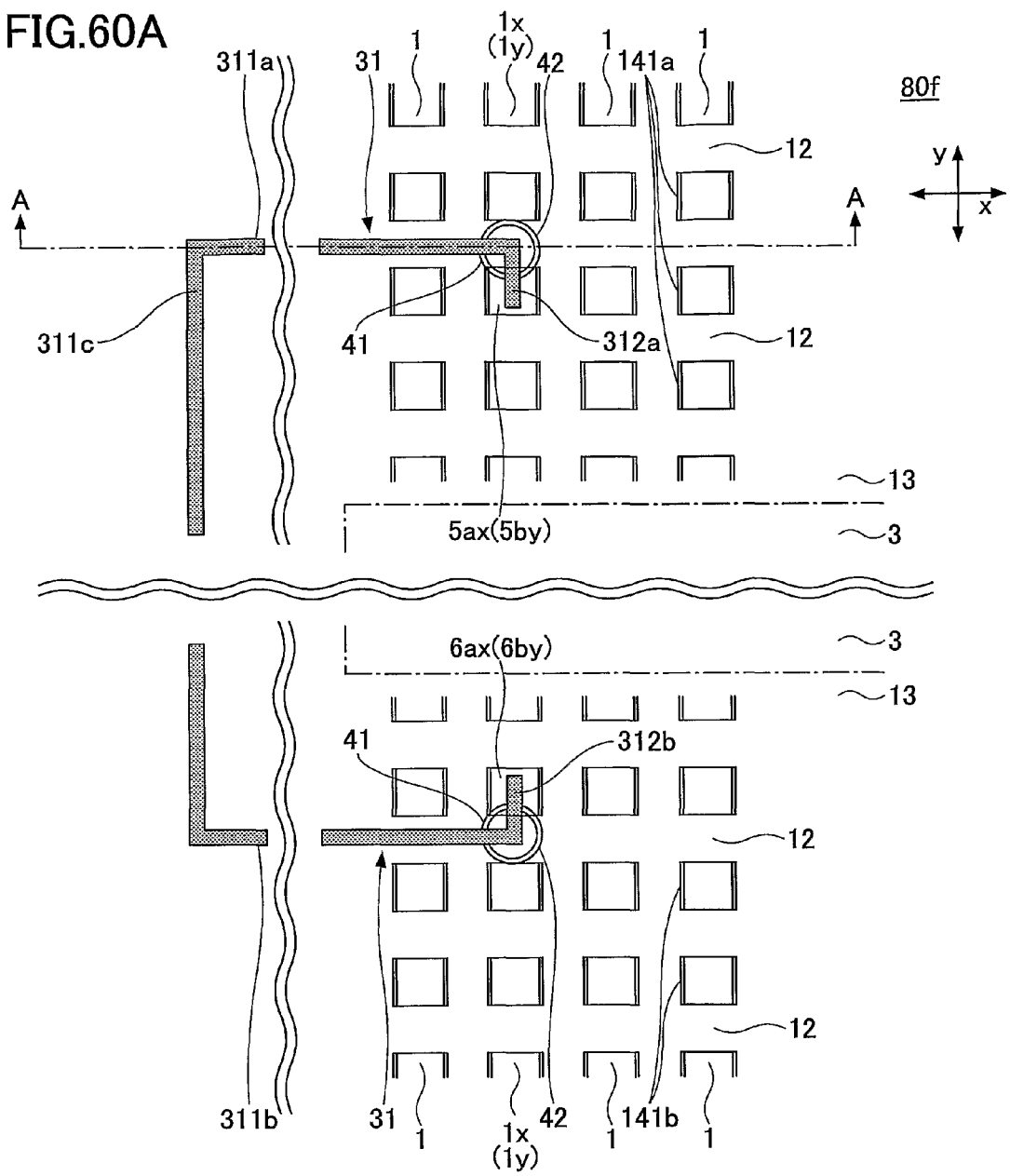
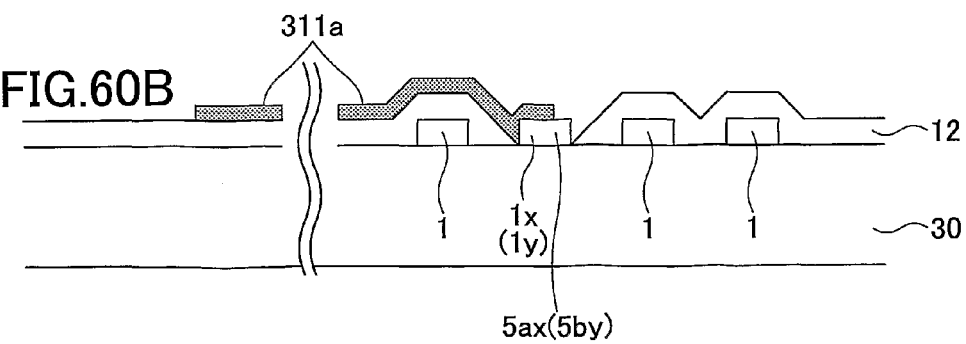

DISPLAY DEVICE AND METHOD OF REPAIRING DISPLAY DEVICE

TECHNICAL FIELD

A certain aspect of the present invention relates to a display device and a method of repairing the display device.

BACKGROUND ART

In these years, there is a growing demand for display devices used, for example, for a flat-screen television, a personal computer, and a mobile terminal. Such display devices are generally implemented as flat displays shaped like flat plates. Examples of flat displays include a plasma display panel (PDP) employing plasma display elements as display media, a liquid crystal display (LCD) employing liquid crystal display elements as display media, and an organic electroluminescent (EL) display employing organic EL display elements as display media. Also, display devices employing other types of display elements as display media are being developed.

As a backboard of a flat display, an array substrate is widely used. An array substrate includes an array of drive elements (switching elements) for independently driving display elements in respective pixel areas.

For the drive elements (switching elements), thin-film transistors (TFT) are popularly used.

Meanwhile, a multilayer process based on photolithography is widely used to manufacture an array substrate including an array of drive elements (switching elements) such as TFTs.

In photolithography, a conducting layer (film) as a material of scan lines (gate lines) is formed, for example, by vapor deposition, a positive resist is applied onto the conducting layer, and portions of the positive resist other than the portions corresponding to the scan lines are exposed by an exposure method such as stepper exposure, proximity exposure, or contact exposure. With the contact exposure, the production yield may be reduced because a photo mask is placed in contact with a resist. Therefore, in these days, the stepper exposure is preferred over the contact exposure. As still another example, scan exposure employing the principle of stepper exposure is also used to meet the recent increase in the size of display panels. After the exposure, developer (developing agent) is supplied to the surface of the array substrate to remove only the exposed portions of the positive resist. Next, portions of the conducting layer where the positive resist is not present are removed by etching such as wet etching or dry etching. Then, the remaining positive resist and other foreign substances are removed using a remover to form the scan lines. After forming the scan lines, a scan line insulating film, a silicon film made of, for example, amorphous silicon and used as a semiconductor layer, and a silicon nitride film are formed by repeating steps including film deposition such as chemical vapor deposition (CVD), positive resist application, exposure, development, etching, and removal in a manner similar to the above scan line forming process. Then, signal lines (source lines) are formed by performing steps including film deposition, positive resist application, exposure, development, etching, and removal in a manner similar to the scan line forming process. Normally, data lines (drain electrodes) are also formed at the same time as forming the signal lines.

The above multilayer process applies to inorganic thin-film transistors that use a silicon film as a semiconductor layer of drive elements (switching elements). When manufacturing organic thin-film transistors that use an organic semiconductor film instead of a silicon film as a semiconductor layer, no silicon film (e.g., amorphous silicon film) is formed during the film deposition step (e.g., CVD). In this case, only a scan line insulating film is formed during the film deposition step such as CVD, and an organic semiconductor film is formed between signal lines and drain electrodes (i.e., in channel regions) above the scan lines by, for example, printing or photolithography.

Then, pixel electrodes used to drive display elements by the drive elements (switching elements) and drain wires for connecting the pixel electrodes and the drain electrodes are formed. In a case where liquid crystal display elements are employed; pixel electrodes and drain wires may be formed at the same time. Generally, the same highly-conductive material is used for the source electrodes and the drain electrodes of transistors. For the pixel electrodes that have to be optically transparent, a transparent electrode material is used. Since transparent electrode materials are normally not highly conductive, a material other than the transparent electrode material used for the pixel electrodes is used for the drain electrodes of transistors. Meanwhile, in the case of a reflective display device such as a reflective LCD, signal lines, drain electrodes, and pixel electrodes can be formed at the same time using the same highly-conductive material. However, in the case of a transmissive display device requiring a high numerical aperture, a transparent electrode material different from the material of drain electrodes is used for pixel electrodes. Therefore, in a manufacturing process of an array substrate of a transmissive display device, a nonconductive film (insulating film) with high transparency is formed between drain electrodes and pixel electrodes, and holes (openings) are formed in the nonconductive film (insulating film) to accommodate drain wires for connecting the pixel electrodes and the drain electrodes. A similar manufacturing process is used to manufacture an array substrate used as a backboard of an organic EL display device. Also, there are display devices using polysilicon for the semiconductor layer of switching elements (transistors).

In manufacturing large-area, high-density display devices by a multilayer process as described above, defects such as broken lines (wires) and leakage between lines (wires) may be generated and as a result, the production yield may be reduced. Various methods have been proposed to repair (or fix) such a defect in a substrate instead of discarding the substrate and thereby to improve the production yield. For example, patent document 1 discloses a technology for repairing a broken line by fusing broken ends with a laser beam. Also, there is a known method where a liquid is discharged (e.g., using a micro dispenser or an inkjet device) to draw a line and thereby to repair a broken line.

Further, patent document 2 discloses a method used when a broken line cannot be sufficiently repaired in an active area. In the disclosed method, backup lines are formed outside of the active area to transmit a signal from an input end to a non-input end.

However, related-art methods of repairing a broken line in a display device have problems as described below.

With a method employing laser CVD, the equipment for laser CVD is very expensive.

With the method where a line is drawn by discharging a liquid using a micro dispenser or an inkjet device, a broken line often cannot be repaired or it is difficult to detect a failure in repairing the broken line on the spot.

In the method disclosed in patent document 2, backup lines intersecting signal lines or scan lines are formed in advance. When a break is found in a signal or scan line, the backup lines and the signal or scan line are connected by fusing at the intersections to repair the break. With this method, leakage occurs at the intersections (or crossing points) that are not used for repairing broken lines and as a result, cross capacitance increases. As the resolution of a display device increases, the number of necessary backup lines increases. This in turn increases the number of leakage points and results in further increase in the cross capacitance.

[Patent document 1] Japanese Patent Application Publication No. 2004-198718

[Patent document 2] Japanese Patent Application Publication No. 5-127191

SUMMARY OF THE INVENTION

An aspect of the present invention provides a display device including a substrate; a matrix of scan lines and signal lines formed on the substrate; switching elements formed in pixel areas defined by the scan lines and the signal lines crossing each other; a first insulating film formed over the scan lines, the signal lines, and the switching elements; and display elements to be driven by the switching elements. The pixel areas are located in a display area and the first insulating film has openings above the scan lines or the signal lines in an outer area outside of the display area.

Another aspect of the present invention provides a method of repairing a display device. The display device includes a substrate; a matrix of scan lines and signal lines formed on the substrate; switching elements formed in pixel areas defined by the scan lines and the signal lines crossing each other, the pixel areas being located in a display area; a first insulating film formed over the scan lines, the signal lines, and the switching elements; and display elements to be driven by the switching elements. The method includes a first insulating film forming step of forming the first insulating film having openings above the scan lines or the signal lines in an outer area outside of the display area; a break detecting step of testing the scan lines or the signal lines to find a break; and a line connecting step of, if the break is found in one of the scan lines or the signal lines in the display area, connecting two ends of the one of the scan lines or the signal lines in the outer area to each other by forming a wire in the outer area through the openings above the two ends of the one of the scan lines or the signal lines.

BRIEF DESCRIPTION OF DRAWINGS

FIGS. 3A and 3B are enlarged views of repaired portions of an array substrate of a display device repaired by the repairing method of the first embodiment;

FIGS. 8A and 8B are drawings illustrating an array substrate of the first embodiment where a second insulating film is omitted;

FIGS. 10A and 10B are drawings illustrating an array substrate of the first embodiment where a nonconductive film and a second insulating film are omitted;

FIGS. 14A and 14B are enlarged views of repaired portions of an array substrate of a display device repaired by a repairing method according to the variation of the first embodiment;

FIGS. 21A and 21B are enlarged views of repaired portions in FIG. 20;

FIGS. 29A and 29B are enlarged views of repaired portions in FIG. 28;

FIGS. 40A and 40B are drawings (1) illustrating shape variations of a wire formed on an array substrate of the second embodiment;

FIGS. 41A and 41B are drawings (2) illustrating shape variations of a wire formed on an array substrate of the second embodiment;

FIG. 50 is a flowchart showing a process of repairing a display device of the second embodiment;

FIGS. 59A and 59B are drawings illustrating an array substrate according to the variation of the second embodiment where a nonconductive film is omitted;

FIGS. 60A and 60B are drawings illustrating an array substrate according to the variation of the second embodiment where a nonconductive film and a second insulating film are omitted;

DESCRIPTION OF EMBODIMENTS

Preferred embodiments of the present invention are described below with reference to the accompanying drawings.

First Embodiment

A display device and a method of repairing the display device according to a first embodiment of the present invention are described below with reference to FIGS. 1 through 12.

First, a display device of the first embodiment is described with reference to FIGS. 1A through 1C.

Figure 1A:
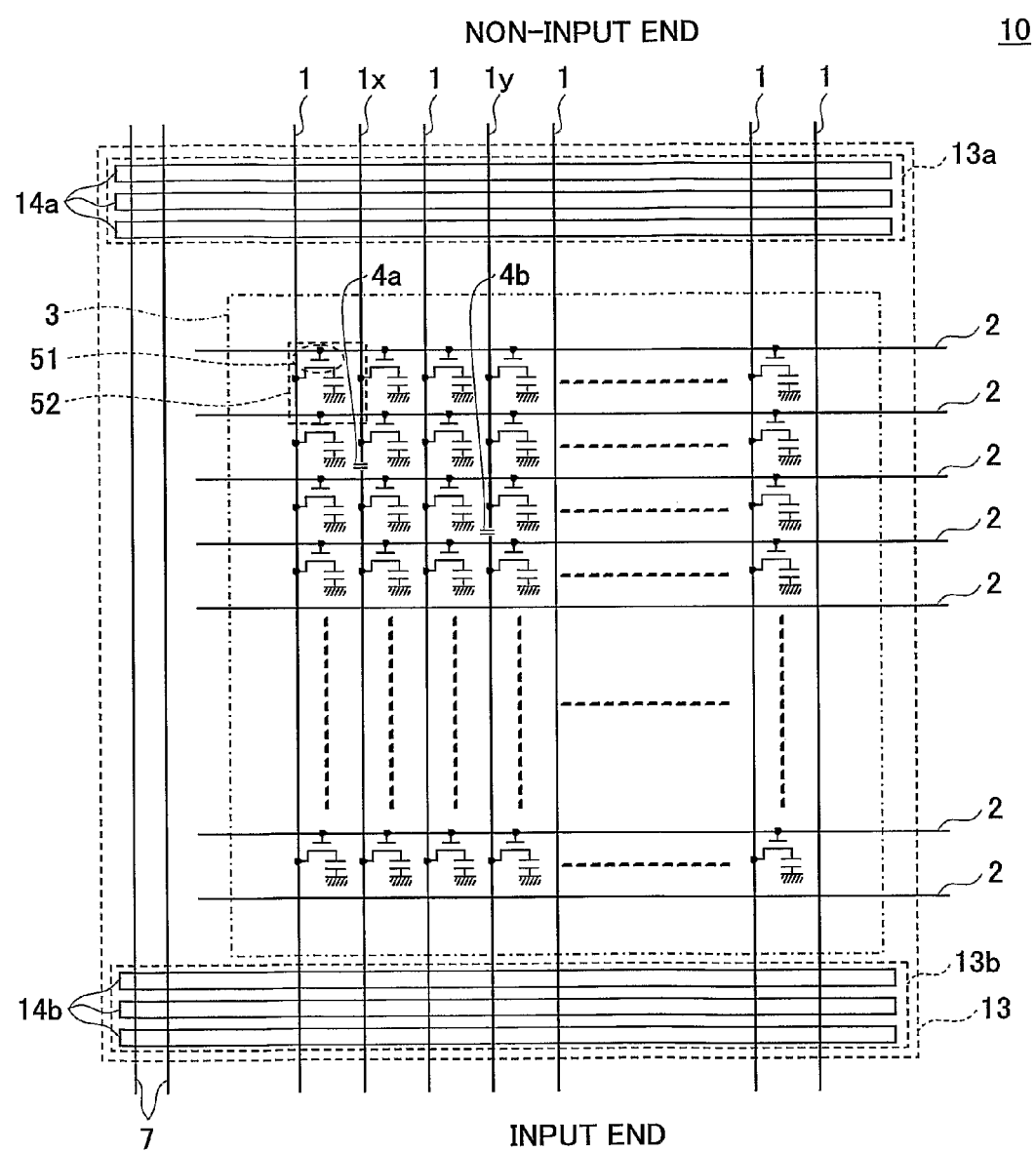
FIGS. 1A through 1C are drawings illustrating a configuration of an array substrate of a display device according to a first embodiment of the present invention.
Figure 1B:
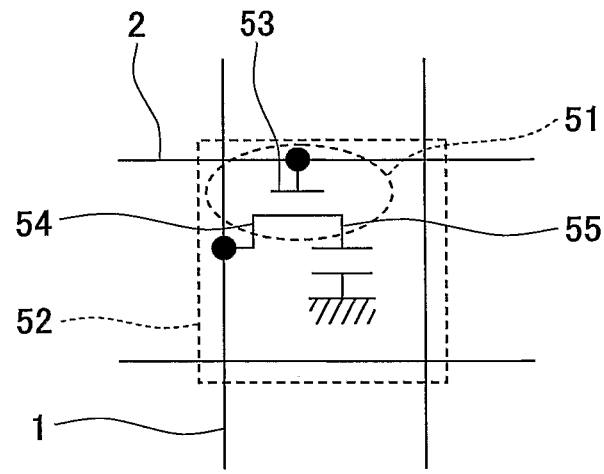
Figure 1C:
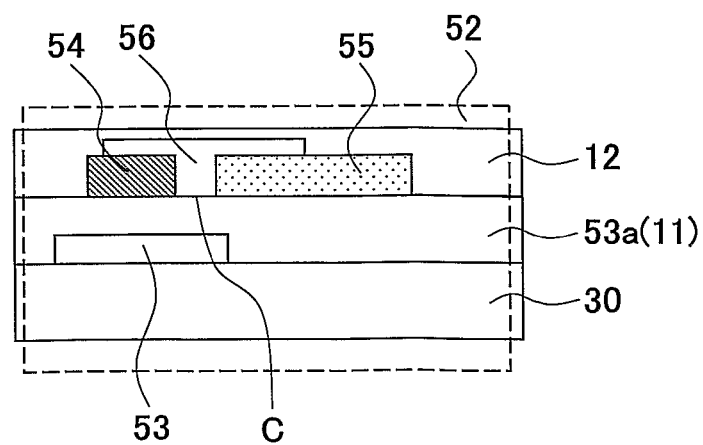

FIGS. 1A through 1C are drawings illustrating a configuration of an array substrate of the display device of the first embodiment. FIG. 1A is a top view of the array substrate; FIG. 1B is a circuit diagram of a switching element of the array substrate; and FIG. 1C is a cut-away side view of the switching element.

Referring to FIGS. 1A through 1C together with FIG. 3B, an array substrate 10 (10a) of the display device of this embodiment includes a substrate 30, a nonconductive film 11, scan lines 2, signal lines 1, switching elements 51, a first insulating film 12, backup lines 7 for the signal lines 1, and a second insulating film 15.

The nonconductive film 11 is formed on the substrate 30. The scan lines 2 and the signal lines 1 are formed on the nonconductive film 11 such that they form a matrix. Each of the switching elements 51 is in one of pixel areas 52 defined by the scan lines 2 and the signal lines 1 crossing each other. An area containing the pixel areas 52 is called an active matrix area 3. The first insulating film 12 is formed over the scan lines 2, the signal lines 1, and the switching elements 51. The backup lines 7 are formed in an outer area 13 located outside of the active matrix area 3. Display elements (not shown) are provided for the respective switching elements 51 implemented by thin-film transistors. The display elements are driven by the switching elements 51.

The nonconductive film 11 is an insulating film. On an assumption that the backup lines 7 are to be formed, the nonconductive film 11 may be formed together with a gate insulating film 53a (described later) of the switching elements 51. Also on an assumption that the backup lines 7 are to be formed, the first insulating film 12 may be formed as an interlayer insulating film that covers the switching elements 51.

In this embodiment, each of the switching elements 51 (hereafter may be called thin-film transistors 51) is formed in one of the pixel areas 52. As shown in FIGS. 1B and 1C, the switching element 51 includes a gate electrode 53, the gate insulating film 53a, a source electrode 54, a drain electrode 55, and a semiconductor layer 56.

In this embodiment, the active matrix area 3 corresponds to a display area and may be called a display area 3 hereafter.

The scan lines 2 extend horizontally and are arranged in the vertical direction. Each of the scan lines 2 is connected to the gate electrodes 53 of a horizontal row of thin-film transistors 51. The signal lines 1 extend vertically and are arranged in the horizontal direction. Each of the signal lines 1 is connected to the source electrodes 54 of a vertical row of thin-film transistors 51.

In each of the thin-film transistors 51, the gate electrode 53 is formed so as to be connected to the corresponding scan line 2 formed on the substrate 30. The gate insulating film 53a is formed to cover the scan line 2 and the gate electrode 53 formed on the substrate 30. The source electrode 54 is formed so as to be connected to the corresponding signal line 1 formed on the gate insulating film 53a. The source electrode 54 and the drain electrode 55 face each other across a channel area C above the gate electrode 53. The semiconductor layer 56 is formed above the channel area C.

The scan lines 2 and the gate electrodes 53 may be formed by various methods such as photolithography, screen printing, inkjet printing, flexography, gravure printing, and offset lithography. Inkjet printing is particularly preferable in terms of patterning accuracy, suitability for large-area displays, costs, and the number of processes. Metallic ink where metallic particles are dispersed is preferably used for inkjet printing. Examples of the metallic particles include Au, Ag, Cu, Pt, Pd, Ni, Ir, Rh, Co, Fe, Mn, Cr, Zn, Mo, W, Ru, In, and Sn. These substances may be used individually or in combination. Among the above substances, Au, Ag, Cu, and Ni are particularly preferable in terms of electric resistance, thermal conductivity, and corrosion.

The scan lines 2 and the gate electrodes 53 may include conductive polymers. Examples of the conductive polymers include polythiophene, polyaniline, polypyrrole, polyparaphenylene, and polyacetylene. Also, substances obtained by doping the above polymers may be used as the conductive polymers. Particularly, a complex (PEDOT/PSS) of polyethylenedioxythiophene (PEDOT) and polystyrene sulfonate (PSS) is preferable in terms of electric conductivity, stability, and thermal resistance. The electrical characteristics of a conductive polymer can be controlled by its degree of polymerization and structure. Also, a conductive polymer does not require sintering and therefore makes it possible to form an electrode at a low temperature.

The signal lines 1, the source electrodes 54, and the drain electrodes 55 may be formed in a manner similar to the scan lines 2 and the gate electrodes 53.

The semiconductor layer 56 may be implemented by an organic semiconductor. In this case, the semiconductor layer 56 is preferably formed by screen printing, inkjet printing, flexography, gravure printing, offset lithography, or so on. Inkjet printing is particularly preferable in terms of patterning accuracy, costs, and material solubility. The organic semiconductor used for the semiconductor layer 36 is preferably soluble in an organic solvent. This makes it possible to form the semiconductor layer 36 using an organic semiconductor ink including an organic semiconductor dissolved in an organic solvent. As the organic semiconductor, for example, a high-polymer material, an oligomeric material, or a low-molecular material may be used.

As shown in FIG. 1A, the switching elements 51 are formed in the pixel areas 52 in the display area (active matrix area) 3. The switching elements 51 may be implemented by thin-film transistors. For example, the switching elements 51 may be implemented by organic transistors including an organic semiconductor layer, and may be formed by photolithography, inkjet printing, and other printing methods as described above. The scan lines 2 and the signal lines 1 are connected, respectively, to the gate electrodes 53 and the source electrodes 54, and extend across the display area (active matrix area) 3 into the outer area 13. Input and non-input ends of the signal lines 1 (or the scan lines 2) further extend across the outer area 13 to the outside. The outer area 13 is located outside of the active matrix area 3 and corresponds to an area where a frame is normally mounted. The width of the outer area 13 is preferably, but is not limited to, 5 mm or less from the active matrix area 3.

The first insulating film 12 is formed over the scan lines 2, the signal lines 1, and the switching elements 51. The first insulating film 12 may be formed as an interlayer insulating film that covers the scan lines 2, the signal lines 1, and the switching elements 51. For example, the nonconductive film 11 may be formed to cover the scan lines 2 and the first insulating film 12 may be formed to cover the signal lines 1 on the nonconductive film 11. The layering order (the order in the height direction) of the scan lines 2 and the signal lines 1 may be changed. For example, the nonconductive film 11 may be formed to cover the signal lines 1 and the first insulating film 12 may be formed to cover the scan lines 2 on the nonconductive film 11.

The first insulating film 12 may be formed by screen printing, inkjet printing, flexography, gravure printing, offset lithography, or so on. Compared with vacuum deposition and other printing methods, screen printing can more easily form a thick film of 1 µm or greater. Also, compared with photolithography, screen printing can more easily form a patterned thick film as long as a proper screen is provided, and therefore provides higher productivity.

Any insulating material may be used for the first insulating film 12. However, when forming the first insulating film 12 by screen printing, it is necessary to select a material usable for screen printing. For example, a commercially-available screen printing paste may be used. For example, polymer materials such as polyvinyl alcohol, cellulosic polymer, silicon polymer, polyethylene, polystyrene, polyamide, high-molecular-weight polyether, polyvinyl butyral, methacrylate polymer, and butyl methacrylate resin may be used for screen printing. An insulating material for the first insulating film 12 may be prepared by adding a plasticizer to a polymer material or by adjusting the viscosity of a polymer material using a solvent to be suitable for printing.

The first insulating film 12 has openings 14a and 14b in the outer area 13 (13a, 13b) above the signal lines 1 (or the scan lines 2). The openings 14a and 14b pass through the first insulating film 12 in a direction substantially perpendicular to the principal plane of the substrate 30. The openings 14a and 14b may be formed at the same time as the signal lines 1 or the scan lines are formed.

In this embodiment, the openings 14a and 14b are shaped like lines extending in a direction orthogonal to the signal lines 1 or the scan lines 2.

Also as shown in FIG. 1A, the backup lines 7 (two in this example) are formed in the outer area 13 (13a, 13b) in a direction parallel to the signal lines 1.

The first insulating film 12 is also present in the outer area 13 (13a, 13b) to cover the backup lines 7. More particularly, the first insulating film 12 is also formed in an outer area 13a near the input ends of the backup lines 7, in an outer area 13b near the output ends of the backup lines 7, and in an area between the outer area 13a and the outer area 13b.

The openings 14a of the first insulating film 12 are also present in the outer area 13a above the input ends of the backup lines 7, and the openings 14b of the first insulating film 12 are also present in the outer area 13b above the output ends of the backup lines 7.

In a different configuration, the backup lines 7 shown in FIG. 1A are not formed in advance. This configuration is described later in a second embodiment of the present invention.

The second insulating film 15 is formed to cover the first insulating film 12 where the openings 14a and 14b are formed. The second insulating film 15 is an interlayer insulating film that further covers the scan lines 2, the signal lines 1, and the switching elements over the first insulating film 12. The second insulating film 15 may be formed using methods and materials similar to those of the first insulating film 12.

Next, a display device repairing method of the first embodiment is described with reference to FIGS. 2 through 10B.

Figure 2:
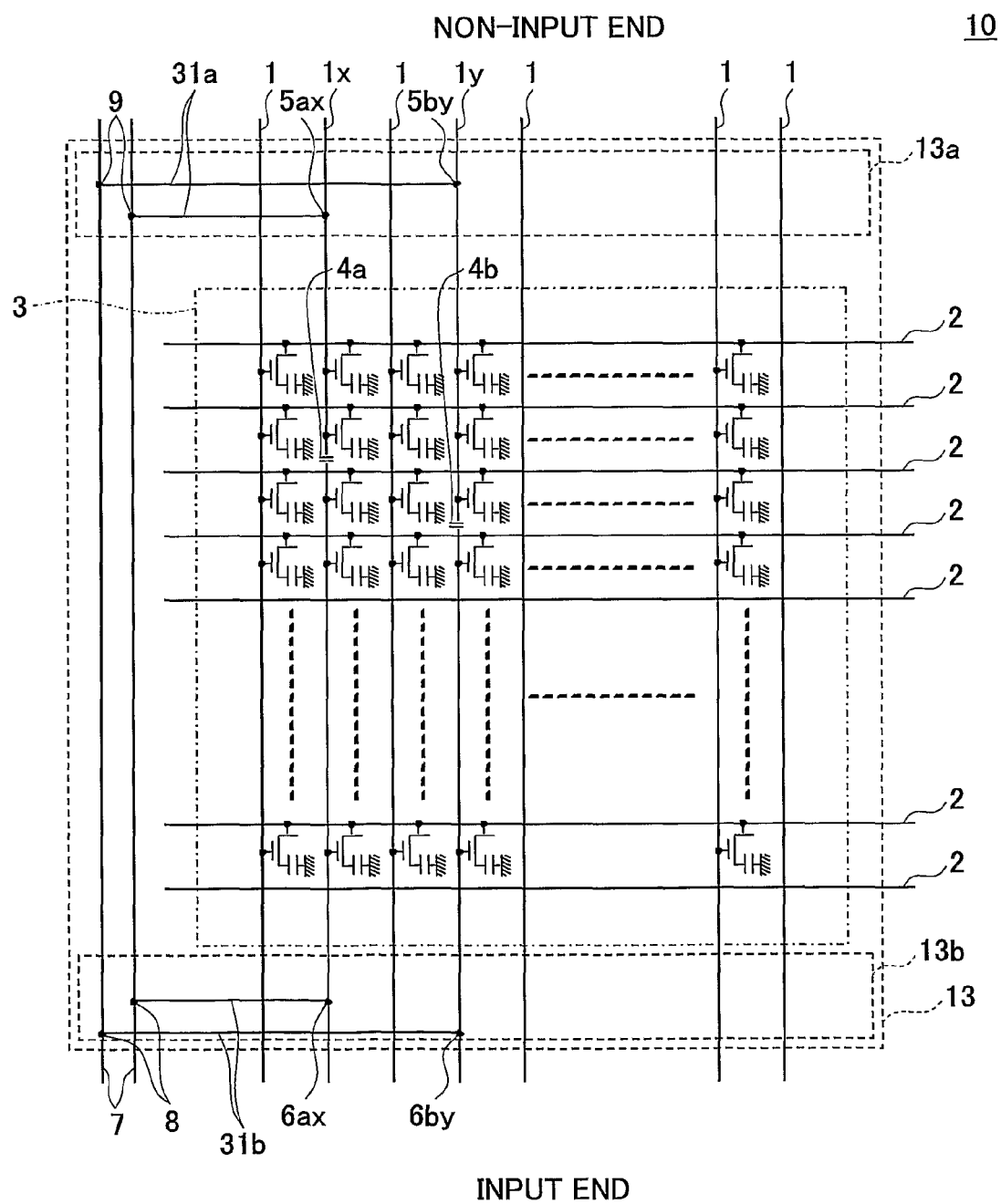
FIG. 2 is a drawing illustrating an array substrate of a display device repaired by a repairing method of the first embodiment.

FIG. 2 is a drawing illustrating an array substrate of a display device repaired by a repairing method of the first embodiment. FIGS. 3A and 3B are enlarged views of repaired portions of the array substrate of the display device repaired by the repairing method of the first embodiment. Below (and in other embodiments and their variations), the same reference numbers are attached to parts corresponding to those already described above, and their descriptions are omitted.

Here, it is assumed that breaks (or other defects) are found in the signal lines 1 at two broken points 4a and 4b in the display area (active matrix area) 3. In FIG. 2, new wiring is formed to repair the broken points 4a and 4b. Similar to FIG. 1A, the nonconductive film 11, the first insulating film 12, and the second insulating film 15 are not shown in FIG. 2. A faulty signal line 1 having the broken point 4a is called a signal line 1x and a faulty signal line 1 having the broken point 4b is called a signal line 1y. FIGS. 3A and 3B are enlarged views showing connections between the signal line 1x or 1y and one of the backup lines 7.

In this embodiment, when a signal line 1 is broken in the display area (active matrix area) 3, two ends of the broken signal line 1, which are located outside of the display area (active matrix area) 3, are connected to each other by forming wires in the outer area 13 through the openings 14a and 14b. In the present application, "ends" of a line may indicate not only the furthest points of the line but also portions of the line near the furthest points.

Figure 4:
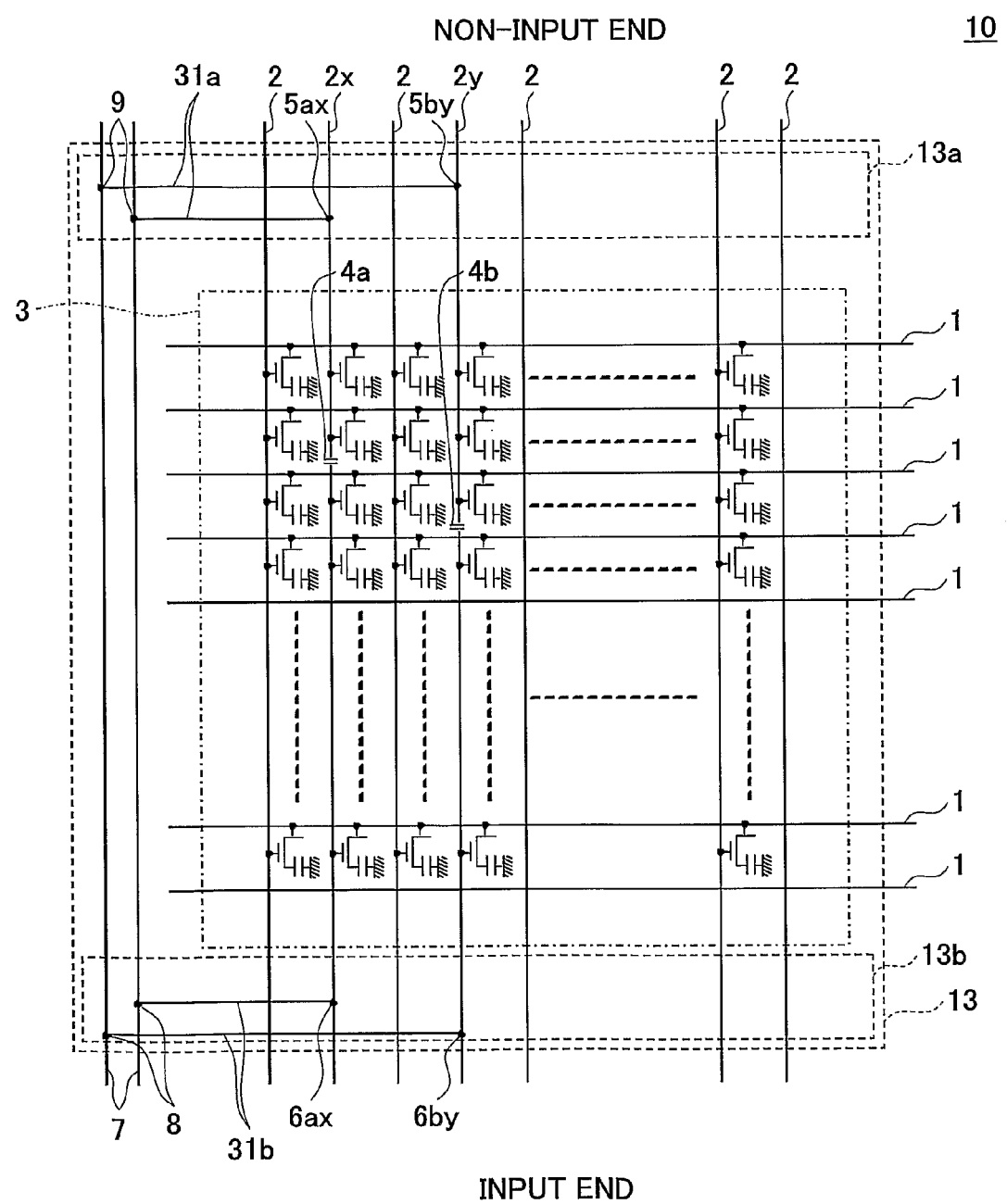
FIG. 4 is a drawing illustrating an array substrate of a display device of the first embodiment where positions of scan lines and signal lines are interchanged.

FIG. 4 is a drawing illustrating an array substrate where the positions of the scan lines 2 and the signal lines 1 are interchanged. In the example shown in FIG. 4, when a break (or another defect) is found in one of the scan lines 2, the break is repaired using the backup lines 7 formed parallel to the scan lines 2. When interchanging the positions of the scan lines 2 and the signal lines 1 as shown in FIG. 4, the layering order (the order in the height direction) of the scan lines 2 and the signal lines 1 may also be changed.

Referring again to FIG. 2, when the signal line 1x has the broken point 4a, a wire 31a is formed in the outer area 13a from an opening 5ax (or an exposed portion of the signal line 1x) formed in the first insulating film 12 above the non-input end of the signal line 1x to an opening 9 (or an exposed portion of a backup line 7) formed in the first insulating film 12 above a backup line 7 to electrically connect the non-input end of the signal line 1x and the backup line 7. Also, a wire 31b is formed in the outer area 13b from an opening 6ax (or an exposed portion of the signal line 1x) formed in the first insulating film 12 above the input end of the signal line 1x to an opening 8 (or an exposed portion of the backup line 7) formed in the first insulating film 12 above the backup line 7 to electrically connect the input end of the signal line 1x and the backup line 7. Thus, the input end and the non-input end of the signal line 1x having the broken point 4a are electrically connected via one of the backup lines 7 and the wires 31a and 31b formed through the openings 5ax and 6ax.

Similarly, when the signal line 1y has the broken point 4b, a wire 31a is formed in the outer area 13a from an opening 5by (or an exposed portion of the signal line 1y) formed in the first insulating film 12 above the non-input end of the signal line 1y to an opening 9 (or an exposed portion of a backup line 7) formed in the first insulating film 12 above a backup line 7 to electrically connect the non-input end of the signal line 1y and the backup line 7. Also, a wire 31b is formed in the outer area 13b from an opening 6by (or an exposed portion of the signal line 1y) formed in the first insulating film 12 above the input end of the signal line 1y to an opening 8 (or an exposed portion of the backup line 7) formed in the first insulating film 12 above the backup line 7 to electrically connect the input end of the signal line 1y and the backup line 7. Thus, the input end and the non-input end of the signal line 1y having the broken point 4b are electrically connected via one of the backup lines 7 and the wires 31a and 31b formed through the openings 5by and 6by.

Referring to FIG. 3A, the wire 31a formed in the outer area 13a at the non-input end of the signal line 1x (or 1y) includes an extending part 311a extending from a position near the opening 5ax (or 5by) to a position near the opening 9 (i.e., extending near one of the openings 14a) in a direction orthogonal to the signal line 1x (or 1y); a first bent part 312a bending from one end of the extending part 311a toward the opening 5ax (or 5by); and a second bent part 313a bending from the other end of the extending part 311a toward the opening 9. Similarly, the wire 31b formed in the outer area 13b at the input end of the signal line 1x (or 1y) includes an extending part 311b extending from a position near the opening 6ax (or 6by) to a position near the opening 8 (i.e., extending near one of the openings 14b) in a direction orthogonal to the signal line 1x (or 1y); a first bent part 312b bending from one end of the extending part 311b toward the opening 6ax (or 6by); and a second bent part 313b bending from the other end of the extending part 311b toward the opening 8. Thus, the wire 31a for connecting the signal line 1x (or 1y) and the backup line 7 via the opening 5ax (or 5by) and the opening 9 includes the extending part 311a, the first bent part 312a, and the second bent part 313a. As shown in FIG. 3A, the wire 31a has a square-bracket shape with an opening, facing downward on the printed page. Meanwhile, the wire 31b for connecting the signal line 1x (or 1y) and the backup line 7 via the opening 6ax (or 6by) and the opening 8 includes the extending part 311b, the first bent part 312b, and the second bent part 313b. As shown in FIG. 3A, the wire 31b has a square-bracket shape with an opening facing upward on the printed page.

Figure 5A:
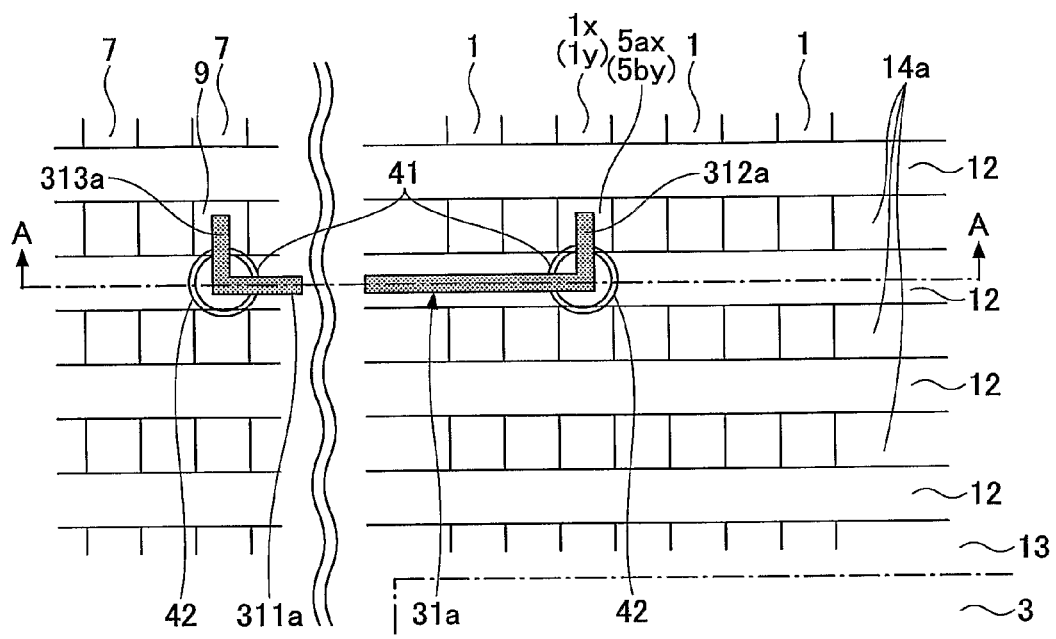
FIGS. 5A through 5C are drawings (1) illustrating shape variations of a wire formed on an array substrate of the first embodiment.
Figure 5B:
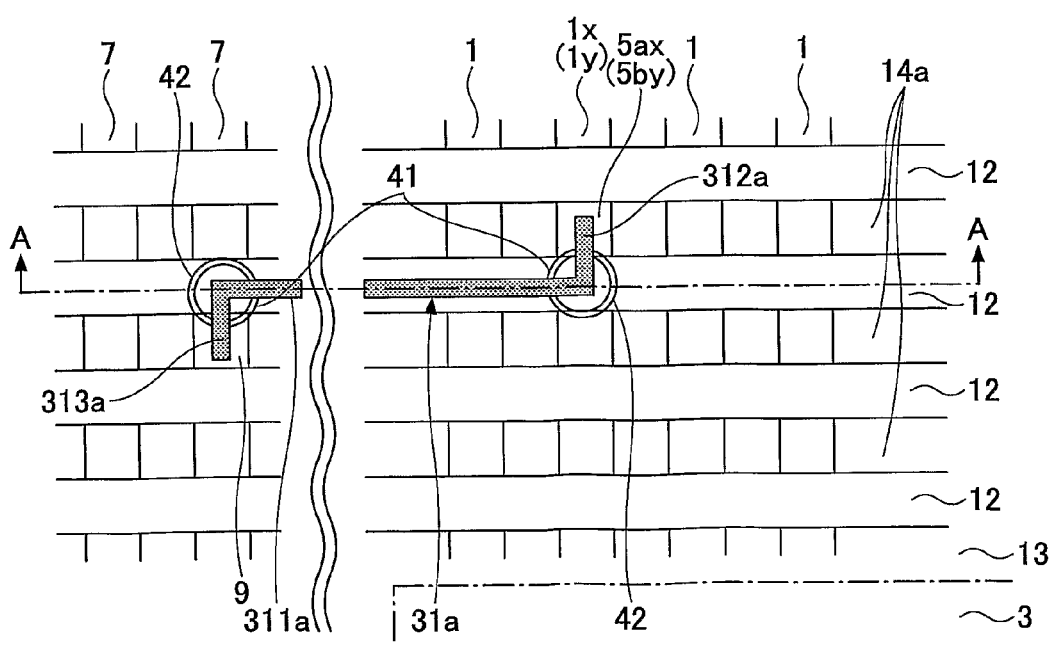
Figure 5C:
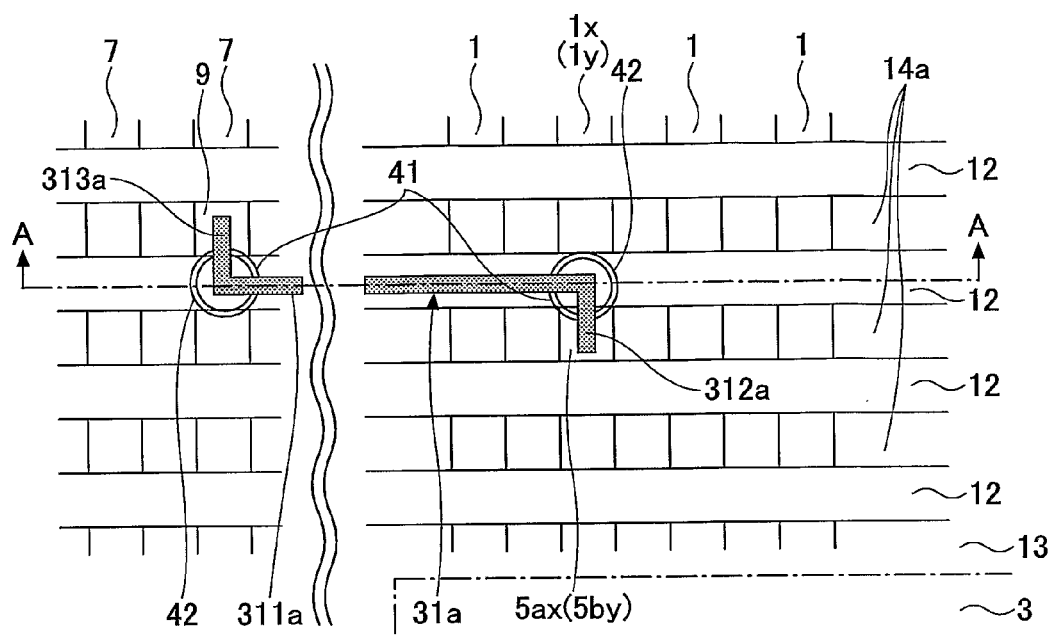

FIGS. 5A through 5C are drawings illustrating shape variations of the wire 31a. As shown in FIGS. 5A through 5C, the wire 31a can take various shapes. FIG. 5A shows the wire 31a having a square-bracket shape with an opening facing upward on the printed page. FIG. 5B shows the wire 31a having the first bent part 312a bending upward from the right end of the extending part 311a and the second bent part 313a bending downward from the left end of the extending part 311a. FIG. 5C shows the wire 31a having the first bent part 312a bending downward from the right end of the extending part 311a and the second bent part 313a bending upward from the left end of the extending part 311a. Thus, including the shape shown in FIG. 3A, the wire 31a may take one of the four shapes.

Figure 6A:
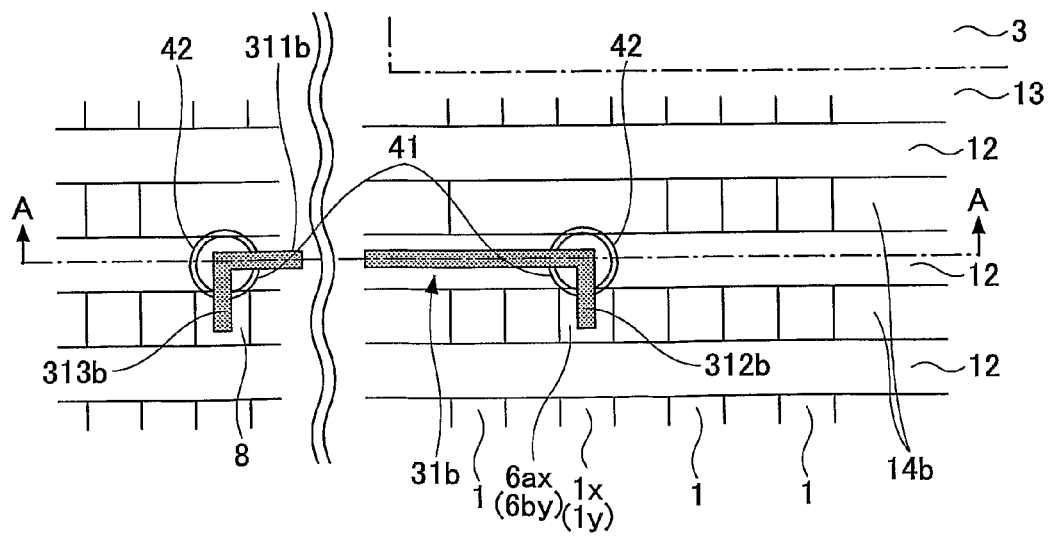
FIGS. 6A through 6C are drawings (2) illustrating shape variations of a wire formed on an array substrate of the first embodiment.
Figure 6B:
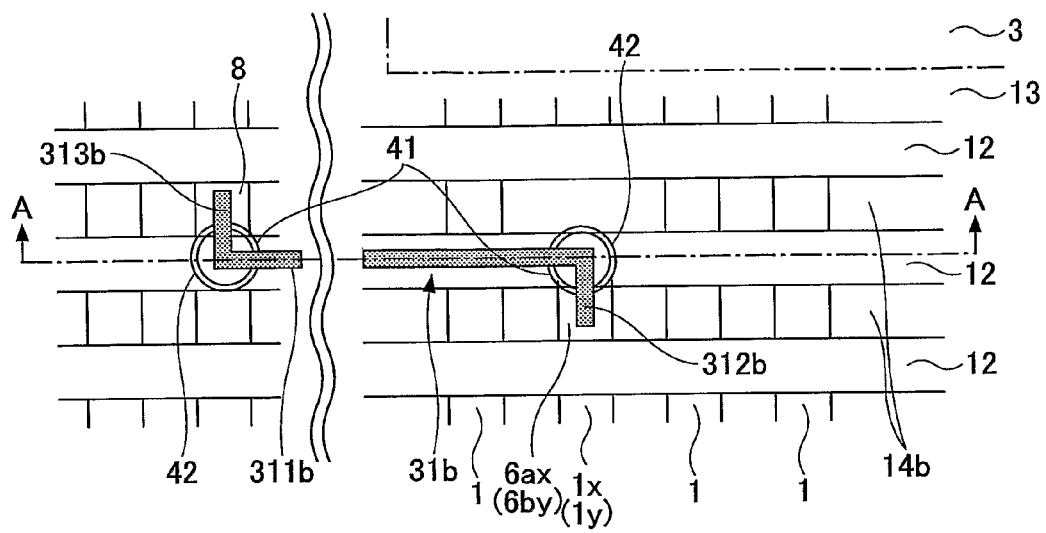
Figure 6C:
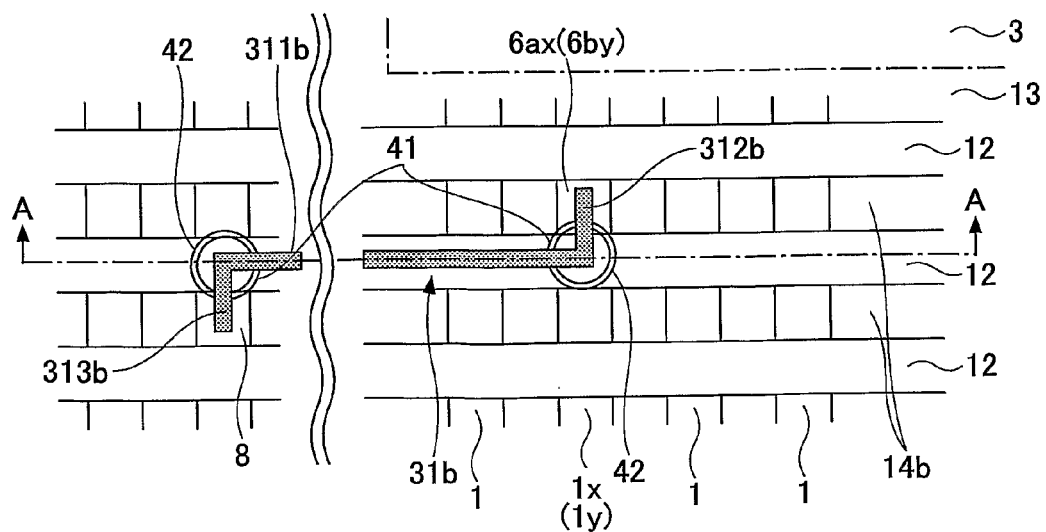

FIGS. 6A through 6C are drawings illustrating shape variations of the wire 31b. As shown in FIGS. 6A through 6C, the wire 31b can take various shapes. FIG. 6A shows the wire 31b having a square-bracket shape with an opening facing downward on the printed page. FIG. 6B shows the wire 31b having the first bent part 312b bending downward from the right end of the extending part 311b and the second bent part 313b bending upward from the left end of the extending part 311b. FIG. 6C shows the wire 31b having the first bent part 312b bending upward from the right end of the extending part 311b and the second bent part 313b bending downward from the left end of the extending part 311b. Thus, including the shape shown in FIG. 3A, the wire 31b may take one of the four shapes.

As described above, each of the wire 31a and the wire 31b may take at least four shapes. Therefore, the number of combinations of the shapes of the wire 31a and the wire 31b is at least 4×4=16. Also, multiple wires 31a or wires 31b with different shapes may be formed on the array substrate 10 (10a).

Referring to FIG. 3B, the second insulating film 15 is formed over the first insulating film 12. Similar to the first insulating film 12, the second insulating film 15 may be formed by photolithography, CVD, inkjet printing, and other printing methods.

Next, a display device repairing method (process) of the first embodiment is described with reference to FIG. 7.

Figure 7:
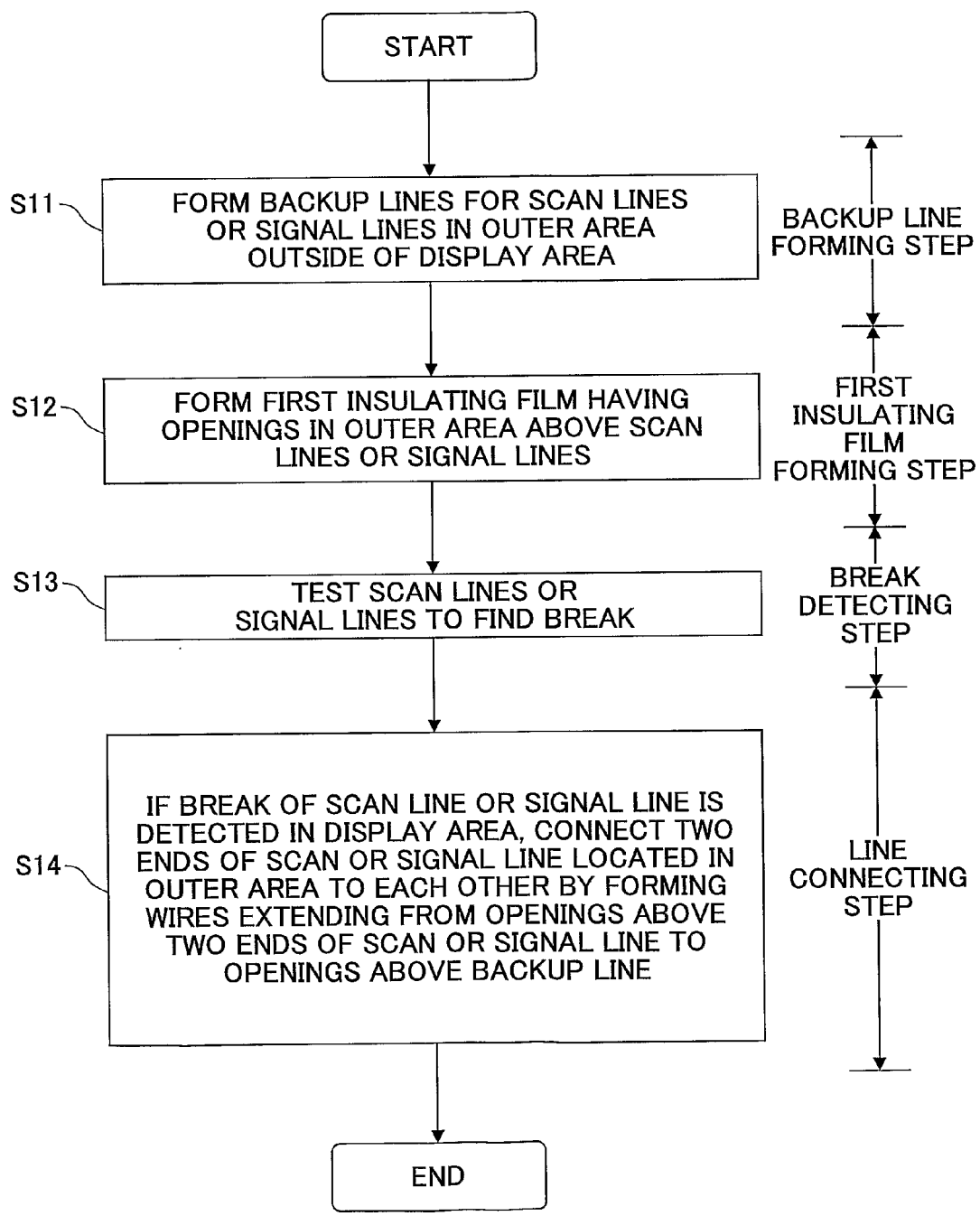
FIG. 7 is a flowchart showing a process of repairing a display device of the first embodiment.

FIG. 7 is a flowchart showing a display device repairing process of the first embodiment.

As shown in FIG. 7, the repairing process of this embodiment includes a backup line forming step, a first insulating film forming step, a break detecting step, and a line connecting step. The backup line forming step includes step S11, the first insulating film forming step includes step S12, the break detecting step includes step S13, and the line connecting step includes step S14.

First, the backup line forming step including step S11 is performed. In step S11, backup lines for scan lines or signal lines are formed in an outer area outside of a display area. For example, as shown in FIG. 1A, the backup lines 7 for the signal lines 1 are formed in the outer area 13 in a direction parallel to the signal lines 1. Alternatively, as shown in FIG. 4, the backup lines 7 for the scan lines 2 may be formed in the outer area 13 in a direction parallel to the scan lines 2.

Next, the first insulating film forming step including step S12 is, performed. In step S12, a first insulating film having openings in the outer area above the scan lines or the signal lines is formed. For example, in a case where the backup lines 7 are formed parallel to the signal lines 1 as shown in FIG. 1A, the openings 14a and 14b shaped like lines are formed in a direction orthogonal to the signal lines 1. Alternatively, if the backup lines 7 are formed parallel to the scan lines 2 as shown in FIG. 4, the openings 14a and 14b shaped like lines, are formed in a direction orthogonal to the scan lines 2.

Next, the break detecting step including step S13 is performed. In step S13, the scan lines or the signal lines are tested to find a break. The break detecting step may be performed, for example, by testing the continuity of the signal lines or the scan lines using test pads provided in the outer area at both ends of the signal or scan lines; or by tentatively assembling the array substrate, display elements, and an opposed substrate and testing display operations of respective pixel areas.

Next, the line connecting step including step S14 is performed. If a break of a scan line or a signal line is detected in the display area (active matrix area) in step S13, in step S14, two ends of the scan or signal line located in the outer area are connected to each other by forming wires in the outer area. The wires extend from openings above the two ends of the scan or signal line to openings above a backup line, and connect the backup line and the ends of the scan or signal line. Each of the wires includes an extending part (311a or 311b) orthogonal to the scan or signal line and bent parts (312a or 312b, and 313a or 313b) bending from the ends of the extending part toward the openings as described above.

As materials for the wires to be formed in the line connecting step, a silver paste, a gold paste, and a copper paste may be used. Also, materials including nanoparticles of silver, gold, copper, or other metals, and materials including substances similar to nanoparticles may be used. The wires may be formed, for example, by drawing using a micro dispenser or by stippling using a needle and a paste.

In addition to the above described materials, a highly-conductive material such as aluminum, tantalum, nickel, tungsten, or indium tin oxide (ITO) formed, for example, by vapor deposition may be used for the wires to be formed in the line connecting step.

Normally, a wet material is used to form the wires 31a and 31b except when they are formed by laser CVD or deposition. The conductance of a wet material for the wires 31a and 31b is not fully achieved by just letting a solvent component of the material evaporate. To improve the conductance, it is necessary to cure the material (electrode).

Generally, the material is cured by calcination. For example, when a material including nanoparticles is used for the wires, the material is laser-baked or calcined at around 200° C.

Next, variations of the array substrate 10a of the first embodiment where the second insulating film and/or the non-conductive film is omitted are described with reference to FIGS. 8A through 10B.

FIGS. 8A and 8B are drawings illustrating an array substrate where the second insulating film is omitted. The array substrate 10a described above with reference to FIGS. 3A and 3B includes the second insulating film 15 formed on the substrate 30. Meanwhile, the second insulating film 15 is omitted in an array substrate 10b shown by FIGS. 8A and 8B.

Similar to the array substrate 10a of FIGS. 3A and 3B, the wires 31a and 31b formed on the array substrate 10b of FIGS. 8A and 8B may have various shapes. For example, the wire 31a may take one of the four shapes shown in FIGS. 5A through 5C and 8A. Also, the wire 31b may take one of the four shapes shown in FIGS. 6A through 6C and 8A. Thus, also in the case of the array substrate 10b of FIGS. 8A and 8B, the number of combinations of the shapes of the wire 31a and the wire 31b is at least 4×4=16. Also, multiple wires 31a or wires 31b with different shapes may be formed on the array substrate 10b.

Figure 9A:
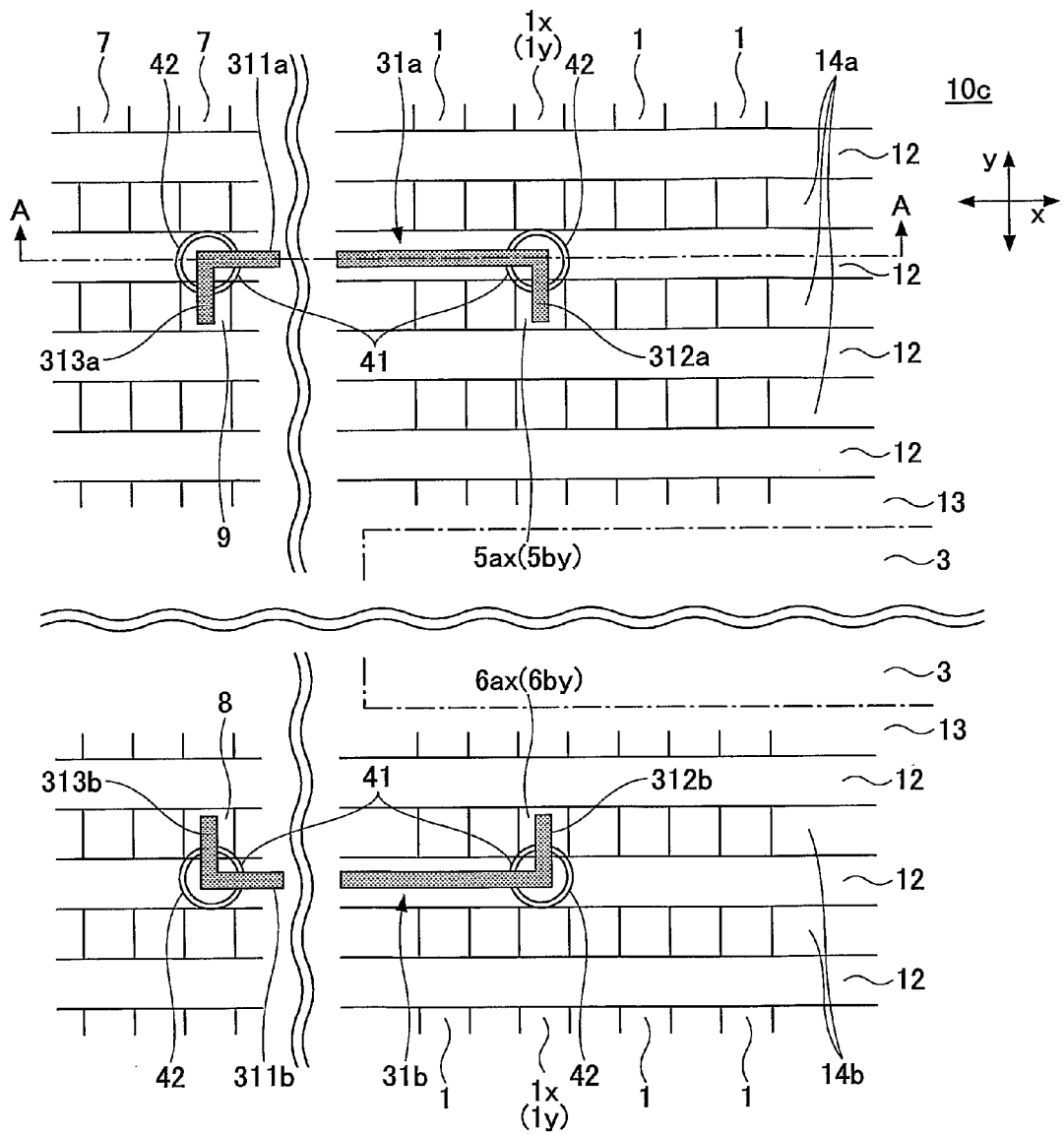
FIGS. 9A and 9B are drawings illustrating an array substrate of the first embodiment where a nonconductive film is omitted.
Figure 9B:
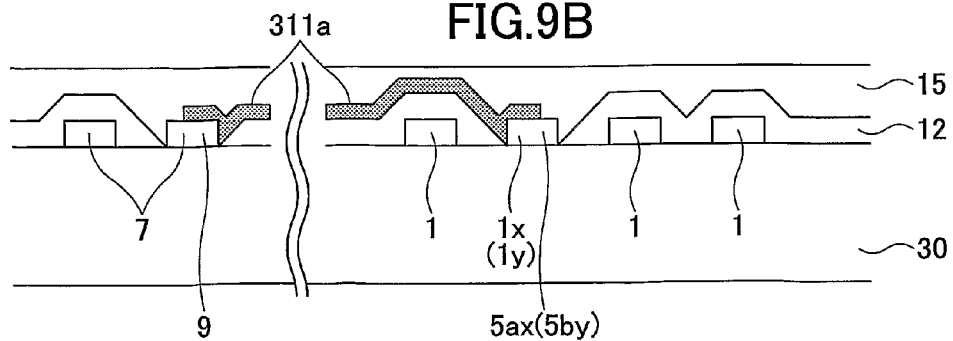

FIGS. 9A and 9B are drawings illustrating an array substrate where the nonconductive film is omitted. The array substrate 10a described above with reference to FIGS. 3A and 3B includes the nonconductive film 11 formed on the substrate 30. Meanwhile, the nonconductive film 11 is omitted in an array substrate 10c shown by FIGS. 9A and 9B.

Similar to the array substrate 10a of FIGS. 3A and 3B, the wires 31a and 31b formed on the array substrate 10c of FIGS. 9A and 9B may have various shapes. For example, the wire 31a may take one of the four shapes shown in FIGS. 5A through 5C and 9A. Also, the wire 31b may take one of the four shapes shown in FIGS. 6A through 6C and 9A. Thus, also in the case of the array substrate 10c of FIGS. 9A and 9B, the number of combinations of the shapes of the wire 31a and the wire 31b is at least 4×4=16. Also, multiple wires 31a or wires 31b with different shapes may be formed on the array substrate 10c.

FIGS. 10A and 10B are drawings illustrating an array substrate where the nonconductive film and the second insulating film are omitted. The array substrate 10c shown by FIGS. 9A and 9B includes the second insulating film 15 formed on the substrate 30. Meanwhile, the second insulating film 15 is also omitted in an array substrate 10d shown by FIGS. 10A and 10B.

Similar to the array substrate 10a of FIGS. 3A and 3B, the wires 31a and 31b formed on the array substrate 10d of FIGS. 10A and 10B may have various shapes. For example, the wire 31a may take one of the four shapes shown in FIGS. 5A through 5C and 10A. Also, the wire 31b may take one of the four shapes shown in FIGS. 6A through 6C and 10A. Thus, also in the case of the array substrate 10d of FIGS. 10A and 10B, the number of combinations of the shapes of the wire 31a and the wire 31b is at least 4×4=16. Also, multiple wires 31a or wires 31b with different shapes may be formed on the array substrate 10d.

The angle between the extending part 311a (or 311b) and the bent part 312a (or 312b) of the wire 31a (or 31b) is described with reference to FIG. 3A.

Let us assume that the wire 31a or 31b has one of the shapes shown in FIGS. 3A, 3B, 5A-5C, and 6A-6C, an x-direction indicates the direction of the scan lines 2, and a y-direction indicates the direction of the signal lines 1. In this case, the wire 31a or 31b can be electrically connected with a lower layer by bending the wire 31a or 31b in a direction other than the z-direction, i.e., in a direction in the x-y plane.

As shown in FIG. 3A, the bending angle of the wire 31a can be defined by an angle 41 or an angle 42 (for brevity, only the bending angle of the wire 31a is described here, but the descriptions may also be applied to the wire 31b). The angle 41 is less than 180 degrees and the angle 42 is obtained by subtracting the angle 41 from 360 degrees. Since the scan lines 2 and the signal lines 1 are orthogonal to each other, the easiest way is to set the angle 41 between the extending part 311a and the bent part 312a (or 313a) at about 90 degrees. However, as long as the wire 31a does not contact other signal lines near the signal line having a break, the angle 41 may be set at any other value. The angle 41 is preferably between 5 and 175 degrees, and more preferably between 45 and 135 degrees.

Instead of the wire 31a including the extending part 311a and the bent parts 312a and 313a and the wire 31b including the extending part 311b and the bent parts 312b and 313b, wires without a bent part may be used. For example, when a signal line having a break is located comparatively close to a backup line (e.g., one of the five signal lines from the backup line), a wire without a bent part may be formed at an angle other than 90 degrees (e.g., 100 degrees) with the signal line to connect the signal line with the backup line.

Figure 11:
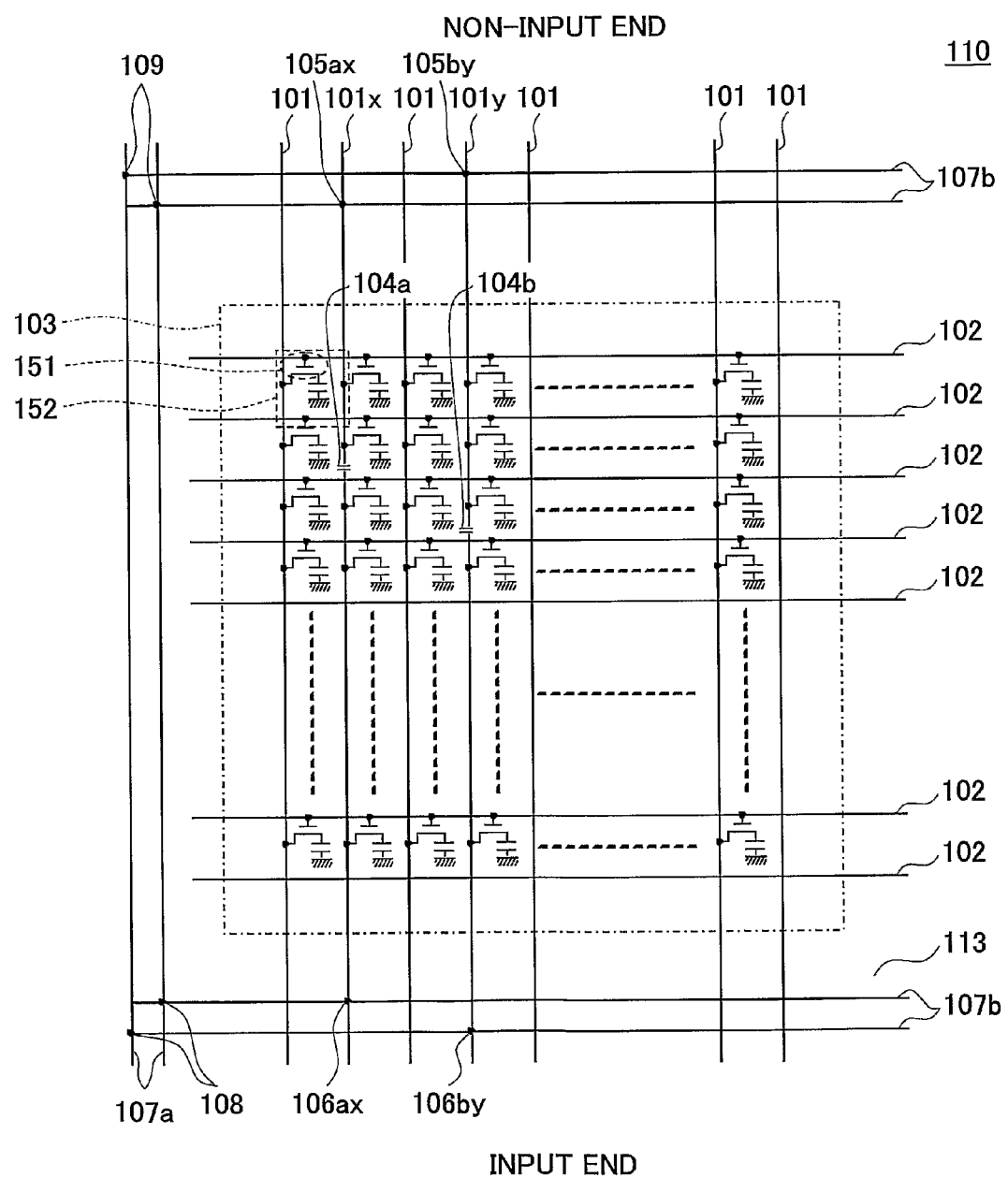
FIG. 11 is a drawing illustrating a configuration of an array substrate of a related-art display device.
Figure 12A:
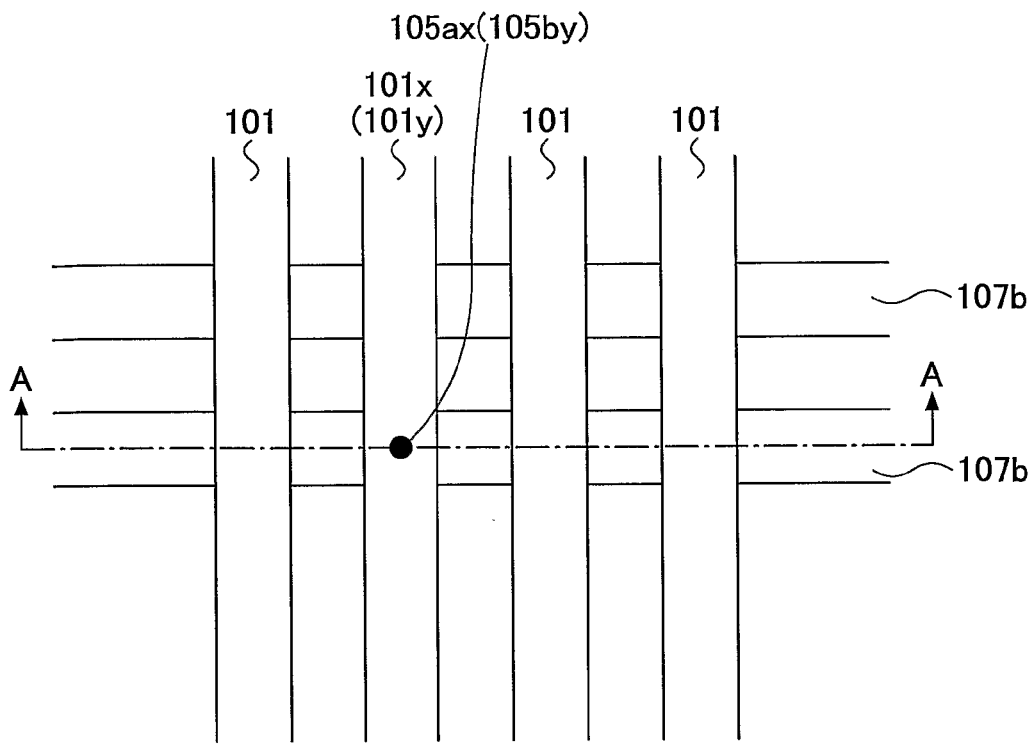
FIGS. 12A and 12B are drawings used to describe a related-art method of repairing a display device.
Figure 12B:
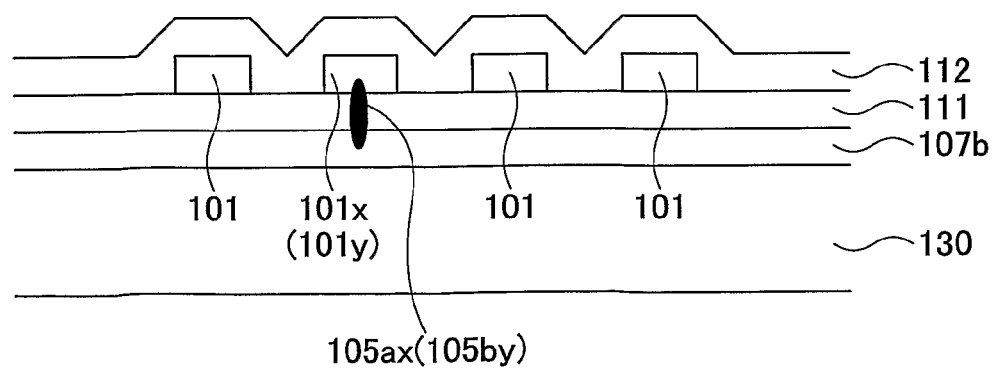

Next, advantages such as reduced cross capacitance and reduced leakage of the array substrate 10 of this embodiment are described in comparison with a related-art array substrate with reference to FIGS. 11, 12A, and 12B.

FIG. 11 is a drawing illustrating a configuration of an array substrate 110 of a related-art display device. FIGS. 12A and 12B are drawings used to describe a related-art method of repairing a display device. FIG. 12A is a top view of the array substrate 110 where a break is repaired. FIG. 12B is a cross-sectional view of the array substrate 110 of FIG. 12A taken along line A-A.

Similar to the array substrate 10 of the first embodiment, the array substrate 110 of the related-art display device includes a substrate 130, a nonconductive film 111, scan lines 102, signal lines 101, switching elements 151, and a first insulating film 112. The scan lines (gate lines) 102 are connected to gate electrodes of the switching elements 151 and extend horizontally across a display area (active matrix area) 103. The signal lines (source lines) 101 are connected to source electrodes of the switching elements 151 and extend from the input end to the non-input end across the display area (active matrix area) 103.

Different from the array substrate 10 of the first embodiment, the array substrate 110 includes backup lines 107a for the signal lines 101 and backup lines 107b for the scan lines 102. The backup lines 107a and 107b are formed in an outer area 113 outside of the display area (active matrix area) 103 at the same time as the signal lines 102 and the scan lines 102 are formed. If, for example, broken points 104a and 104b are found in signal lines 101x and 101y of the array substrate 110 as shown in FIG. 11, the backup lines 107b and the signal lines 101x and 101y are fused together, i.e., electrically connected, at intersections 105ax, 105by, 106ax, and 106by in the outer area 113 by illuminating the intersections with a laser beam from the upper side or the lower side of the array substrate 110. More specifically, as shown in FIG. 12A, the broken point 104a is repaired by fusing the signal line 101x and the backup lines 107b using a laser beam at the intersections 105ax and 106ax. Similarly, the broken point 104b is repaired by fusing the signal line 101y and the backup lines 107b using a laser beam at the intersections 105by and 106by. Further, the backup lines 107a and the backup lines 107b are fused and electrically connected at intersections 109 and 108 by using a laser beam. As a result, signals input from the input ends of the signal lines 101x and 101y can be transmitted via the backup lines 107b and 107a, i.e., by bypassing the broken points 104a and 104b, to the corresponding non-input ends of the signal lines 101x and 101y.

However, the above configuration of the array substrate 110 of the related-art display device produces many intersections between the backup lines 107b and the signal lines 101 and therefore increases cross capacitance generated at the intersections. Also, short circuits may occur at the intersections between the backup lines 107b and the signal lines 101 and cause leakage.

Meanwhile, in the array substrate 10 of this embodiment, the backup lines 7 are formed outside of the display area (active matrix area) 3 only in a direction parallel to the signal lines 1 and therefore do not intersect with the signal lines 1. Unlike the array substrate 110 of the related art display device where the backup lines 107b are formed in advance, with the array substrate 10 of this embodiment, only a necessary number of wires 31a and 31b with necessary lengths have to be formed according to found broken points. Thus, an aspect of the present invention provides a display device including an array substrate with a configuration that makes it possible to repair broken lines as well as to reduce cross capacitance and leakage.

The switching elements 51 of the array substrate 10 may be implemented by amorphous silicon thin-film transistors (a-Si TFT), polysilicon thin-film transistors (p-Si TFT), or organic thin-film transistors (O-TFT). Other types of switching elements similar to the above thin-film transistors may also be used.

Display elements of a display device including the array substrate 10 of this embodiment may be implemented by liquid crystal display elements, organic electroluminescent (EL) display elements, or plasma display elements; and the display device of this embodiment may be implemented, for example, as a liquid crystal display, an organic EL display, or a plasma display panel (PDP). Also, by combining the array substrate 10 of this embodiment with various display elements, it is possible to provide still other types of display devices such as an electrowetting display, a digital micro shutter display, electronic paper, a QRPD display, an interferometric modulation (IMOD) display, a surface-conduction electron-emitter display (SED), and a time multiplexed optical shutter (TMOS) display.

Variation of First Embodiment

A variation of the first embodiment is described below with reference to FIGS. 13 through 19B.

Figure 13:
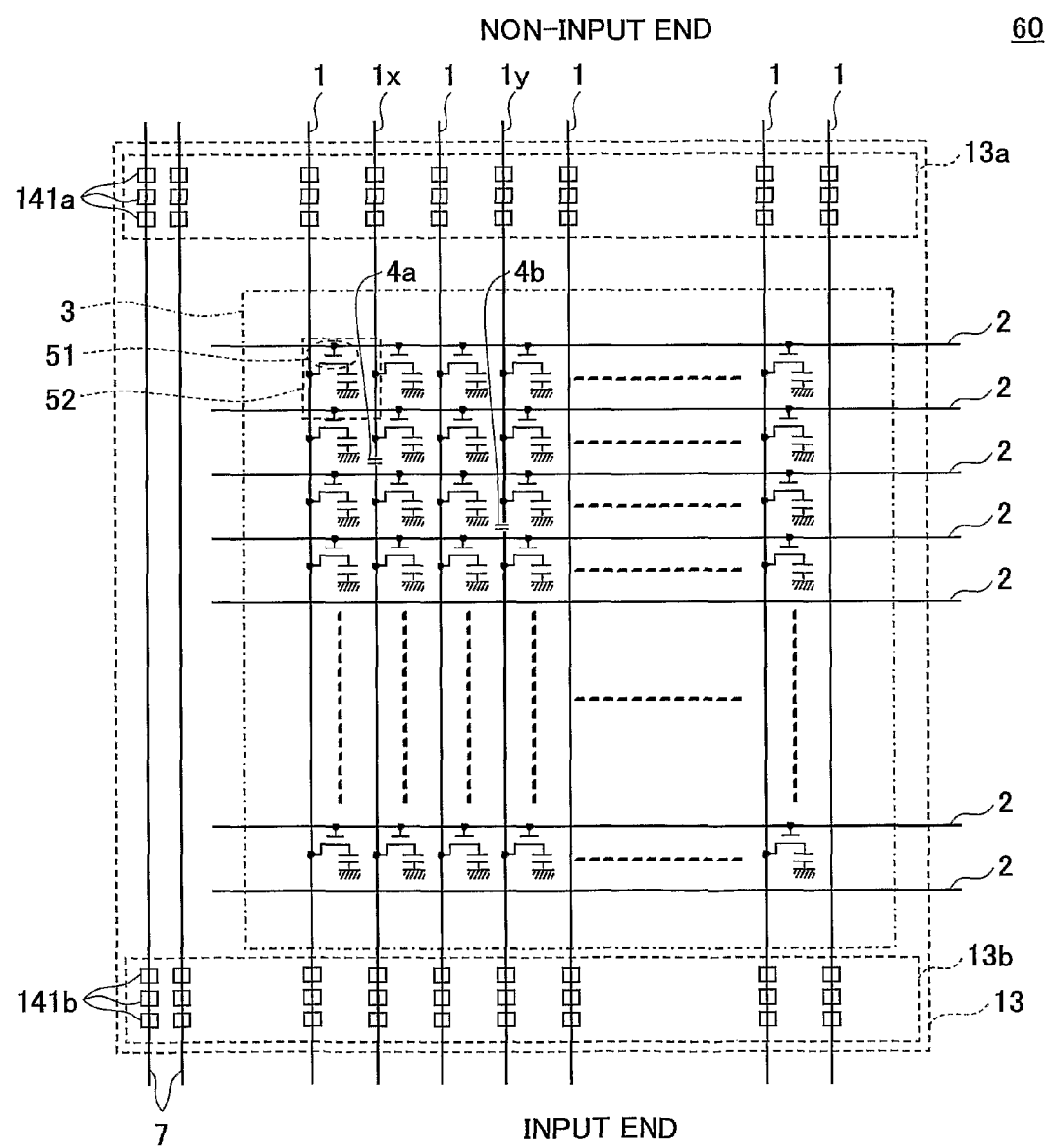
FIG. 13 is a drawing illustrating a configuration of an array substrate according to a variation of the first embodiment.

FIG. 13 is a drawing illustrating a configuration of an array substrate of a display device according to a variation of the first embodiment.

An array substrate 60 of this variation is different from the array substrate 10 of the first embodiment in that openings are formed like rows of stepping stones in a direction orthogonal to signal lines or scan lines.

In the array substrate 10 of the first embodiment, the openings 14a and 14b are shaped like lines extending in a direction orthogonal to the signal lines 1 or the scan lines 2. Meanwhile, in the array substrate 60 of this variation, as shown in FIG. 13, openings 141a and 141b are formed like rows of stepping stones in a direction orthogonal to signal lines 1 or scan lines 2.

The openings 141a and 141b are formed in a first insulating film 12 in outer areas 13a and 13b outside of a display area 3. The array substrate 60 of this variation has substantially the same configuration as that of the array substrate 10 of the first embodiment except that the openings 141a and 141b are formed like rows of stepping stones.

Referring to FIG. 13 together with FIG. 14B, the array substrate 60 (60a) of the display device of this variation includes a substrate 30, a nonconductive film 11, the scan lines 2, the signal lines 1, switching elements 51, the first insulating film 12, backup lines 7 for the signal lines 1 or the scan lines 2, and a second insulating film 15. The configurations of components of the array substrate 60 other than the first insulating film 12 are substantially the same as those of the array substrate 10 of the first embodiment.

As shown in FIG. 13, the switching elements 51 are formed in pixel areas 52 in the display area (active matrix area) 3. The switching elements 51 may be implemented by thin-film transistors. For example, the switching elements 51 may be implemented by organic transistors including an organic semiconductor layer, and may be formed by photolithography, inkjet printing, and other printing methods as described above. The scan lines 2 and the signal lines 1 are connected, respectively, to gate electrodes and source electrodes of the switching elements 51, and input and non-input ends of the signal lines 1 (or the scan lines 2) extend across the outer areas 13b and 13a to the outside.

The first insulating film 12 has the openings 141a and 141b in the outer areas 13a and 13b above the signal lines 1 (or the scan lines 2). The openings 141a and 141b may be formed at the same time as the signal lines 1 or the scan lines 2 are formed. The first insulating film 12 is also present in a part of the outer area 13 between the outer area 13a and the outer area 13b to cover the backup lines 7.

Next, a display device repairing method of this variation is described with reference to FIGS. 14A through 19B.

FIGS. 14A and 14B are enlarged views of repaired portions of an array substrate of a display device repaired by the repairing method of this variation.

The display device repairing method of this variation is substantially the same as that of the first embodiment. The configuration of the repaired array substrate is substantially the same as that shown by FIG. 2.

Here, it is assumed that breaks (or other defects) are found in the signal lines 1 at two broken points 4a and 4b in the display area (active matrix area) 3.

As shown in FIG. 14A, when a signal line 1x has the broken point 4a, a wire 31a is formed in the outer area 13a from an opening 5ax (or an exposed portion of the signal line 1x) formed in the first insulating film 12 above the non-input end of the signal line 1x to an opening 9 (or an exposed portion of a backup line 7) formed in the first insulating film 12 above a backup line 7 to electrically connect the non-input end of the signal line 1x and the backup line 7. Also, a wire 31b is formed in the outer area 13b from an opening 6ax (or an exposed portion of the signal line 1x) formed in the first insulating film 12 above the input end of the signal line 1x to an opening 8 (or an exposed portion of the backup line 7) formed in the first insulating film 12 above the backup line 7 to electrically connect the input end of the signal line 1x and the backup line 7. Thus, the input end and the non-input end of the signal line 1x having the broken point 4a are electrically connected via the backup line 7 and the wires 31a and 31b formed through the openings 5ax and 6ax. The broken point 4b in the signal line 1y may be repaired in a similar manner.

In FIG. 14A, the wire 31a formed in the outer area 13a at the non-input end of the signal line 1x (or 1y) includes an extending part 311a extending from a position near the opening 5ax (or 5by) to a position near the opening 9 (i.e., extending near one of the openings 141a) in a direction orthogonal to the signal line 1x (or 1y); a first bent part 312a bending from one end of the extending part 311a toward the opening 5ax (or 5by); and a second bent part 313a bending from the other end of the extending part 311a toward the opening 9. Similarly, the wire 31b formed in the outer area 13b at the input end of the signal line 1x (or 1y) includes an extending part 311b extending from a position near the opening 6ax (or 6by) to a position near the opening 8 (i.e., extending near one of the openings 141b) in a direction orthogonal to the signal line 1x (or 1y); a first bent part 312b bending from one end of the extending part 311b toward the opening 6ax (or 6by); and a second bent part 313b bending from the other end of the extending part 311b toward the opening 8. Thus, the wire 31a for connecting the signal line 1x (or 1y) and the backup line 7 via the opening 5ax (or 5by) and the opening 9 includes the extending part 311a, the first bent part 312a, and the second bent part 313a. As shown in FIG. 14A, the wire 31a has a square-bracket shape with an opening facing downward on the printed page. Meanwhile, the wire 31b for connecting the signal line 1x (or 1y) and the backup line via the opening 6ax (or 6by) and the opening 8 includes the extending part 311b, the first bent part 312b, and the second bent part 313b. As shown in FIG. 14A, the wire 31b has a square-bracket shape with an opening facing upward on the printed page.

Figure 15A:
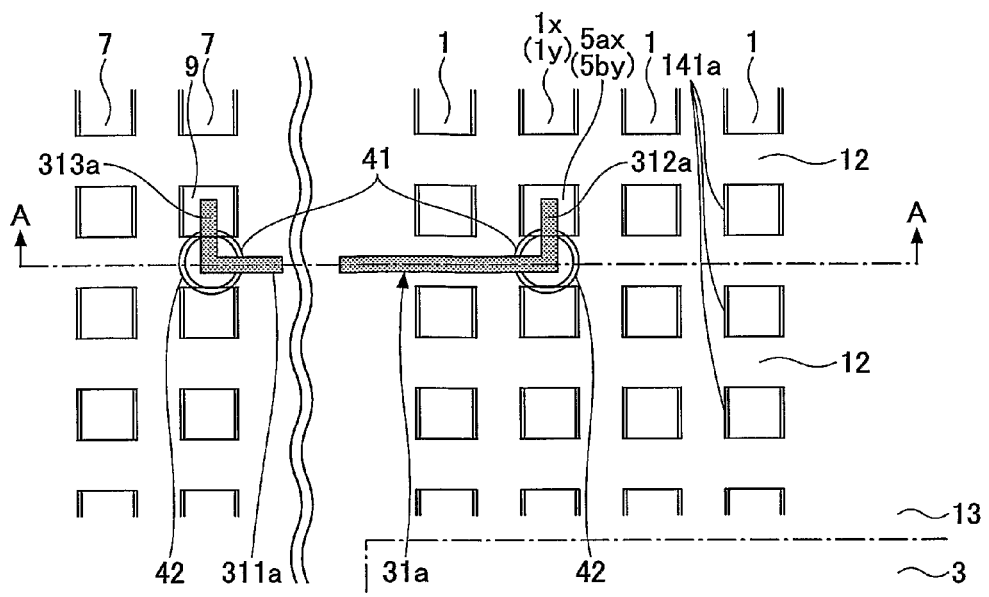
FIGS. 15A through 15C are drawings (1) illustrating shape variations of a wire formed on an array substrate according to the variation of the first, embodiment.
Figure 15B:
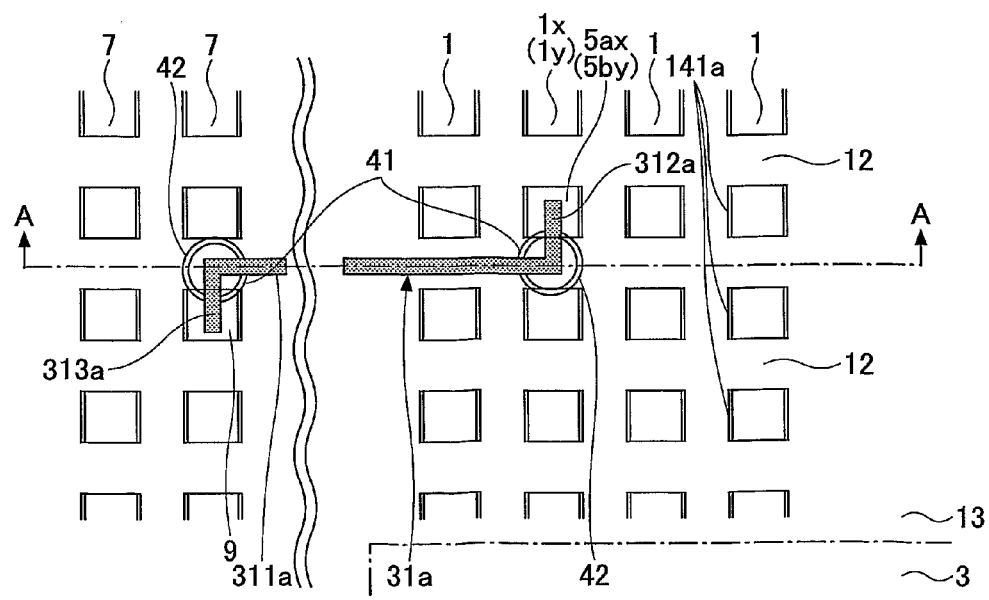
Figure 15C:
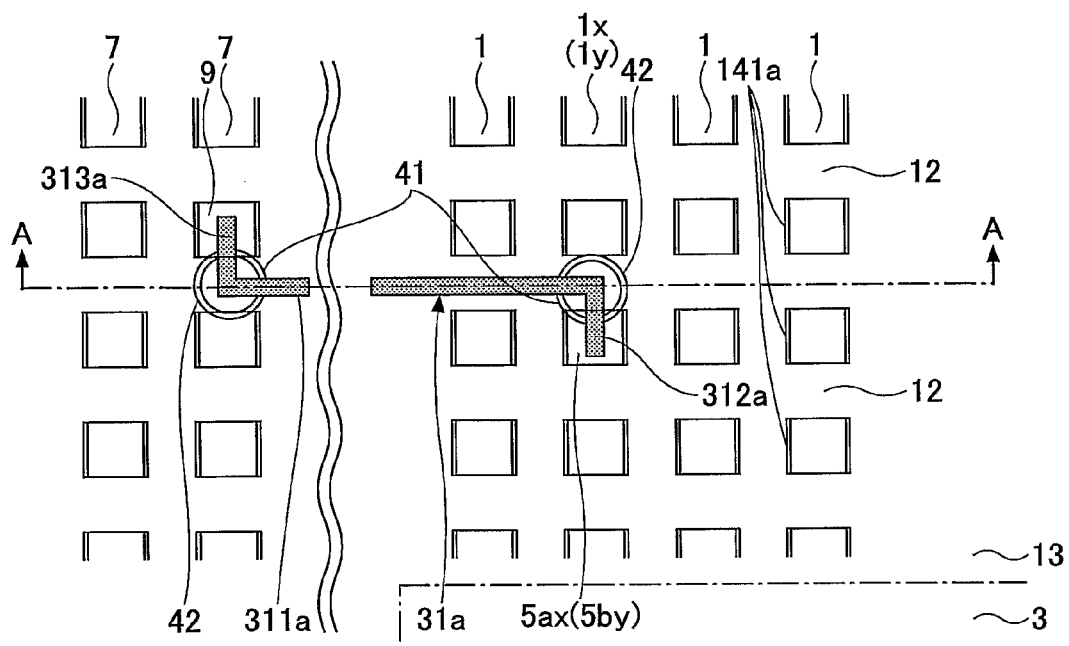

FIGS. 15A through 15C are drawings illustrating shape variations of the wire 31a. As shown in FIGS. 15A through 15C, the wire 31a can take various shapes. FIG. 15A shows the wire 31a having a square-bracket shape with an opening facing upward on the printed page. FIG. 15B shows the wire 31a having the bent part 312a bending upward from the right end of the extending part 311a and the bent part 313a bending downward from the left end of the extending part 311a. FIG. 15C shows the wire 31a having the bent part 312a bending downward from the right end of the extending part 311a and the bent part 313a bending upward from the left end of the extending part 311a. Thus, including the shape shown in FIG. 14A, the wire 31a may take one of the four shapes.

Figure 16A:
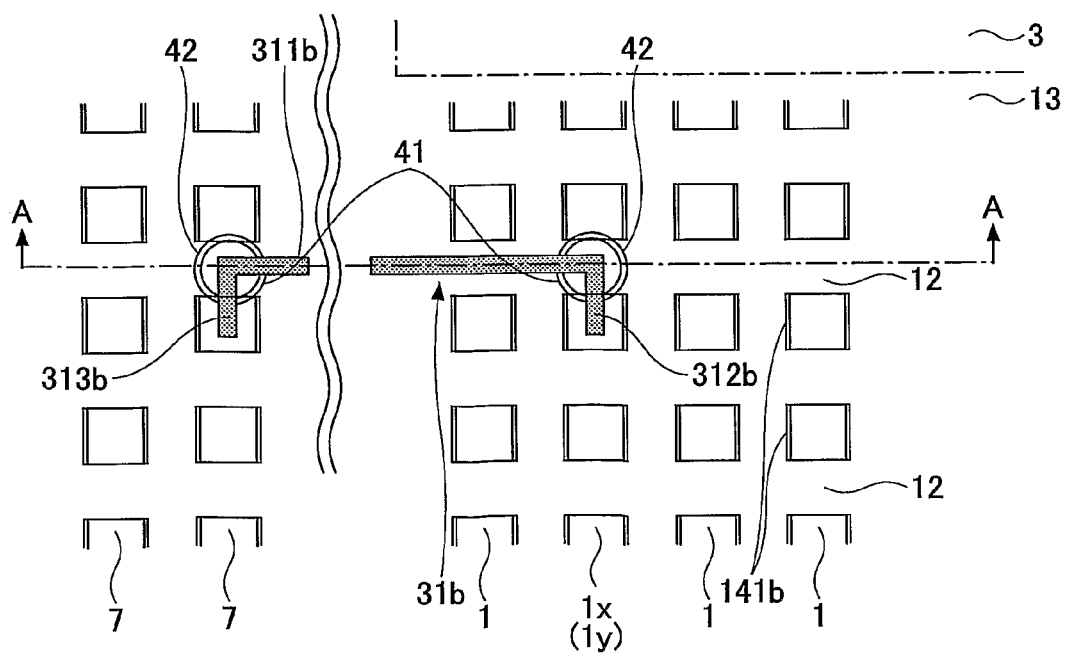
FIGS. 16A through 16C are drawings (2) illustrating shape variations of a wire formed on an array substrate according to the variation of the first embodiment.
Figure 16B:
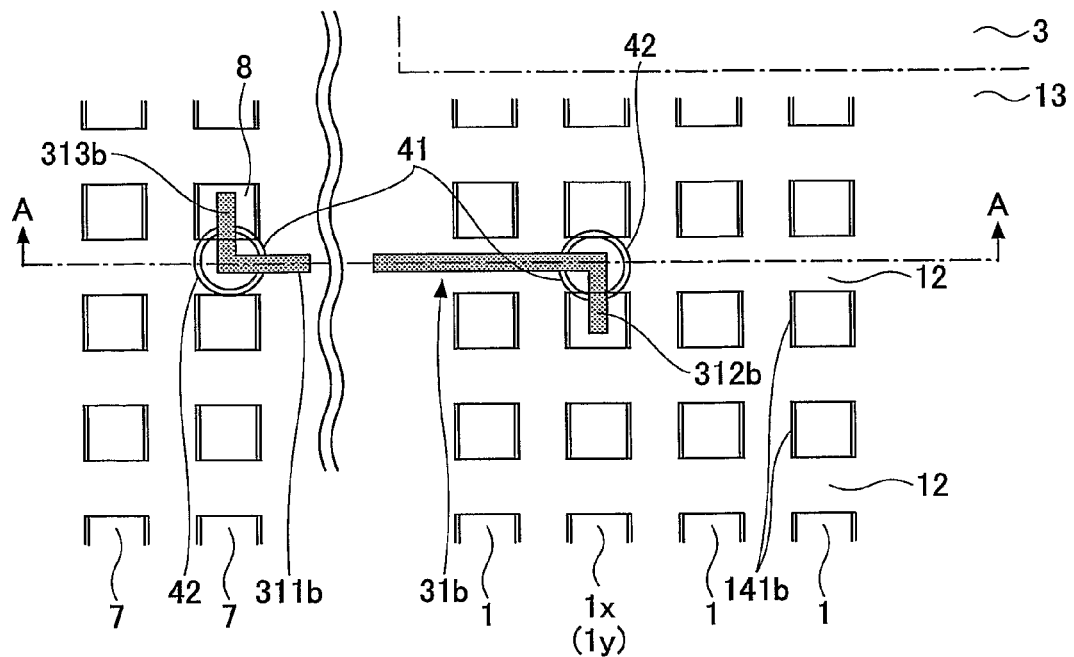
Figure 16C:
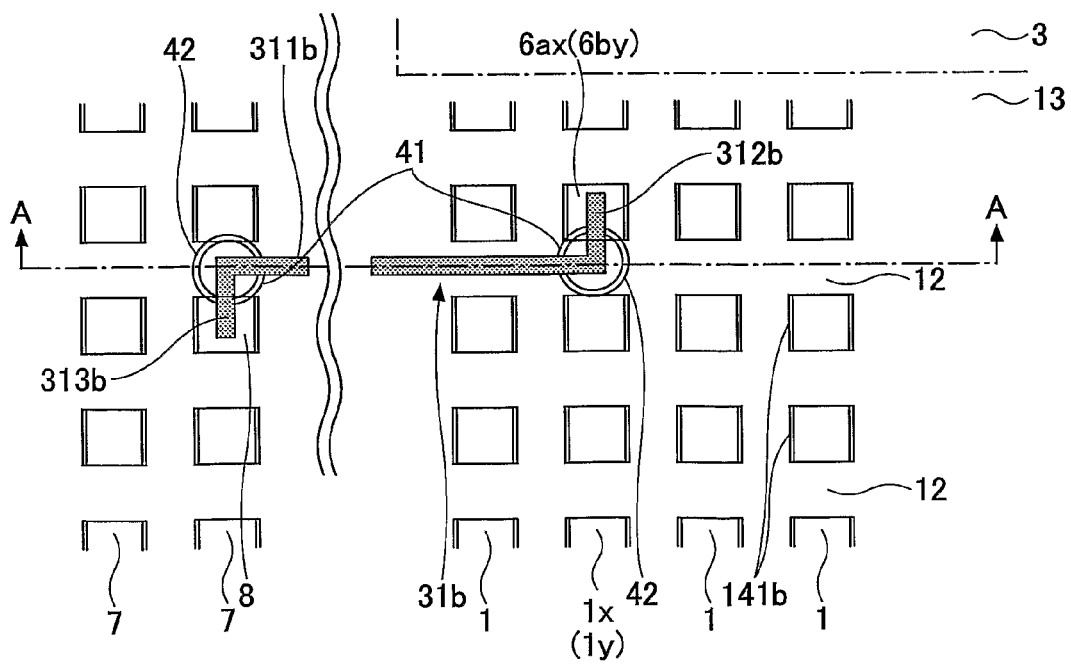

FIGS. 16A through 16C are drawings illustrating shape variations of the wire 31b. As shown in FIGS. 16A through 16C, the wire 31b can take various shapes. FIG. 16A shows the wire 31b having a square-bracket shape with an opening facing downward on the printed page. FIG. 16B shows the wire 31b having the bent part 312b bending downward from the right end of the extending part 311b and the bent part 313b bending upward from the left end of the extending part 311b. FIG. 16C shows the wire 31b having the bent part 312b bending upward from the right end of the extending part 311b and the bent part 313b bending downward from the left end of the extending part 311b. Thus, including the shape shown in FIG. 14A, the wire 31b may take one of the four shapes.

As described above, each of the wire 31a and the wire 31b may take at least four shapes. Therefore, the number of combinations of the shapes of the wire 31a and the wire 31b is at least 4×4=16. Also, multiple wires 31a or wires 31b with different shapes may be formed on the array substrate 60 (60a).

Figure 17A:
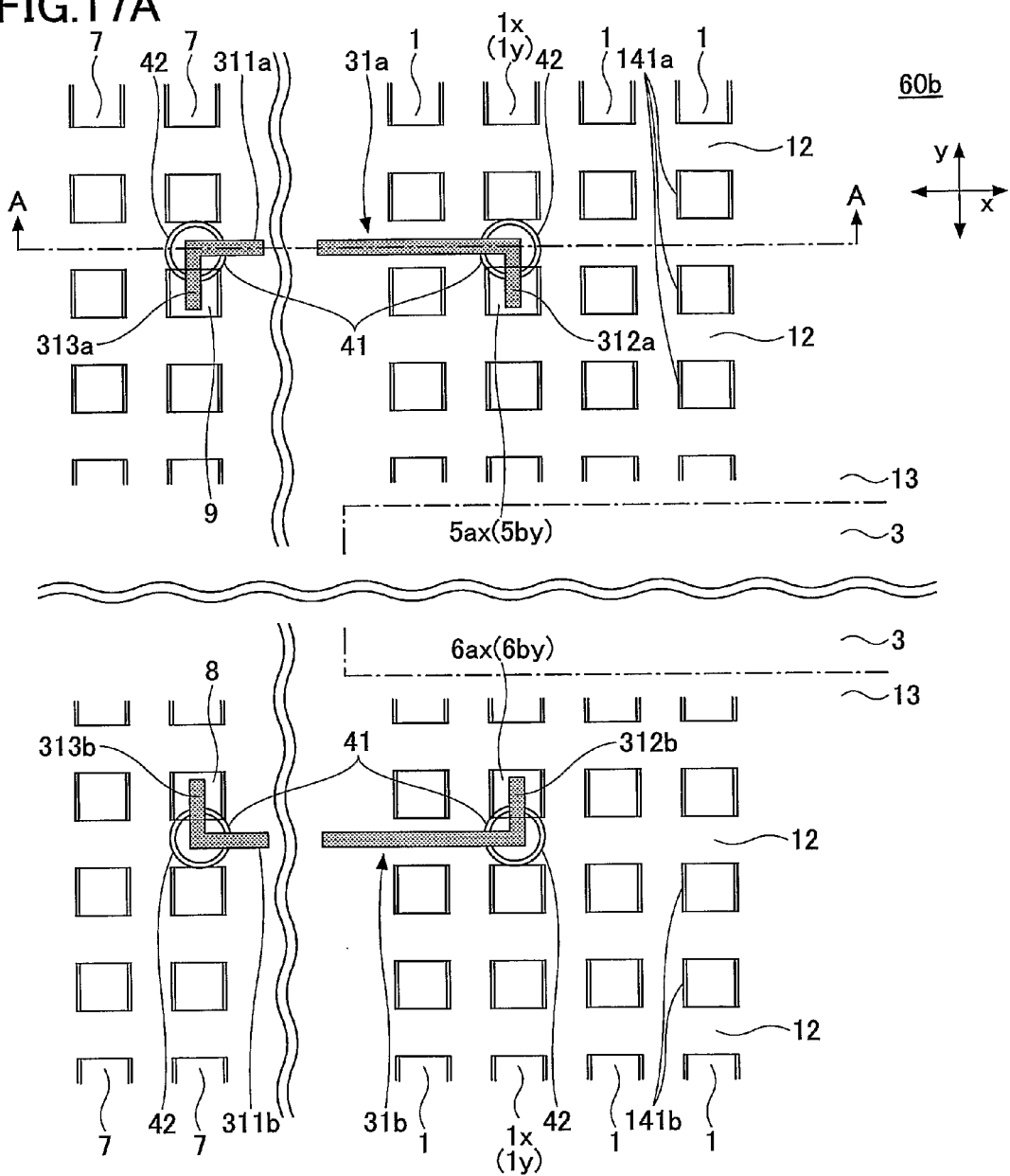
FIGS. 17A and 17B are drawings illustrating an array substrate according to the variation of the first embodiment where a second insulating film is omitted.
Figure 17B:
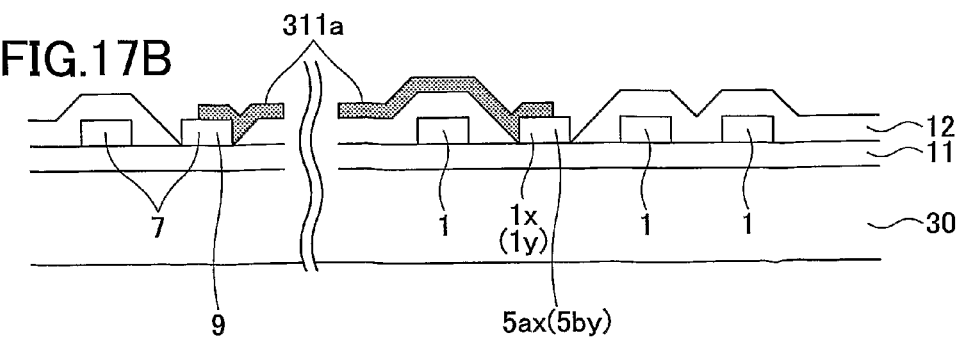

FIGS. 17A and 17B are drawings illustrating an array substrate where the second insulating film is omitted. The array substrate 60a described above with reference to FIGS. 14A and 14B includes the second insulating film 15 formed on the substrate 30. Meanwhile, the second insulating film 15 is omitted in an array substrate 60b shown by FIGS. 17A and 17B.

Similar to the array substrate 60a of FIGS. 14A and 14B, the wires 31a and 31b formed on the array substrate 60b of FIGS. 17A and 17B may have various shapes. For example, the wire 31a may take one of the four shapes shown in FIGS. 15A through 15C and 17A. Also, the wire 31b may take one of the four shapes shown in FIGS. 16A through 16C and 17A. Thus, also in the case of the array substrate 60b of FIGS. 17A and 17B, the number of combinations of the shapes of the wire 31a and the wire 31b is at least 4×4=16. Also, multiple wires 31a or wires 31b with different shapes may be formed on the array substrate 60b.

Figure 18A:
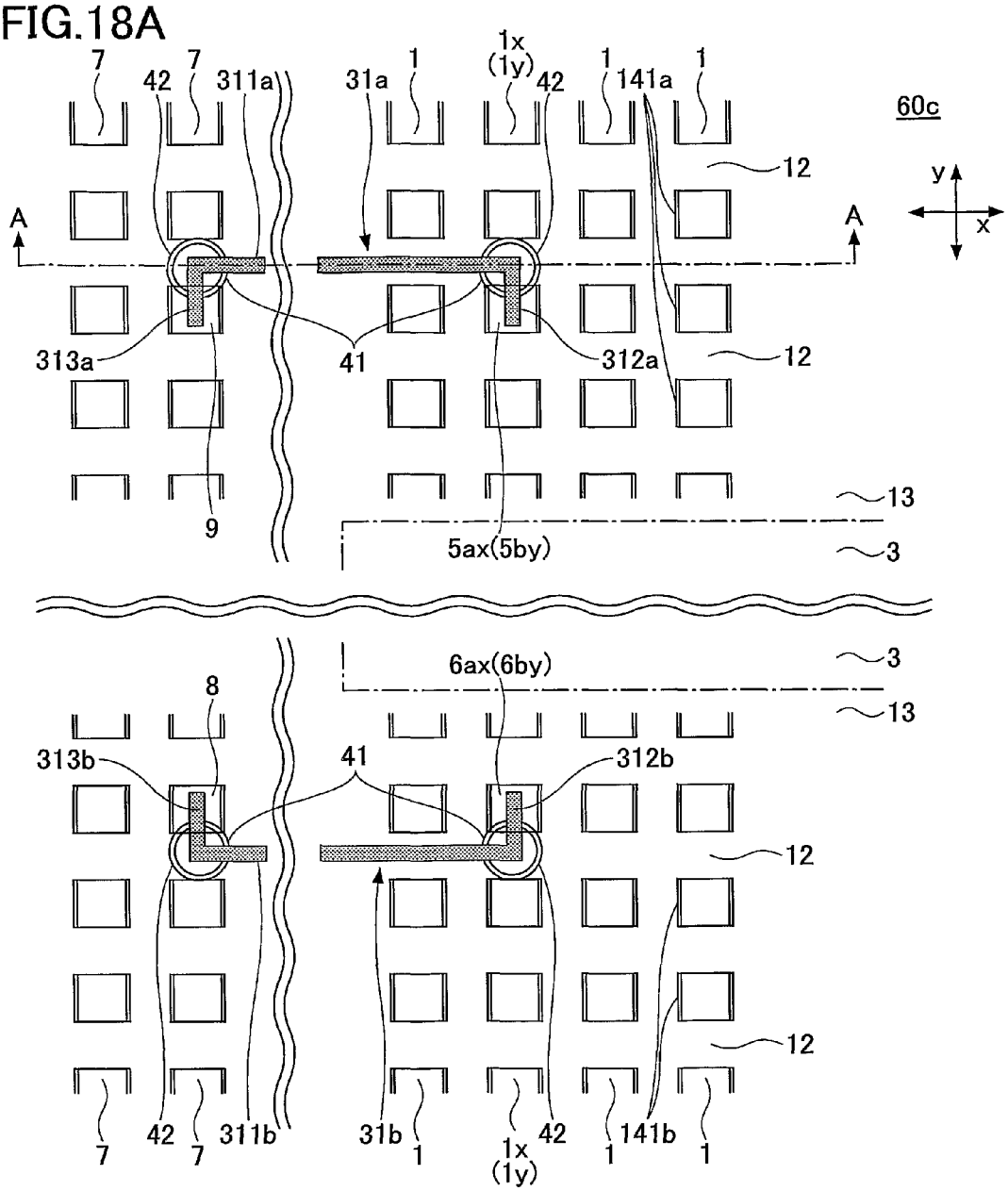
FIGS. 18A and 18B are drawings illustrating an array substrate according to the variation of the first embodiment where a nonconductive film is omitted.
Figure 18B:
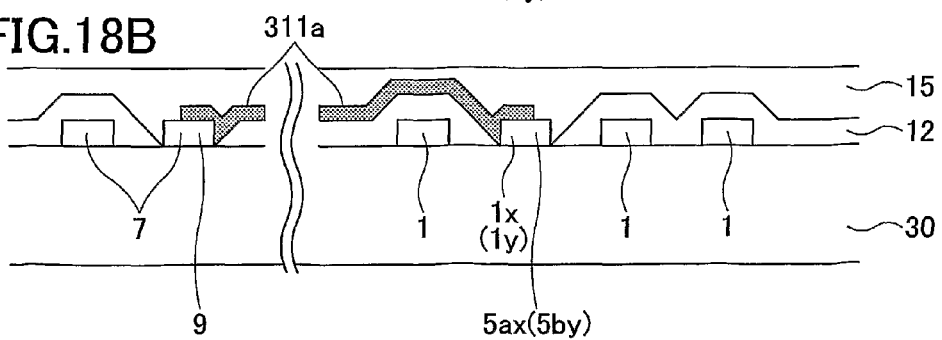

FIGS. 18A and 18B are drawings illustrating an array substrate where the nonconductive film is omitted. The array substrate 60a described above with reference to FIGS. 14A and 14B includes the nonconductive film 11 formed on the substrate 30. Meanwhile, the nonconductive film 11 is omitted in an array substrate 60c shown by FIGS. 18A and 18B.

Similar to the array substrate 60a of FIGS. 14A and 14B, the wires 31a and 31b formed on the array substrate 60c of FIGS. 18A and 18B may have various shapes. For example, the wire 31a may take one of the four shapes shown in FIGS. 15A through 15C and 18A. Also, the wire 31b may take one of the four shapes shown in FIGS. 16A through 16C and 18A. Thus, also in the case of the array substrate 60c of FIGS. 18A and 18B, the number of combinations of the shapes of the wire 31a and the wire 31b is at least 4×4=16. Also, multiple wires 31a or wires 31b with different shapes may be formed on the array substrate 60c.

Figure 19A:
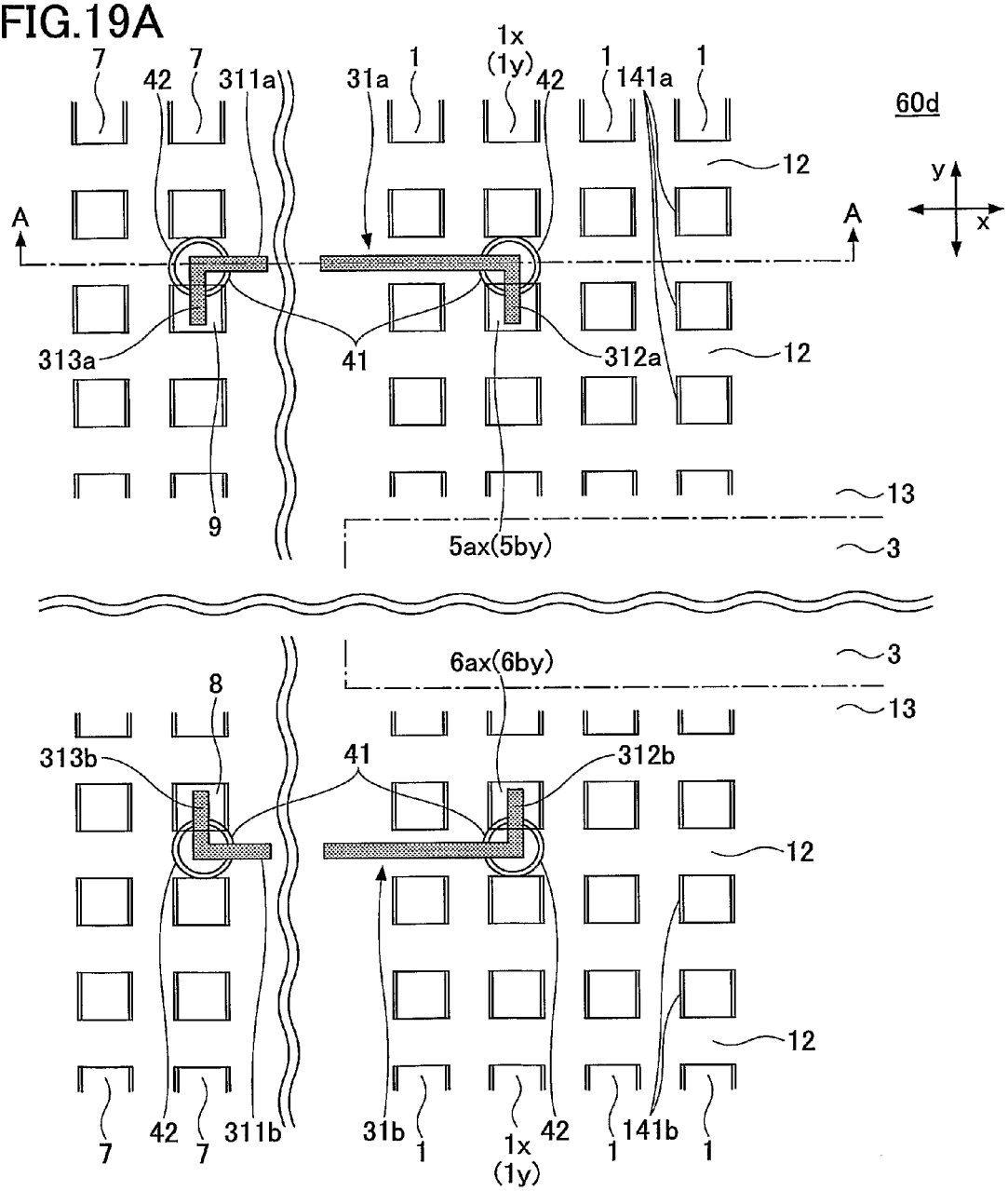
FIGS. 19A and 19B are drawings illustrating an array substrate according to the variation of the first embodiment where a nonconductive film and a second insulating film are omitted.
Figure 19B:
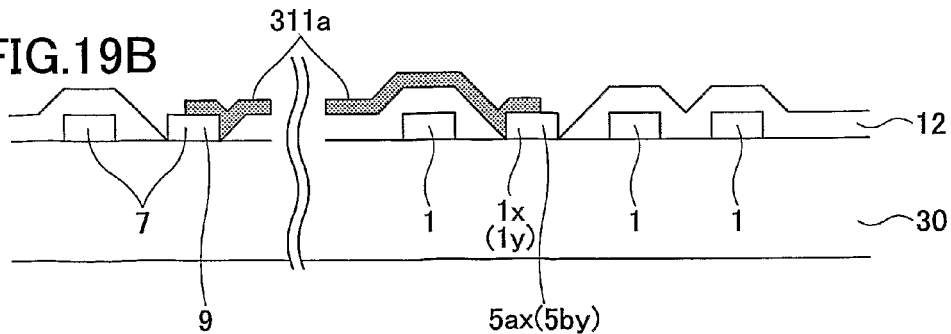

FIGS. 19A and 19B are drawings illustrating an array substrate where the nonconductive film and the second insulating film are omitted. The array substrate 60c shown by FIGS. 18A and 18B includes the second insulating film 15 formed on the substrate 30. Meanwhile, the second insulating film 15 is also omitted in an array substrate 60d shown by FIGS. 19A and 19B.

Similar to the array substrate 60a of FIGS. 14A and 14B, the wires 31a and 31b formed on the array substrate 60d of FIGS. 19A and 19B may have various shapes. For example, the wire 31a may take one of the four shapes shown in FIGS. 15A through 15C and 19A. Also, the wire 31b may take one of the four shapes shown in FIGS. 16A through 16C and 19A. Thus, also in the case of the array substrate 60d of FIGS. 19A and 19B, the number of combinations of the shapes of the wire 31a and the wire 31b is at least 4×4=16. Also, multiple wires 31a or wires 31b with different shapes may be formed on the array substrate 60d.

The angle between the extending part 311a (or 311b) and the bent parts 312a and 313a (or 312b and 313b) of the wire 31a (or 31b) can be defined by an angle 41 or an angle 42. The angle 41 is less than 180 degrees and the angle 42 is obtained by subtracting the angle 41 from 360 degrees. As in the first embodiment, the angle 41 is preferably between 5 and 175 degrees, and more preferably between 45 and 135 degrees.

The openings 141a and 141b may take various shapes in plan view other than a rectangular shape as shown in FIG. 13. Exemplary shapes of the openings 141a and 141b are described with reference to FIGS. 20 through 34.

Figure 20:
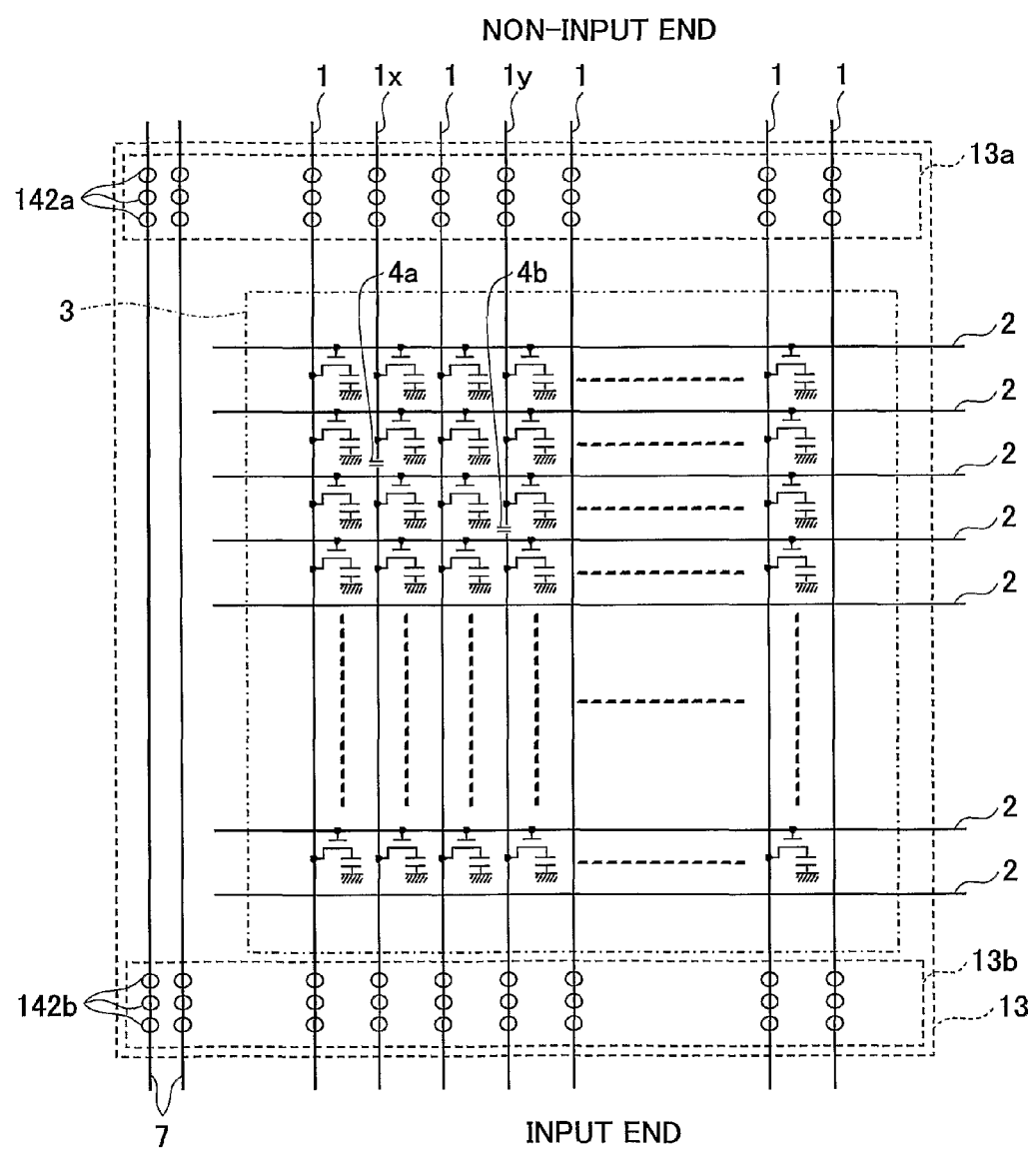
FIG. 20 is a drawing illustrating an array substrate according to the variation of the first embodiment where openings have an oval shape in plan view.

FIG. 20 is a drawing illustrating an array substrate where openings have an oval shape in plan view. FIGS. 21A and 21B are enlarged views of repaired portions in FIG. 20. Different from the openings 141a and 141b shown in FIG. 13 having a rectangular shape, openings 142a and 142b shown in FIGS. 20 and 21A have an oval shape (or a substantially circular shape).

Figure 22:
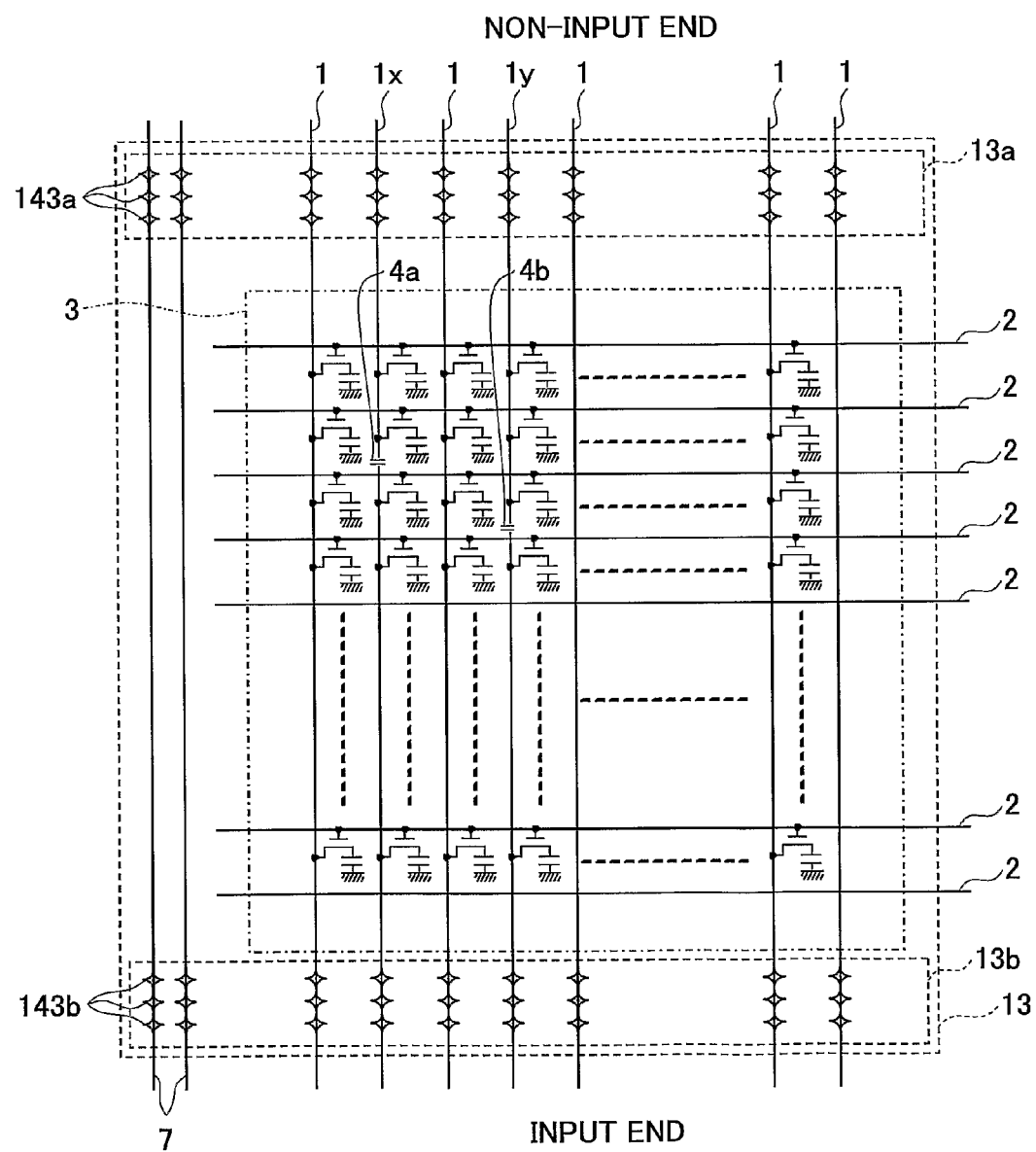
FIG. 22 is a drawing illustrating an array substrate according to the variation of the first embodiment where openings have a shape formed by four curved lines in plan view.
Figure 23A:
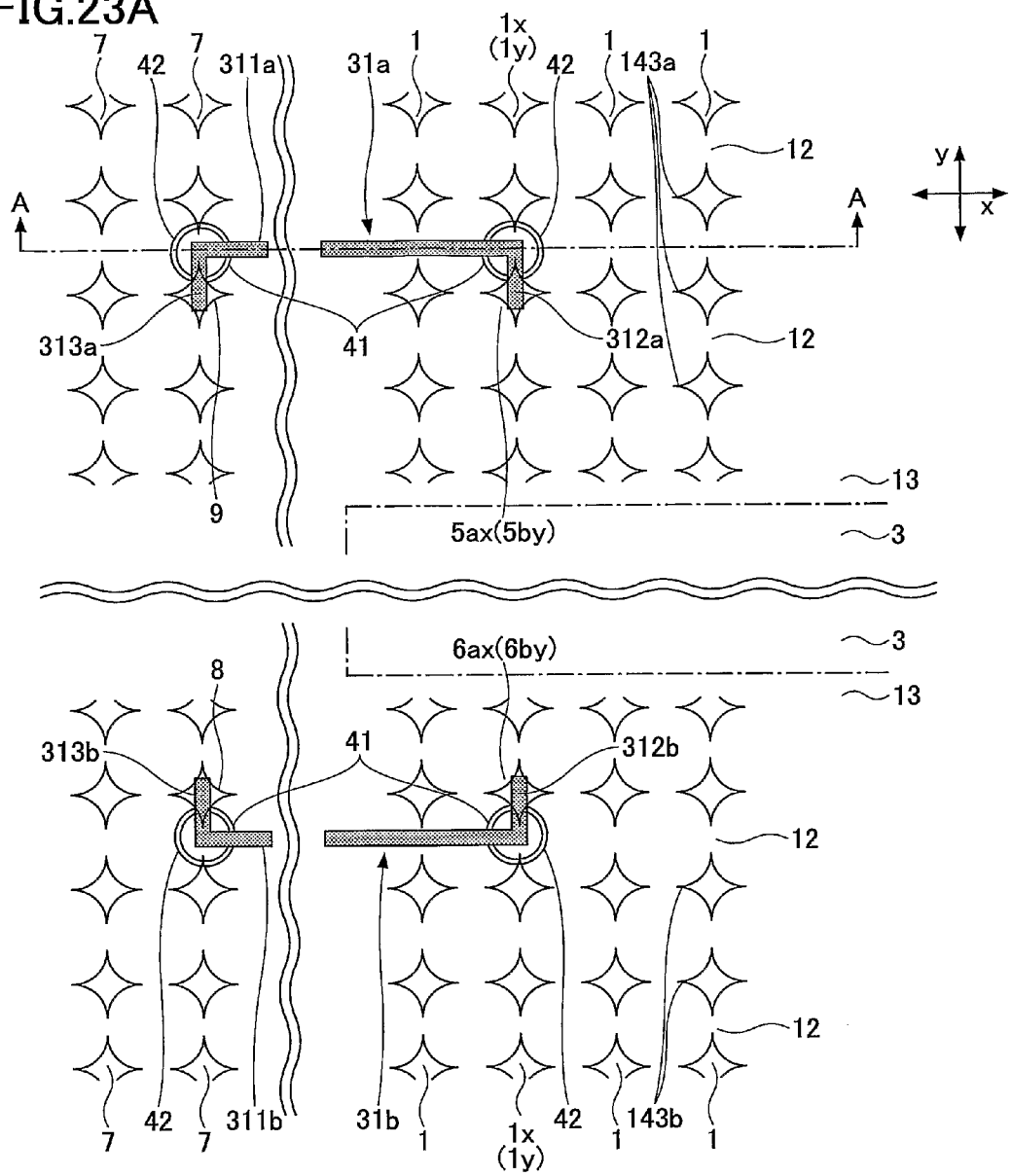
FIGS. 23A and 23B are enlarged views of repaired portions in FIG. 22.
Figure 23B:
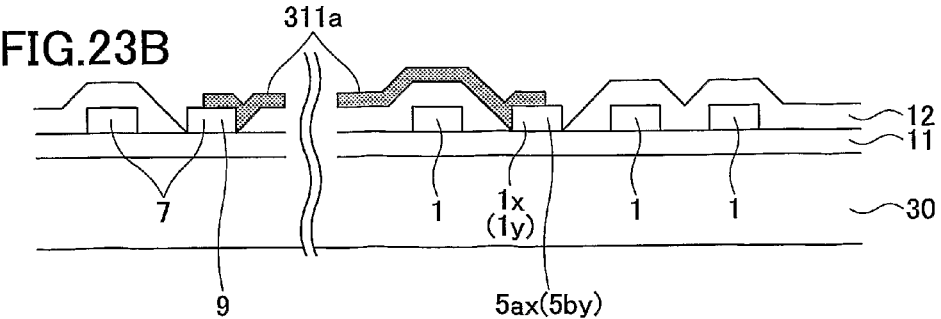

FIG. 22 is a drawing illustrating an array substrate where openings have a shape formed by four lines curving inwards in plan view. FIGS. 23A and 23B are enlarged views of repaired portions in FIG. 22. Openings 143a and 143b shown in FIGS. 22 and 23A have a shape formed by four lines curving inwards. In other words, each of the openings 143a and 143b is defined by curved lines of four oval shapes (or circular shapes). Alternatively, the openings 143a and 143b may have a shape formed by three, or five or more lines curving inwards (i.e., a shape defined by curved lines of three, or five or more oval (or circular) shapes).

Figure 24:
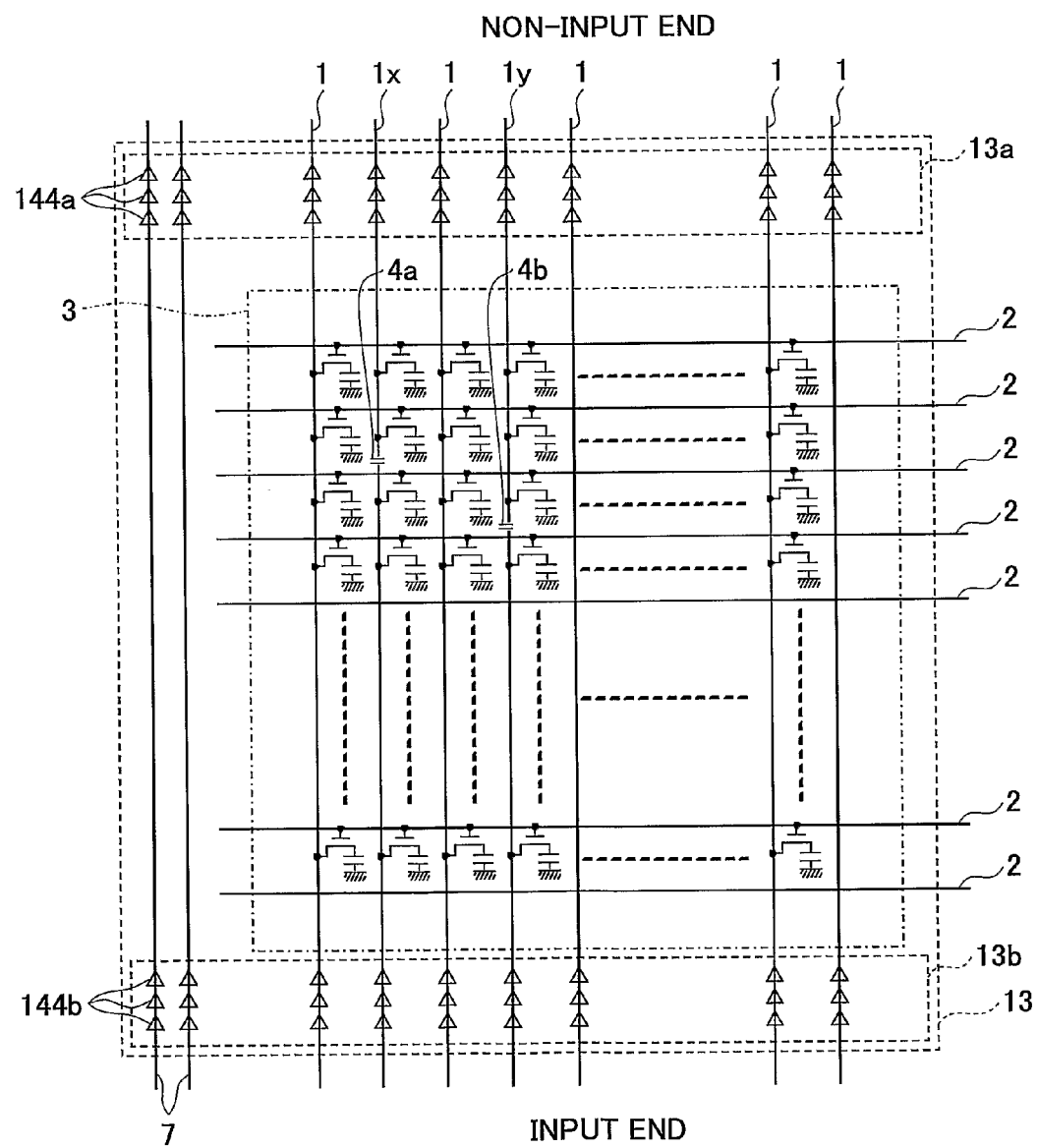
FIG. 24 is a drawing illustrating an array substrate according to the variation of the first embodiment where openings have a triangular shape in plan view.
Figure 25A:
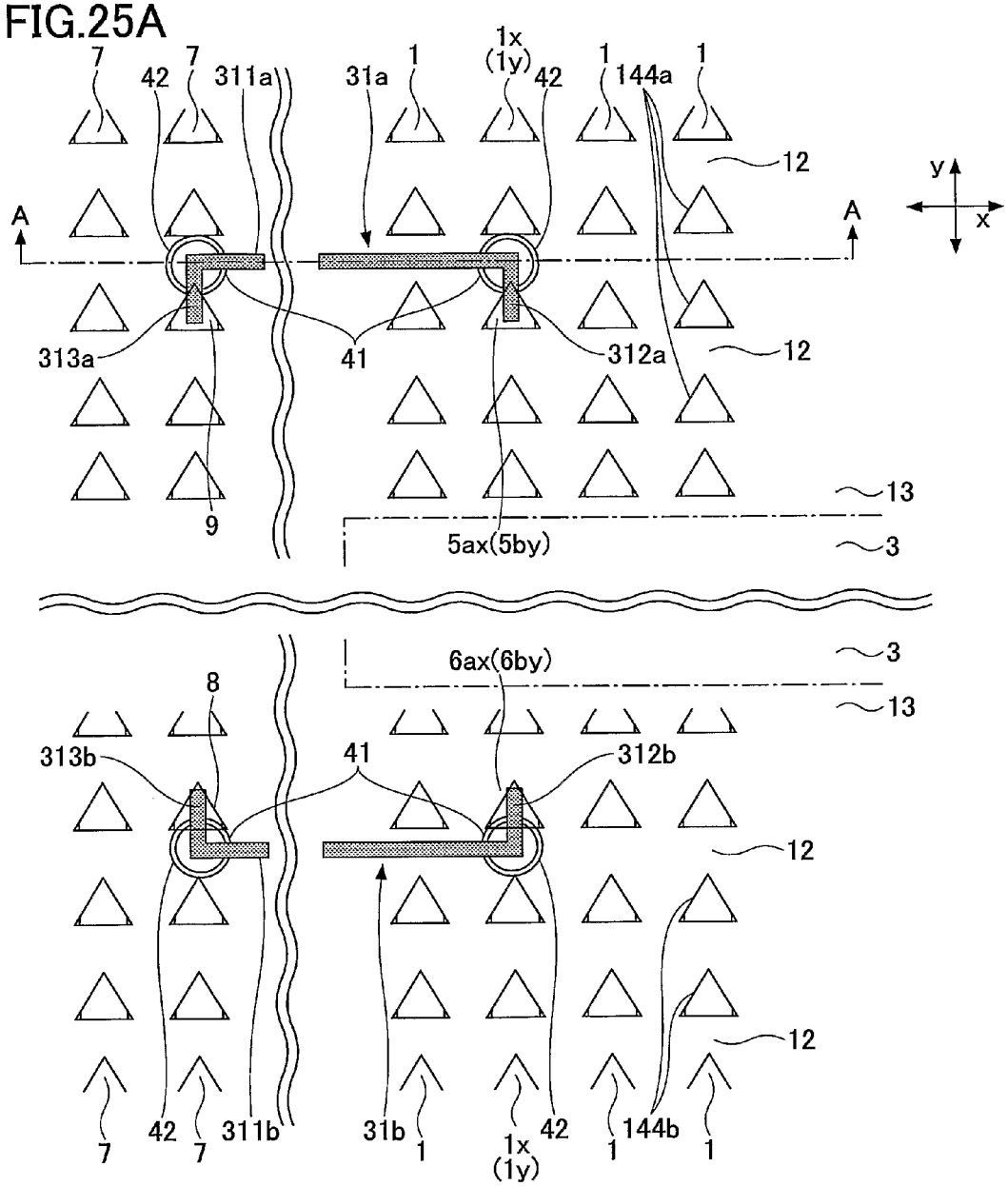
FIGS. 25A and 25B are enlarged views of repaired portions in FIG. 24.
Figure 25B:
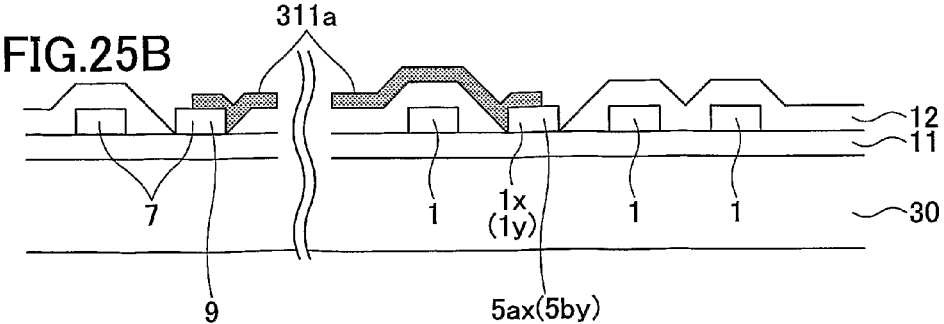

FIG. 24 is a drawing illustrating an array substrate where openings have a triangular shape in plan view. FIGS. 25A and 25B are enlarged views of repaired portions in FIG. 24. Different from the openings 141a and 141b shown in FIG. 13 having a rectangular shape, openings 144a and 144b shown in FIGS. 24 and 25A have a triangular shape.

Figure 26:
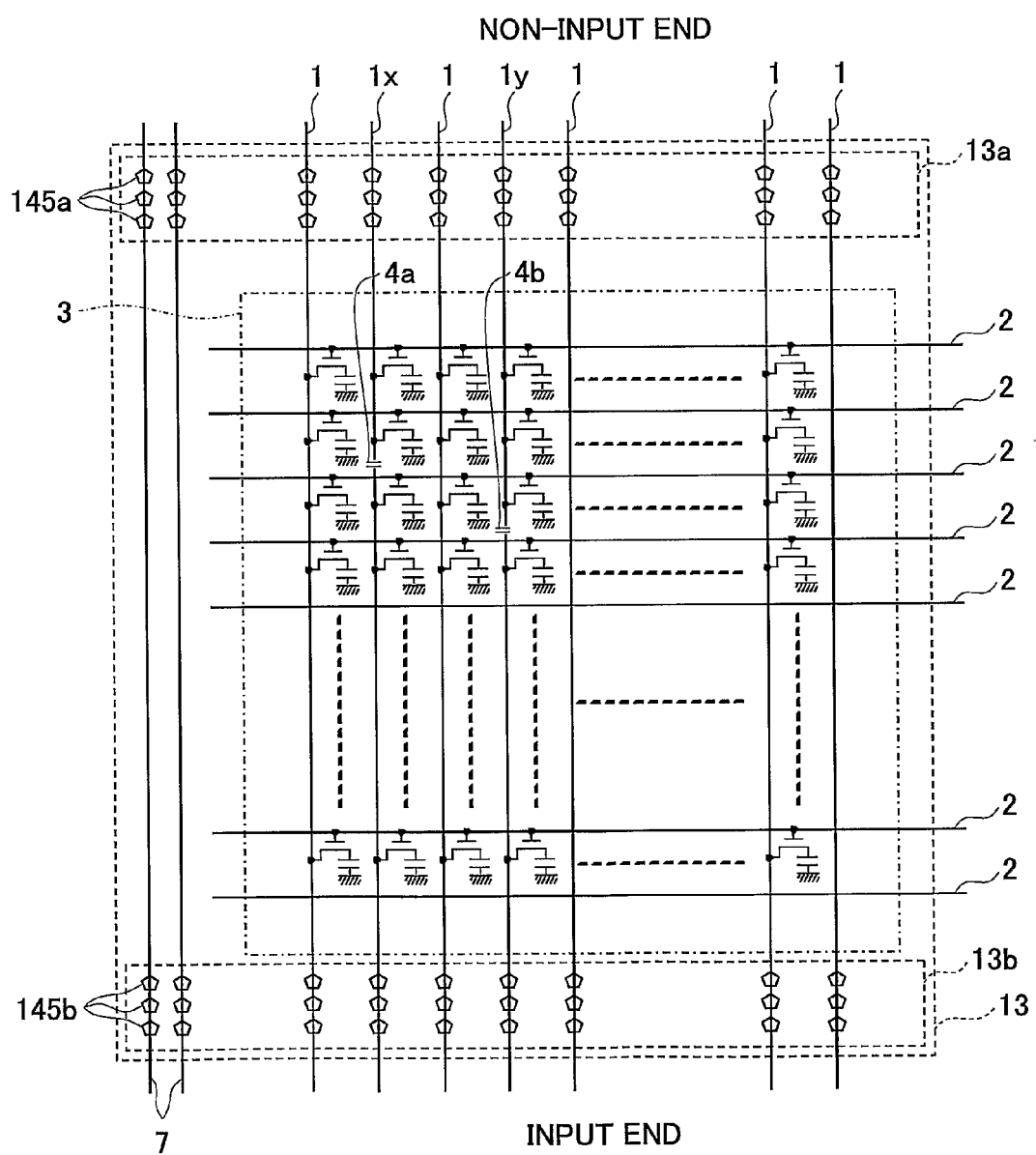
FIG. 26 is a drawing illustrating an array substrate according to the variation of the first embodiment where openings have a pentagonal shape in plan view.
Figure 27A:
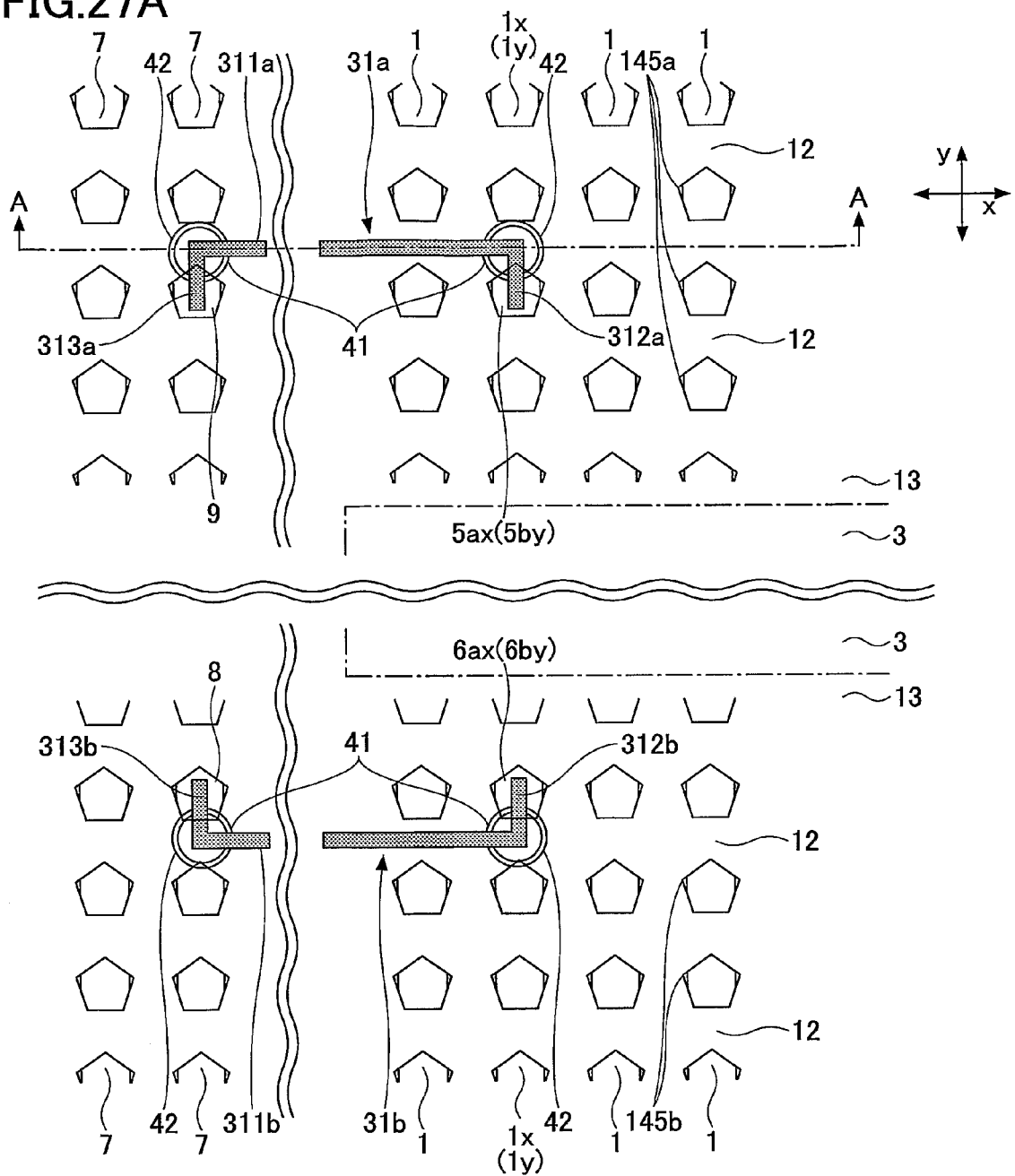
FIGS. 27A and 27B are enlarged views of repaired portions in FIG. 26.
Figure 27B:
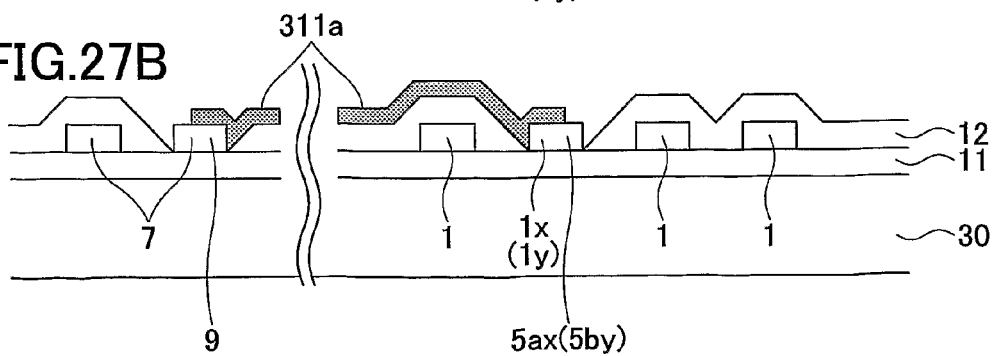

FIG. 26 is a drawing illustrating an array substrate where openings have a pentagonal shape in plan view. FIGS. 27A and 27B are enlarged views of repaired portions in FIG. 26. Different from the openings 141a and 141b shown in FIG. 13 having a rectangular shape, openings 145a and 145b shown in FIGS. 26 and 27A have a pentagonal shape.

Figure 28:
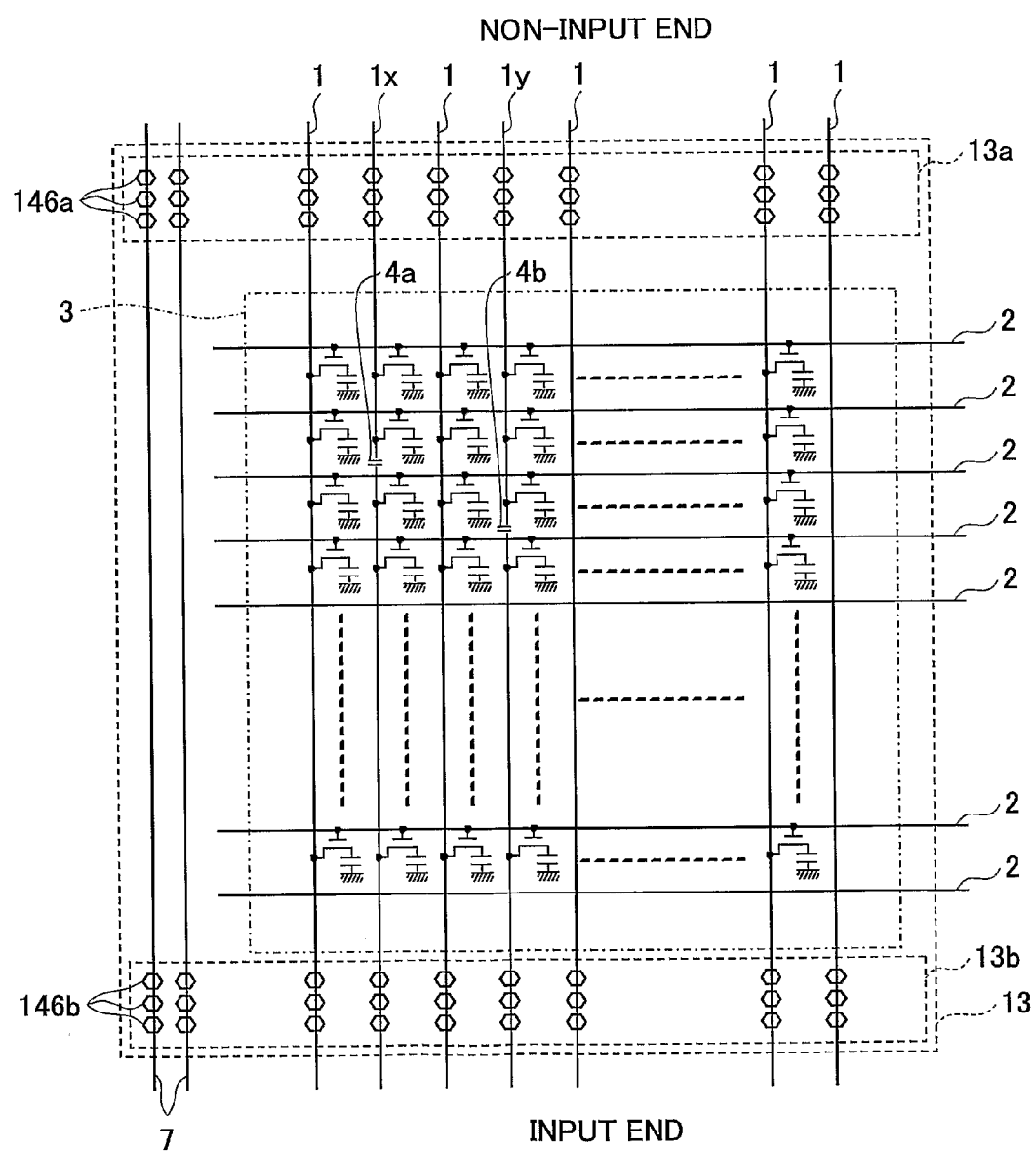
FIG. 28 is a drawing illustrating an array substrate according to the variation of the first embodiment where openings have a hexagonal shape in plan view.

FIG. 28 is a drawing illustrating an array substrate where openings have a hexagonal shape in plan view. FIGS. 29A and 29B are enlarged views of repaired portions in FIG. 28. Different from the openings 141a and 141b shown in FIG. 13 having a rectangular shape, openings 146a and 146b shown in FIGS. 28 and 29A have a hexagonal shape.

Figure 30:
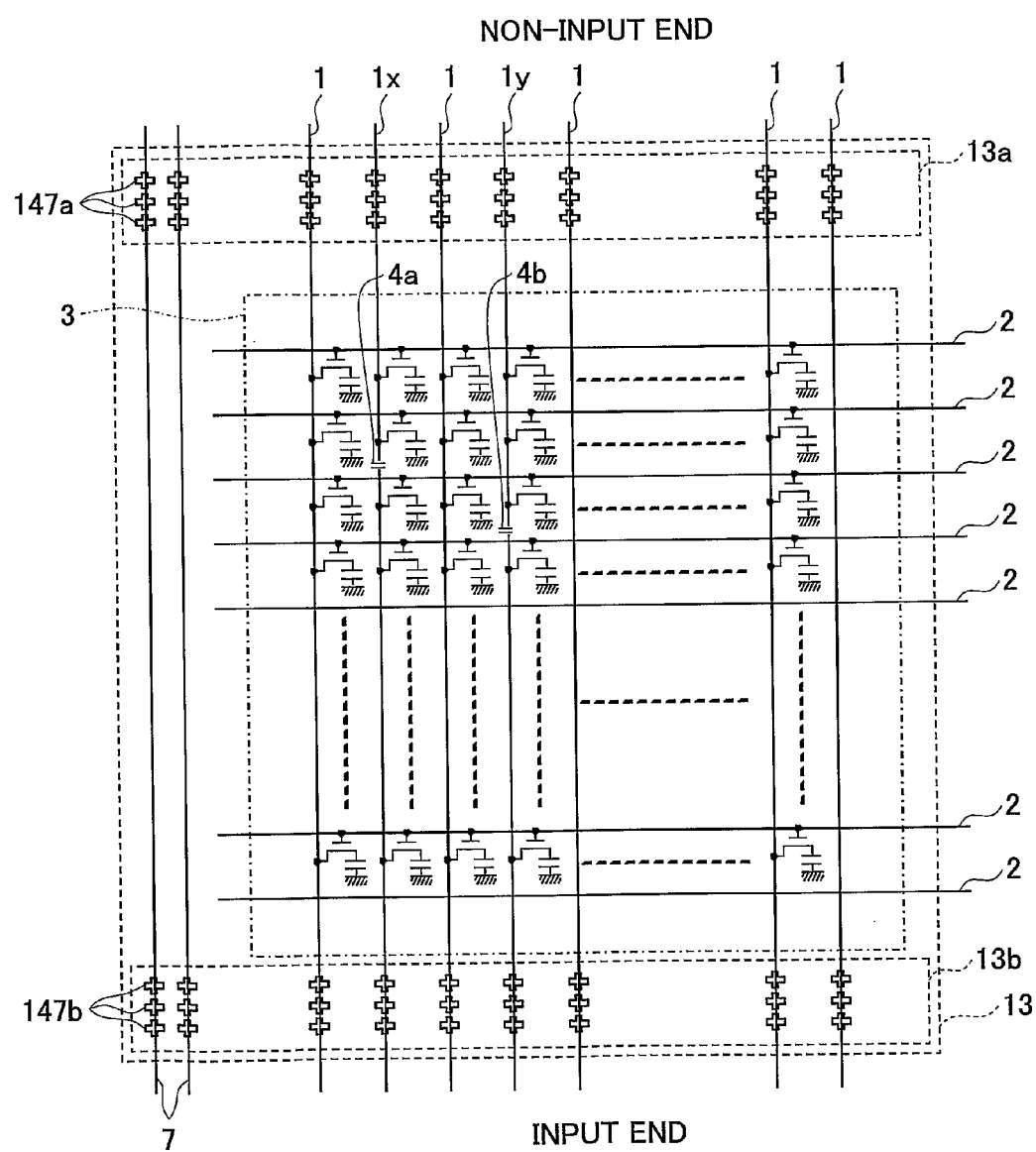
FIG. 30 is a drawing illustrating an array substrate according to the variation of the first embodiment where openings have a cross shape in plan view.
Figure 31A:
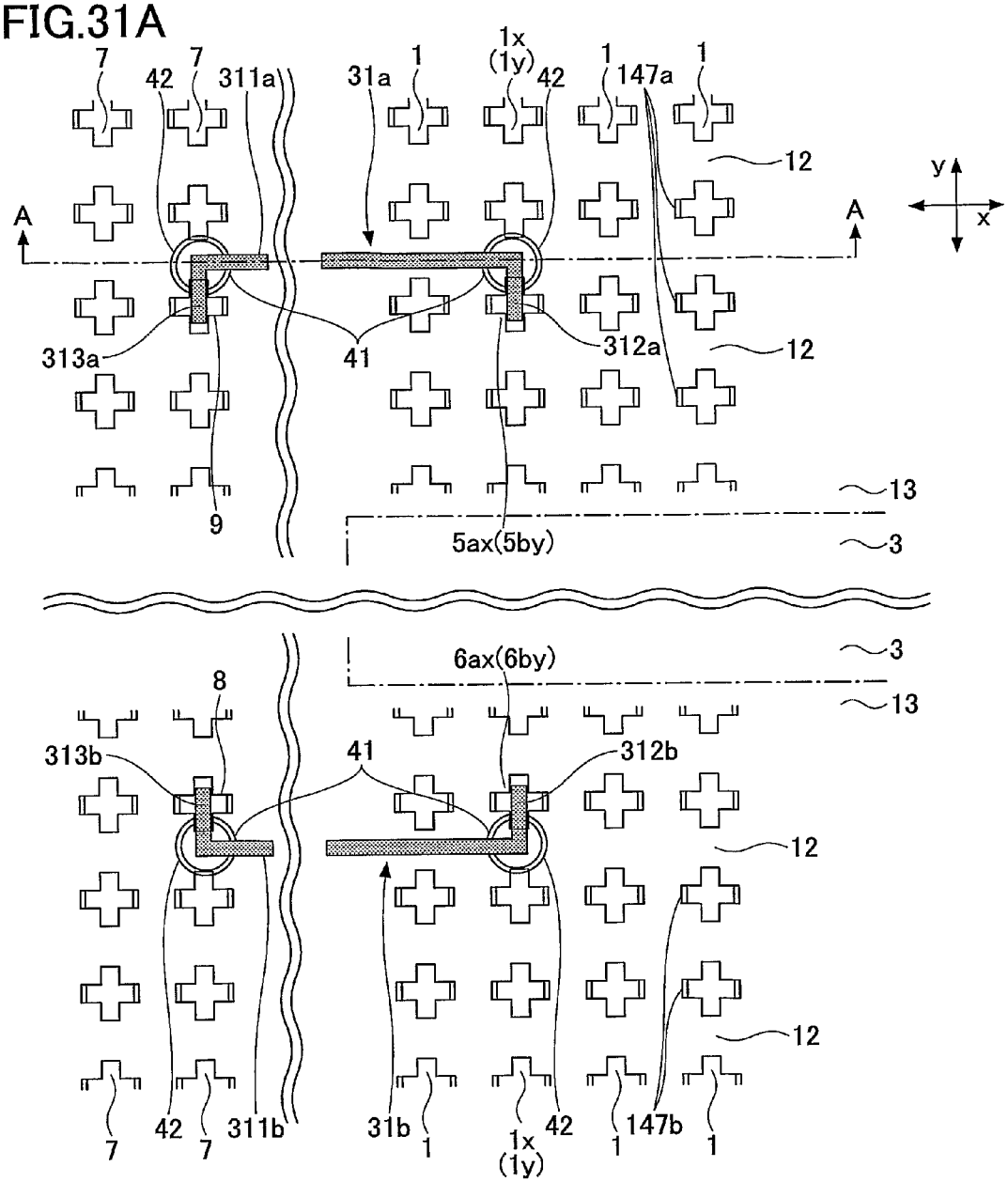
FIGS. 31A and 31B are enlarged views of repaired portions in FIG. 30.
Figure 31B:
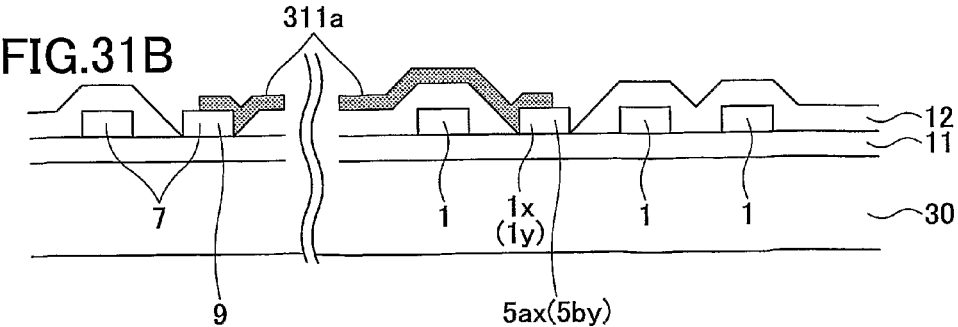

FIG. 30 is a drawing illustrating an array substrate where openings have a cross shape in plan view. FIGS. 31A and 31B are enlarged views of repaired portions in FIG. 30. Different from the openings 141a and 141b shown in FIG. 13 having a rectangular shape, openings 147a and 147b shown in FIGS. 30 and 31A have a cross shape.

Figure 32:
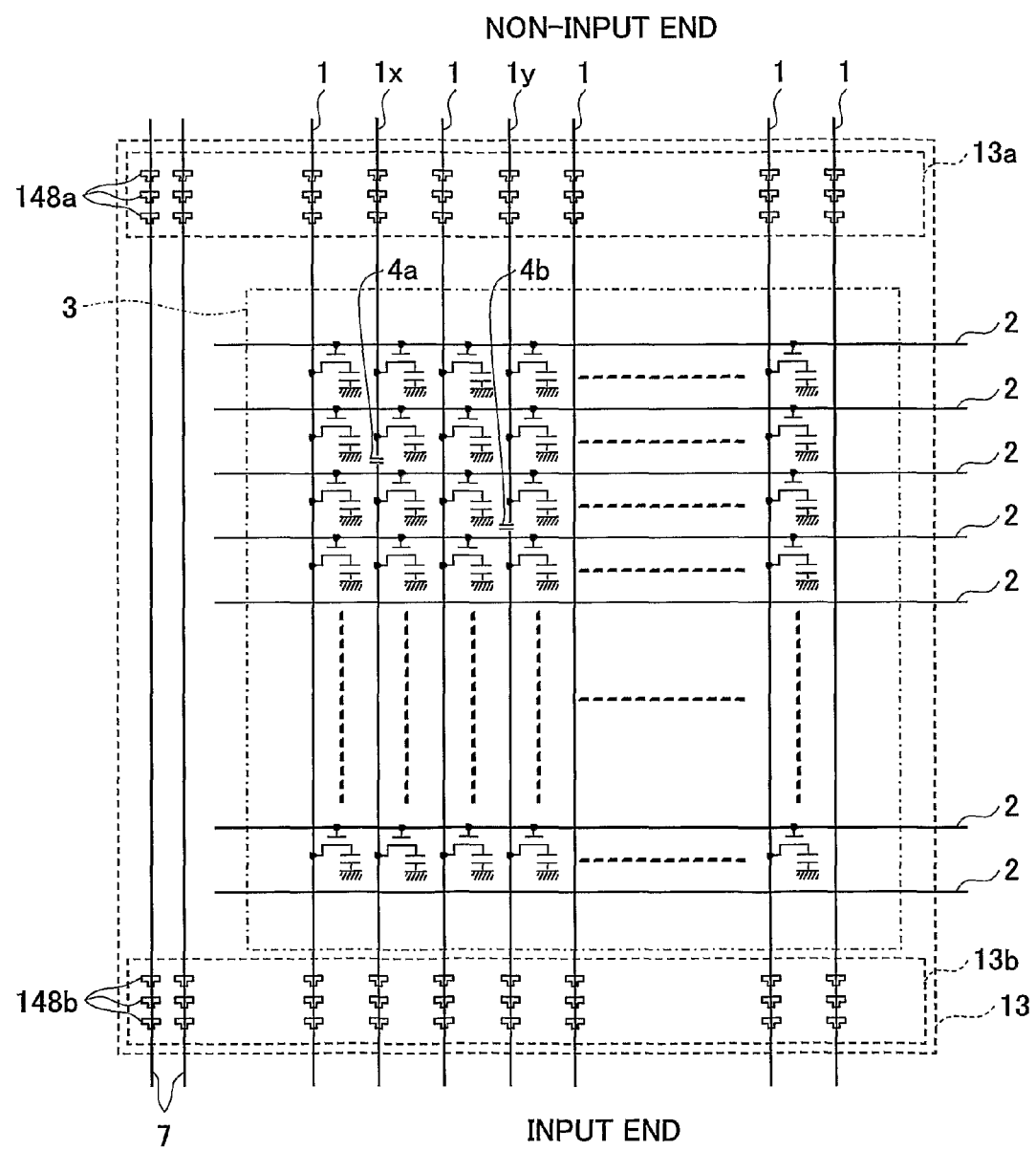
FIG. 32 is a drawing illustrating an array substrate according to the variation of the first embodiment where openings have a projecting shape in plan view.
Figure 33A:
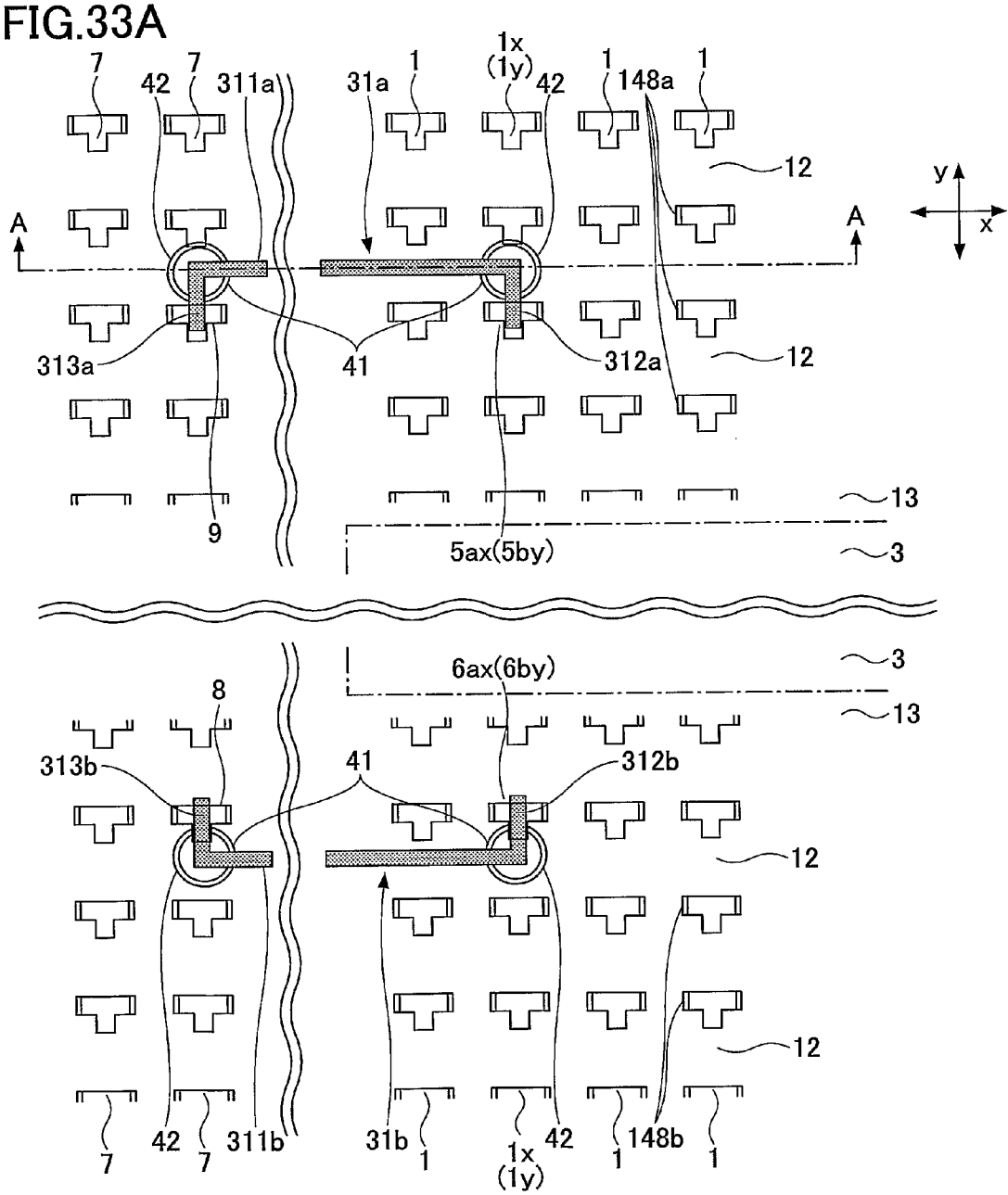
FIGS. 33A and 33B are enlarged views of repaired portions in FIG. 32.
Figure 33B:
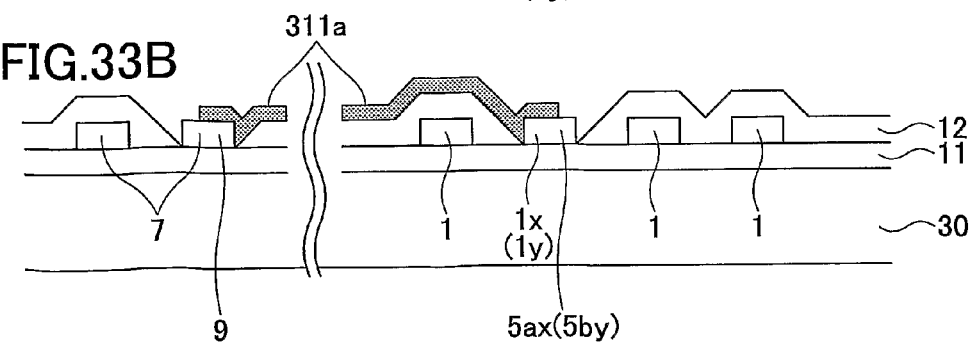

FIG. 32 is a drawing illustrating an array substrate where openings have a projecting shape in plan view. FIGS. 33A and 33B are enlarged views of repaired portions in FIG. 32. Different from the openings 141a and 141b shown in FIG. 13 having a rectangular shape, openings 148a and 148b shown in FIGS. 32 and 33A have a projecting shape composed of a rectangle and a square projecting from the rectangle.

Figure 34:
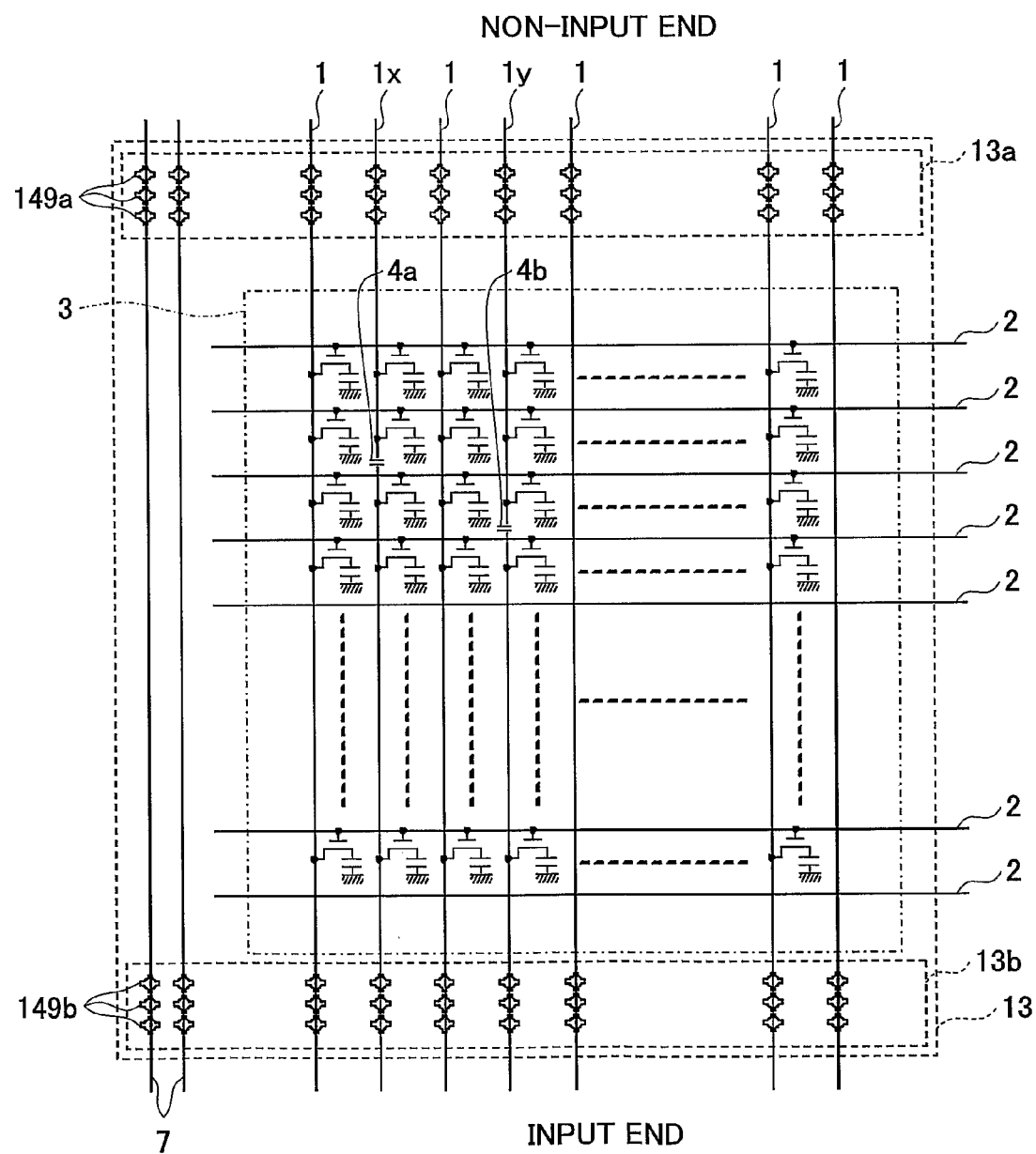
FIG. 34 is a drawing illustrating an array substrate according to the variation of the first embodiment where openings have a combined shape of a circle and a cross in plan view.
Figure 35A:
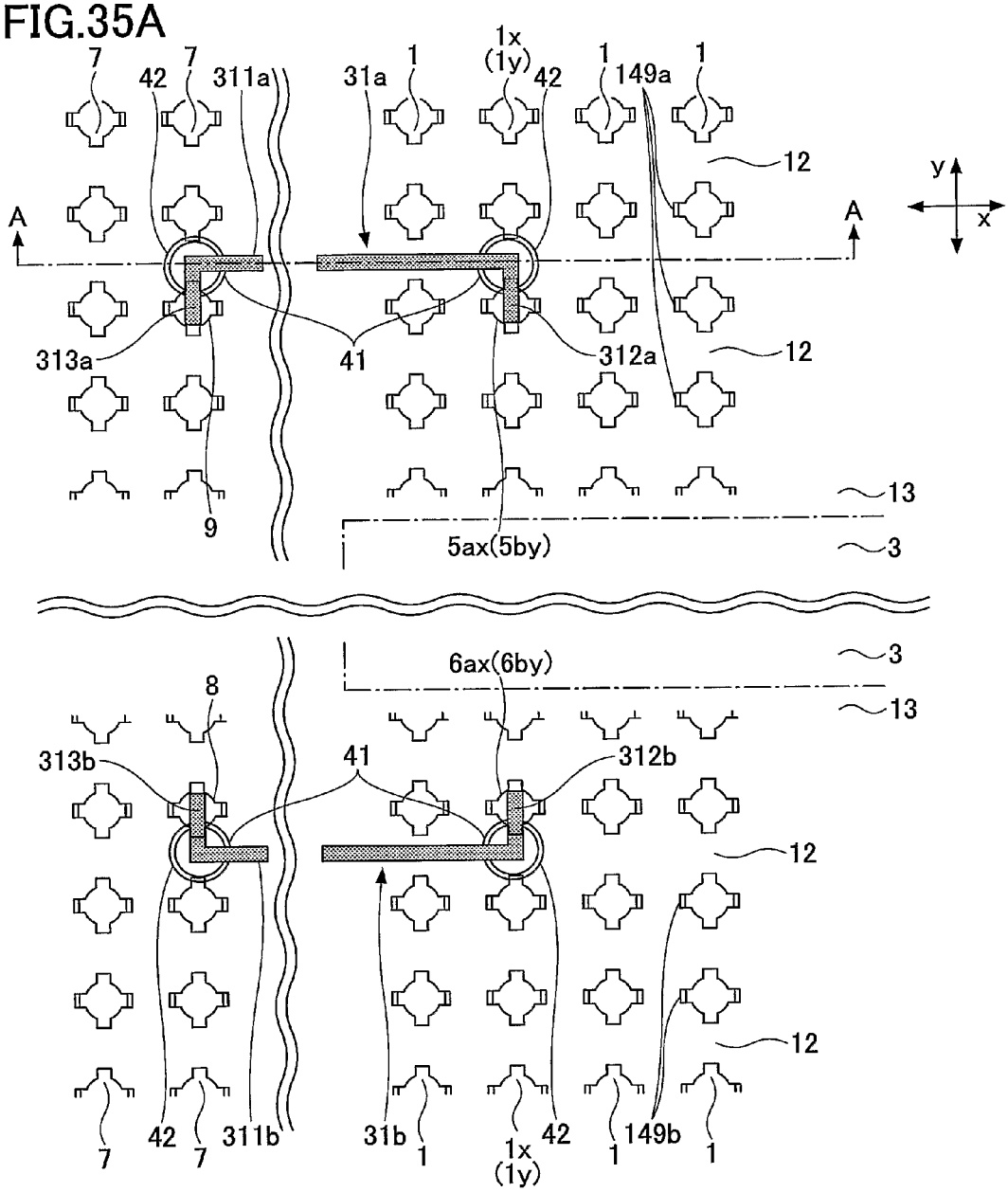
FIGS. 35A and 35B are enlarged views of repaired portions in FIG. 34.
Figure 35B:
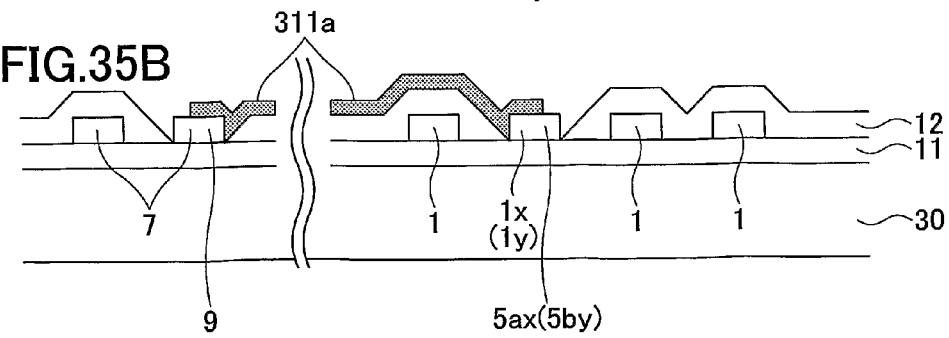

FIG. 34 is a drawing illustrating an array substrate where openings have a combined shape of a circle and a cross in plan view. FIGS. 35A and 35B are enlarged views of repaired portions in FIG. 34. Different from the openings 141a and 141b shown in FIG. 13 having a rectangular shape, openings 149a and 149b shown in FIGS. 34 and 35A have a combined shape of a circle and a cross.

In addition to the above described shapes, openings may have any other shape obtained by combining two or more shapes. Also, openings may have any polygonal shape with various interior angles. Further, shapes of openings may be rotated independently of each other in plan view.

A display device repairing method of this variation is substantially the same as that of the first embodiment.

Thus, the above variation of the first embodiment also provides a display device including an array substrate with a configuration that makes it possible to repair broken lines as well as to reduce cross capacitance and leakage.

The switching elements 51 of the array substrate 60 may be implemented by amorphous silicon thin-film transistors (a-Si TFT), polysilicon thin-film transistors (p-Si TFT), or organic thin-film transistors (O-TFT). Other types of switching elements similar to the above thin-film transistors may also be used. The display device of this variation may be implemented, for example, as a liquid crystal display, an organic EL display, or a plasma display panel (PDP).

Second Embodiment

A second embodiment of the present invention is described below with reference to FIGS. 36 through 50.

Figure 36:
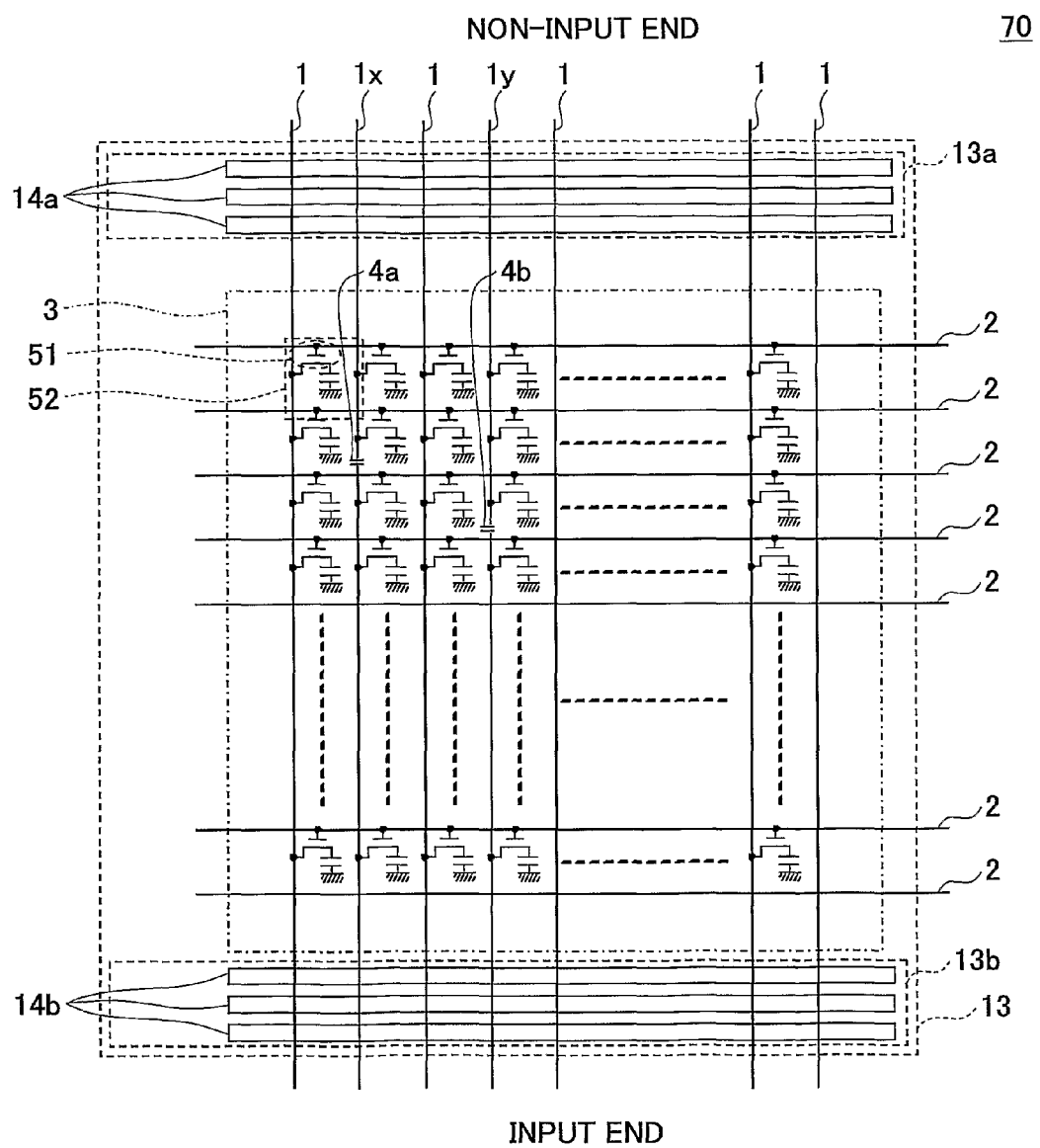
FIG. 36 is a drawing illustrating a configuration of an array substrate of a display device according to a second embodiment of the present invention.

FIG. 36 is a drawing illustrating a configuration of an array substrate of a display device of the second embodiment.

An array substrate of the second embodiment is different from an array substrate of the first embodiment in that backup lines are not formed in advance.

In the first embodiment, backup lines for signal lines or scan lines are formed in advance, and if a break of a signal line or a scan line is found in a display area (active matrix area), the break is repaired by connecting input and non-input ends of the broken signal or scan line via one of the backup lines and wires formed through openings in an area outside of the display area. Meanwhile, in the second embodiment, backup lines for signal lines or scan lines are not formed in advance, and if a break of a signal line or a scan line is found, the break is repaired by connecting input and non-input ends of the broken signal or scan line by forming a wire through openings in an area outside of the display area.

Figure 38A:
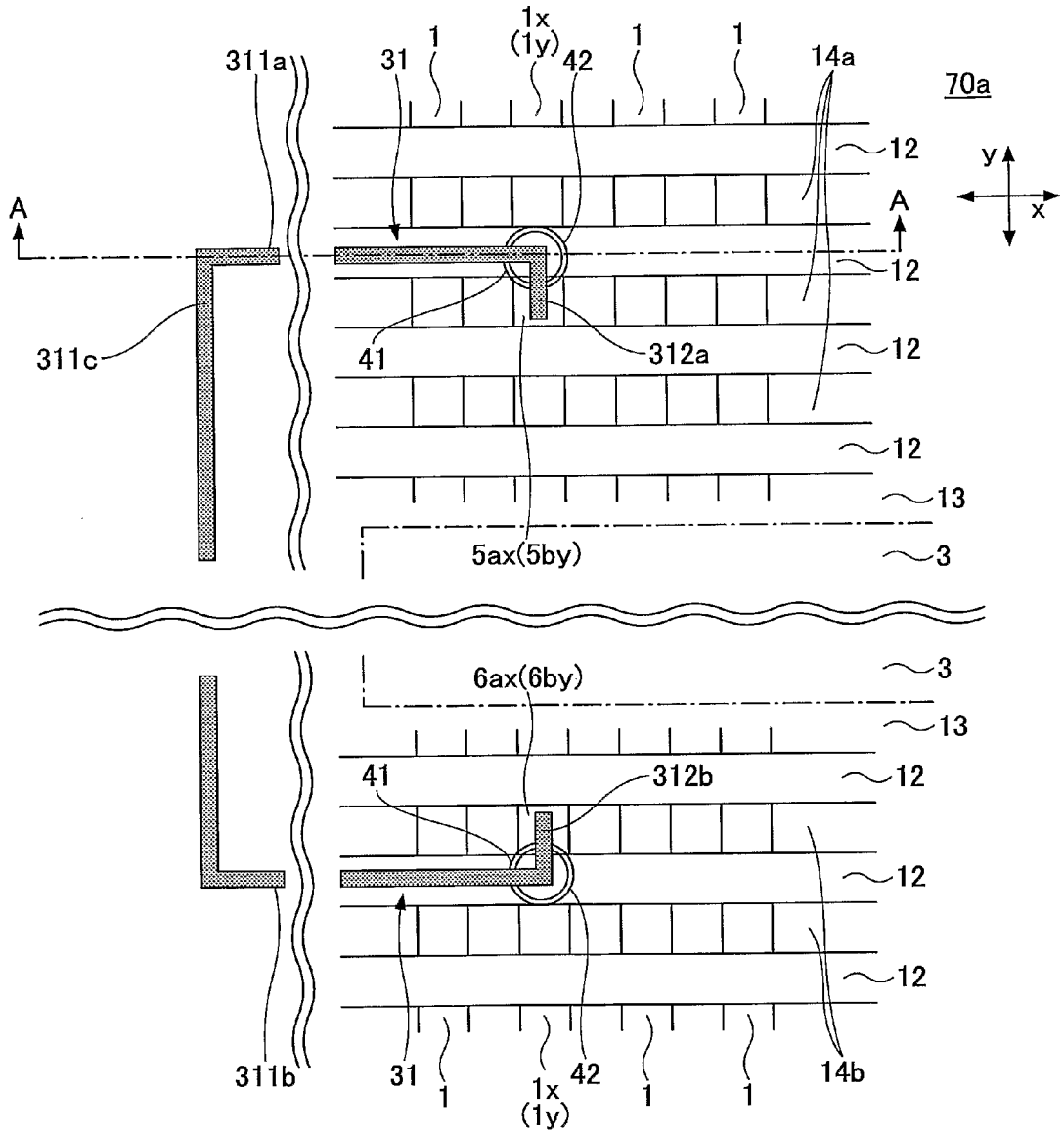
FIGS. 38A and 38B are enlarged views of repaired portions of an array substrate of a display device repaired by the repairing method of the second embodiment.
Figure 38B:
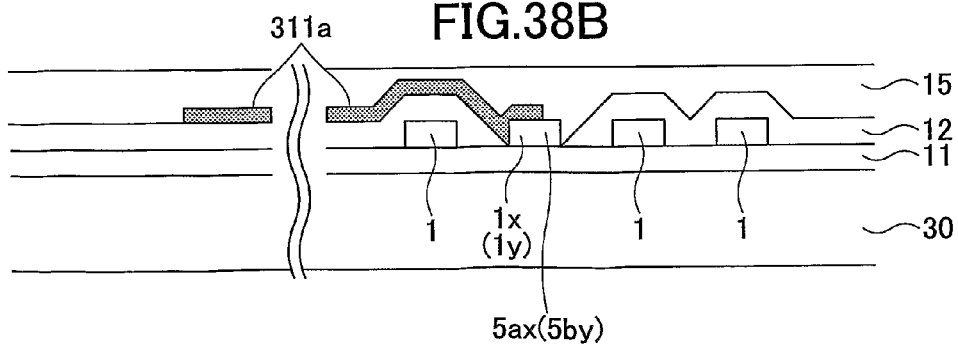

Referring to FIG. 36 together with FIG. 38B, an array substrate 70 (70a) of the display device of this embodiment includes a substrate 30, a nonconductive film 11, scan lines 2, signal lines 1, switching elements 51, a first insulating film 12, and a second insulating film 15. Different from the first embodiment, the array substrate 70 of the second embodiment does not include backup lines formed in advance for the signal lines 1 or the scan lines 2.

As shown in FIG. 36, the switching elements 51 are formed in pixel areas 52 in a display area (active matrix area) 3. The switching elements 51 may be implemented by thin-film transistors. For example, the switching elements 51 may be implemented by organic transistors including an organic semiconductor layer, and may be formed by photolithography, inkjet printing, and other printing methods as described above. The scan lines 2 and the signal lines 1 are connected, respectively, to gate electrodes and source electrodes of the switching elements 51, and input and non-input ends of the signal lines 1 (or the scan lines 2) extend across the outer areas 13b and 13a to the outside.

The first insulating film 12 has openings 14a and 14b in the outer area 13 (13a, 13b) above the signal lines 1 (or the scan lines 2). In this embodiment, the openings 14a and 14b are shaped like lines extending in a direction orthogonal to the signal lines 1 or the scan lines 2.

Next, a display device repairing method of the second embodiment is described with reference to FIGS. 37 through 50.

Figure 37:
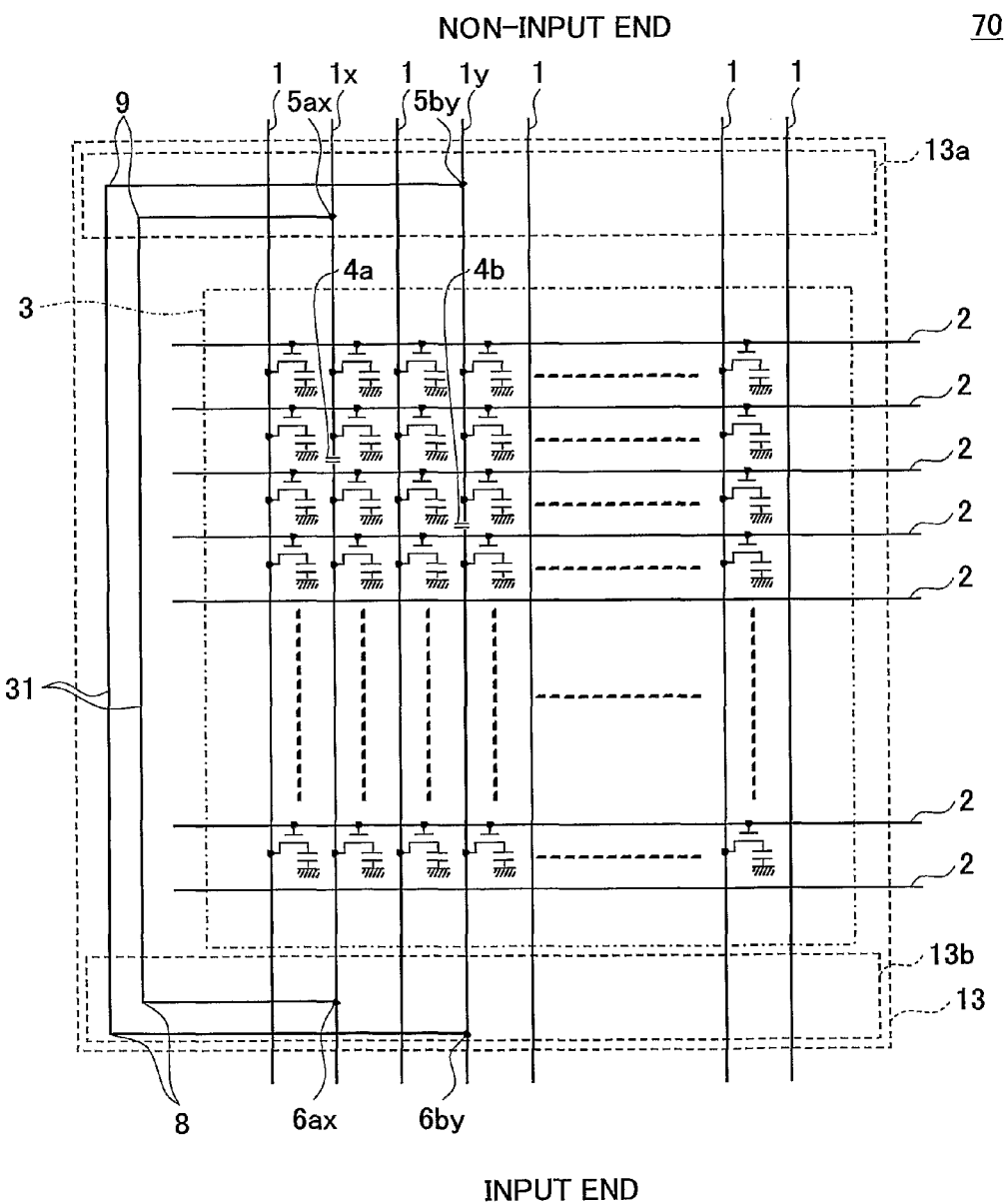
FIG. 37 is a drawing illustrating an array substrate of a display device repaired by a repairing method of the second embodiment.

FIG. 37 is a drawing illustrating an array substrate of a display device repaired by a repairing method of the second embodiment. FIGS. 38A and 38B are enlarged views of repaired portions of the array substrate of the display device repaired by the repairing method of the second embodiment.

Here, it is assumed that breaks (or other defects) are found in the signal lines 1 at two broken points 4a and 4b in the display area (active matrix area) 3. In FIG. 37, new wiring is formed to repair the broken points 4a and 4b. The nonconductive film 11, the first insulating film 12, and the second insulating film 15 are not shown in FIG. 37

In this embodiment, when a signal line 1 is broken in the display area (active matrix area) 3, two ends of the broken signal line 1, which are located outside of the display area (active matrix area) 3, are connected to each other by forming a wire 31 through the openings 14a and 14b in the outer area 13.

Figure 39:
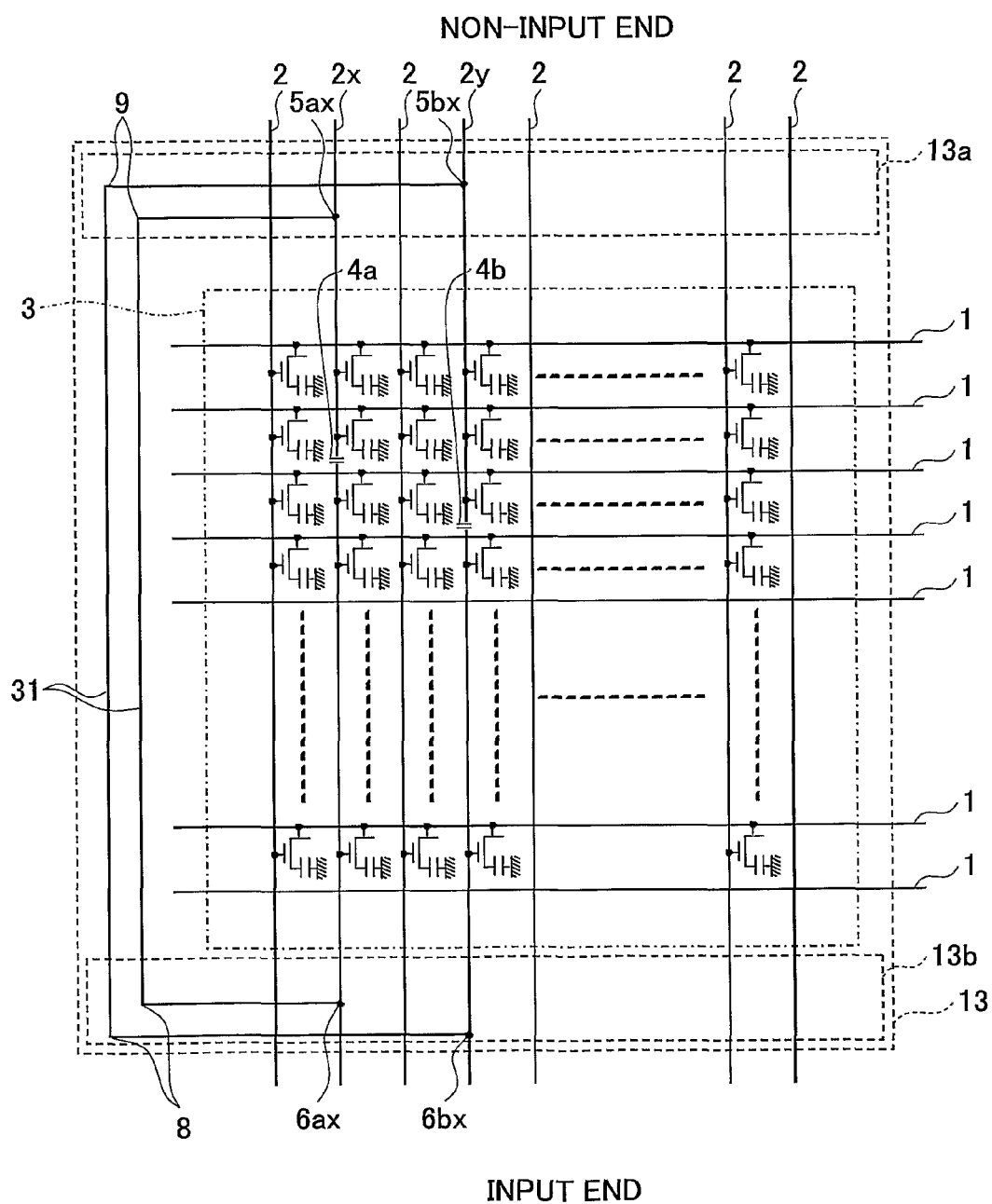
FIG. 39 is a drawing illustrating an array substrate of a display device of the second embodiment where positions of scan lines and signal lines are interchanged.

FIG. 39 is a drawing illustrating an array substrate where the positions of the scan lines 2 and the signal lines 1 are interchanged. In other words, FIG. 39 shows an example where breaks (or other defects) in the scan lines 2 are repaired by forming wires 31. When interchanging the positions of the scan lines 2 and the signal lines 1 as shown in FIG. 39, the layering order (the order in the height direction) of the scan lines 2 and the signal lines 1 may also be changed.

As shown in FIG. 38A, when a signal line 1x has the broken point 4a, the wire 31 is formed in the outer area 13 from an opening 5ax (or an exposed portion of the signal line 1x) formed in the first insulating film 12 above the non-input end of the signal line 1x to an opening 6ax (or an exposed portion of the signal line 1x) formed in the first insulating film 12 above the input end of the signal line 1x to electrically connect the non-input and input ends of the signal line 1x. Thus, the input end and the non-input end of the signal line 1x having the broken point 4a are electrically connected to each other via the wire 31 formed through the openings 5ax and 6ax.

Similarly, when a signal line 1y has the broken point 4b, a wire 31 is formed in the outer area 13 from an opening 5by (or an exposed portion of the signal line 1y) formed in the first insulating film 12 above the non-input end of the signal line 1y to an opening 6by (or an exposed portion of the signal line 1y) formed in the first insulating film 12 above the input end of the signal line 1y to electrically connect the non-input and input ends of the signal line 1y. Thus, the input end and the non-input end of the signal line 1y having the broken point 4b are electrically connected to each other via the wire 31 formed through the openings 5by and 6by.

Referring to FIG. 38A, the wire 31 includes an extending part 311a formed in the outer area 13a at the non-input end of the signal line 1x (or 1y) and extending from a position near the opening 5ax (or 5by) (i.e., extending near one of the openings 14a) in a direction orthogonal to the signal line 1x (or 1y); and a bent part 312a bending from one end of the extending part 311a toward the opening 5ax (or 5by). The wire 31 also includes an extending part 311b formed in the outer area 13b at the input end of the signal line 1x (or 1y) and extending from a position near the opening 6ax (or 6by) (i.e., extending near one of the openings 14b) in a direction orthogonal to the signal line 1x (or 1y); and a bent part 312b bending from one end of the extending part 311b toward the opening 6ax (or 6by). The wire 31 further includes an extending part 311c extending in a direction orthogonal to the extending parts 311a and 311b to connect the extending parts 311a and 311b.

Figure 42A:
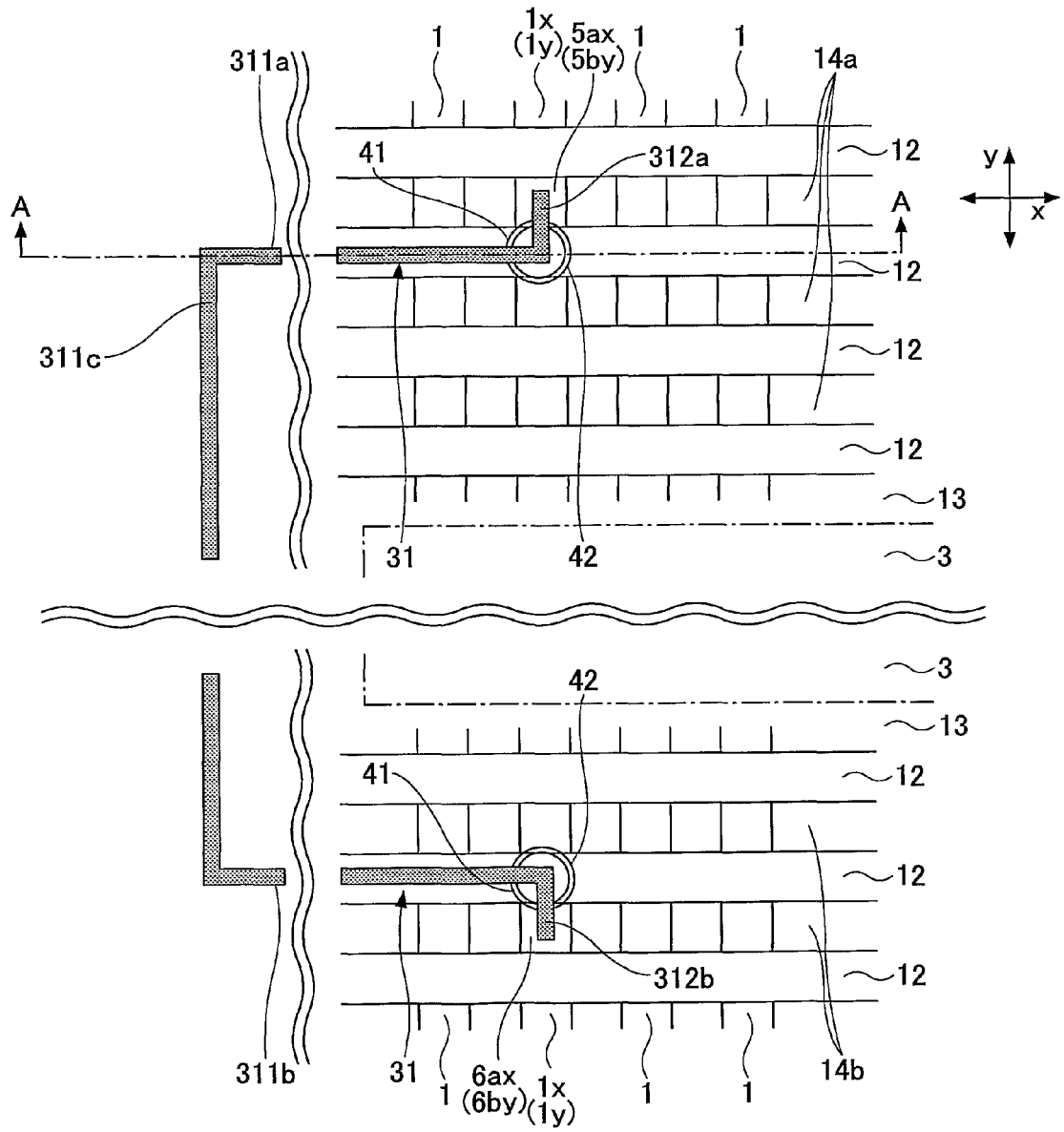
FIGS. 42A and 42B are drawings (3) illustrating shape variations of a wire formed on an array substrate of the second embodiment.
Figure 42B:
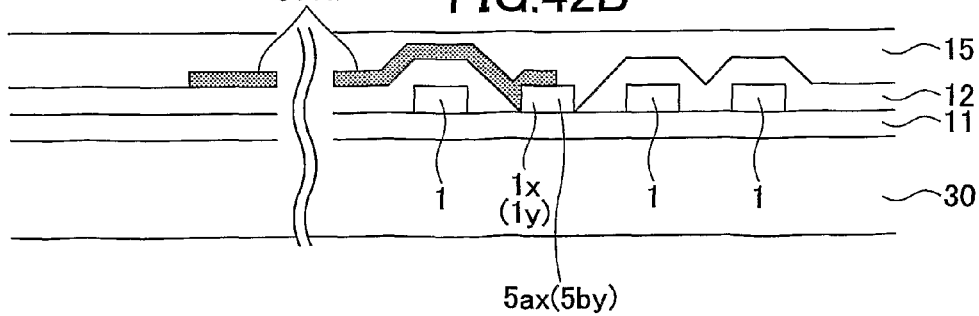

FIGS. 40A through 42B are drawings illustrating shape variations of the wire 31. As shown in FIGS. 40A through 42B, the wire 31 can take various shapes. FIGS. 40A and 40B show the wire 31 having the bent parts 312a and 312b bending upward on the printed page. FIGS. 41A and 41B show the wire 31 having the bent parts 312a and 312b bending downward on the printed page. FIGS. 42A and 42B show the wire 31 having the bent part 312a bending upward and the bent part 312b bending downward on the printed page. Also, multiple wires 31 with different shapes may be formed on the array substrate 70 (70a).

Referring to FIG. 38B, the array substrate 70a includes the second insulating film 15 formed over the first insulating film 12. Similar to the first insulating film 12, the second insulating film 15 may be formed by photolithography, CVD, inkjet printing, and other printing methods.

Figure 43A:
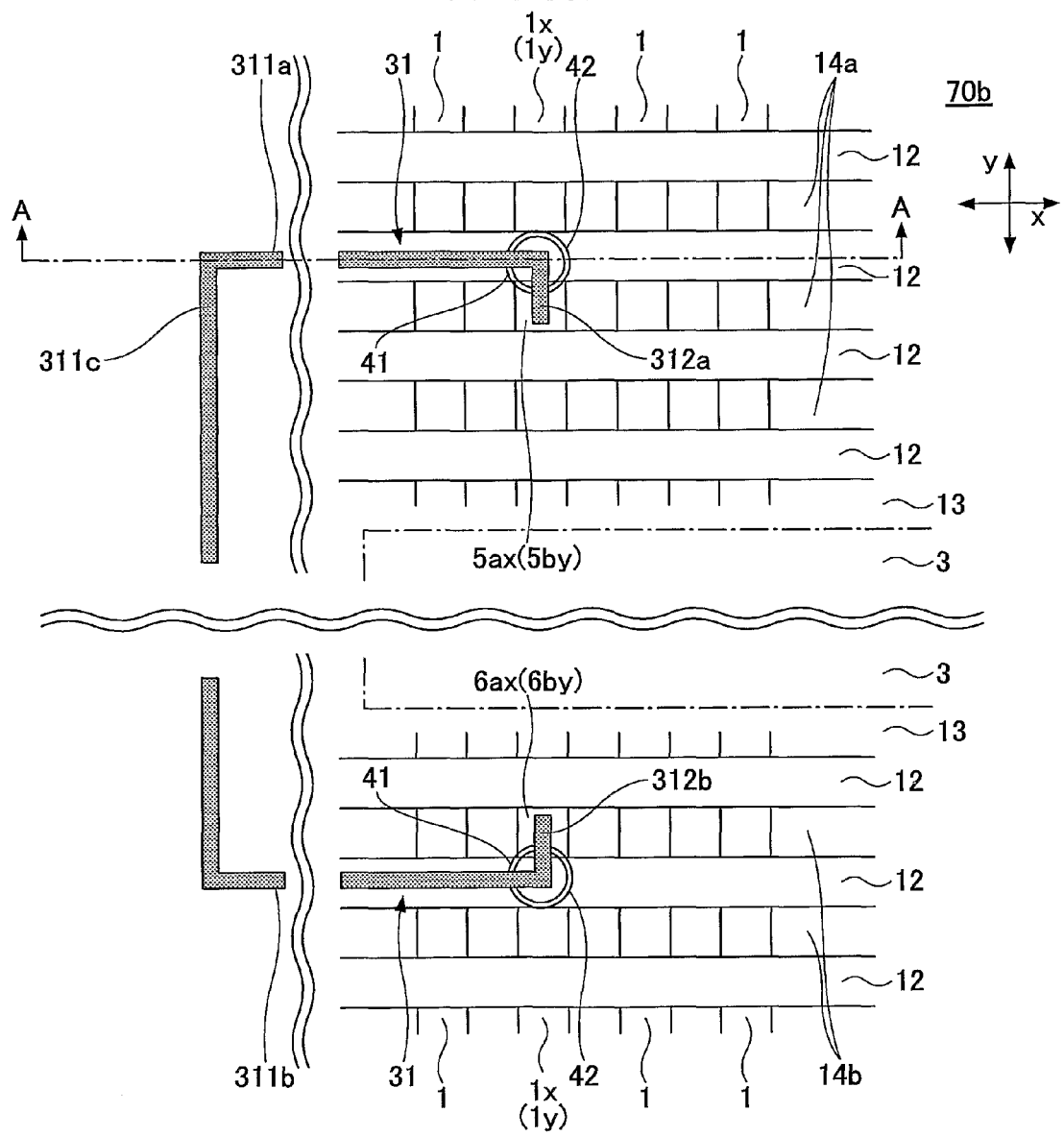
FIGS. 43A and 43B are drawings illustrating an array substrate of the second embodiment where a second insulating film is omitted.
Figure 43B:
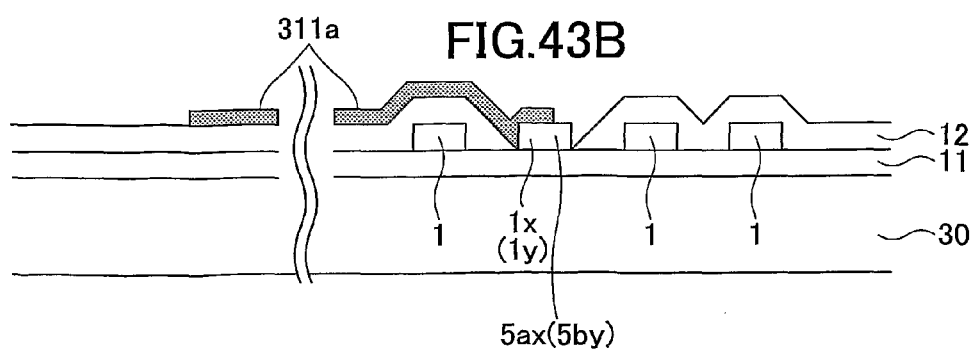

FIGS. 43A and 43B are drawings illustrating an array substrate where the second insulating film is omitted. The array substrate 70a described above with reference to FIGS. 38A and 38B includes the second insulating film 15 formed on the substrate 30. Meanwhile, the second insulating film 15 is omitted in an array substrate 70b shown by FIGS. 43A and 43B.

Similar to the array substrate 70a of FIGS. 38A and 38B, the wire 31 formed on the array substrate 70b of FIGS. 43A and 43B may have various shapes as shown in FIGS. 40A through 42B. Also, multiple wires 31 with different shapes may be formed on the array substrate 70b.

Figure 44A:
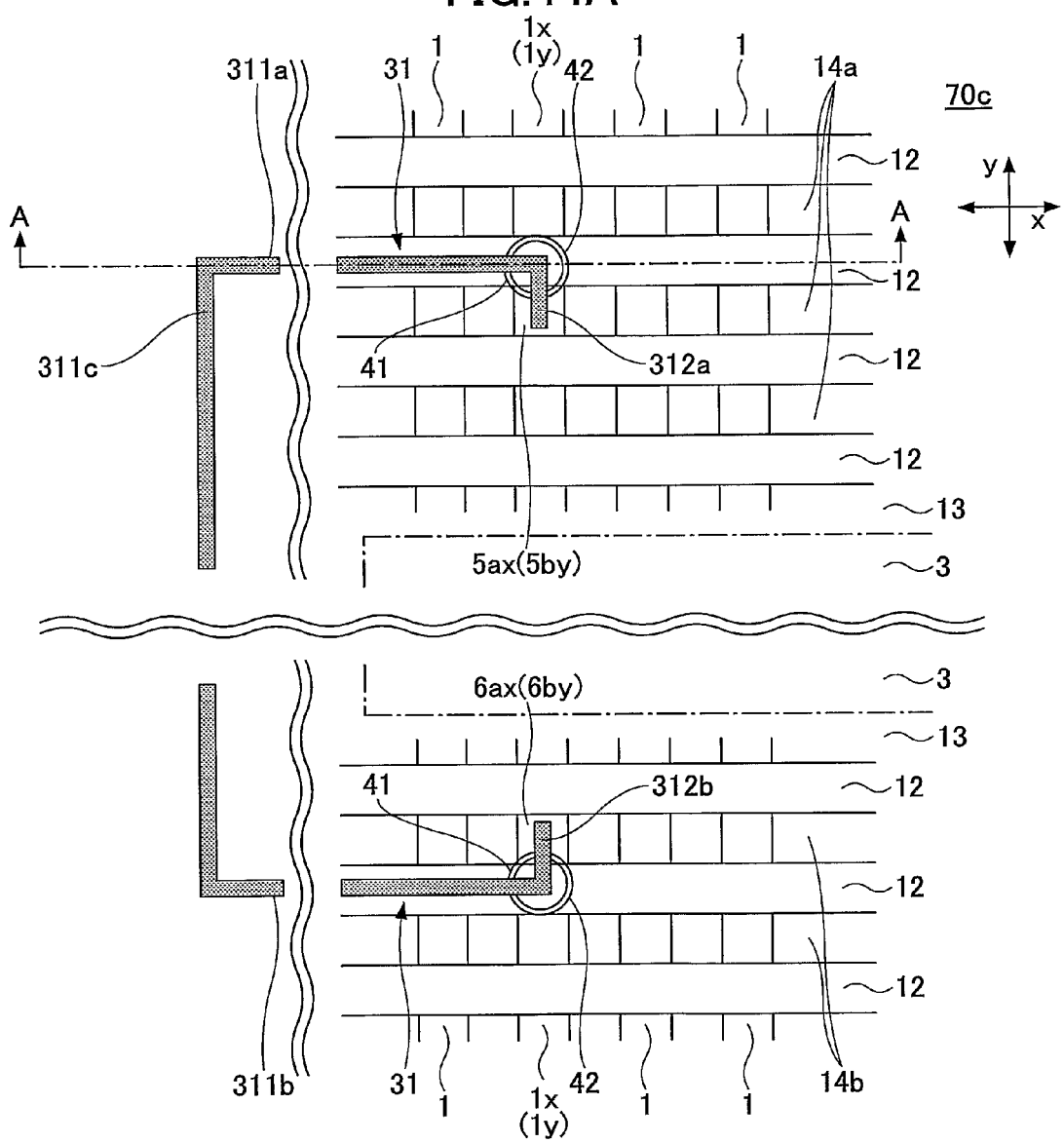
FIGS. 44A and 44B are drawings illustrating an array substrate of the second embodiment where a part of a first insulating film is omitted.
Figure 44B:
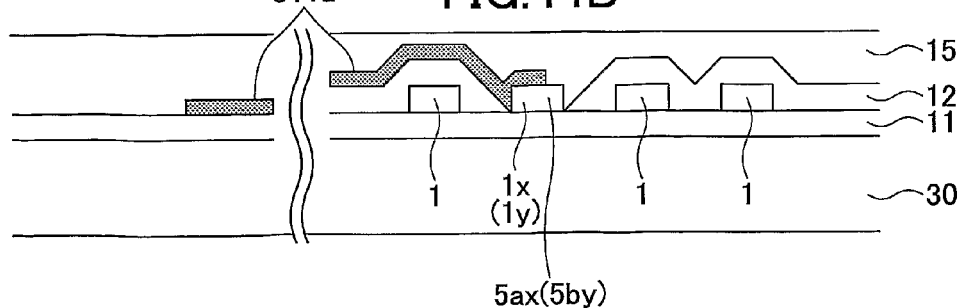

FIGS. 44A and 44B are drawings illustrating an array substrate where a part of the first insulating film is omitted. The array substrate 70a described above with reference to FIGS. 38A and 38B includes the first insulating film 12 formed on substantially the entire surface of the substrate 30. Meanwhile, a part of the first insulating film 12 is omitted in an array substrate 70c shown by FIGS. 44A and 44B.

Similar to the array substrate 70a of FIGS. 38A and 38B, the wire 31 formed on the array substrate 70c of FIGS. 44A and 44B may have various shapes as shown in FIGS. 40A through 42B. Also, multiple wires 31 with different shapes may be formed on the array substrate 70c.

Figure 45A:
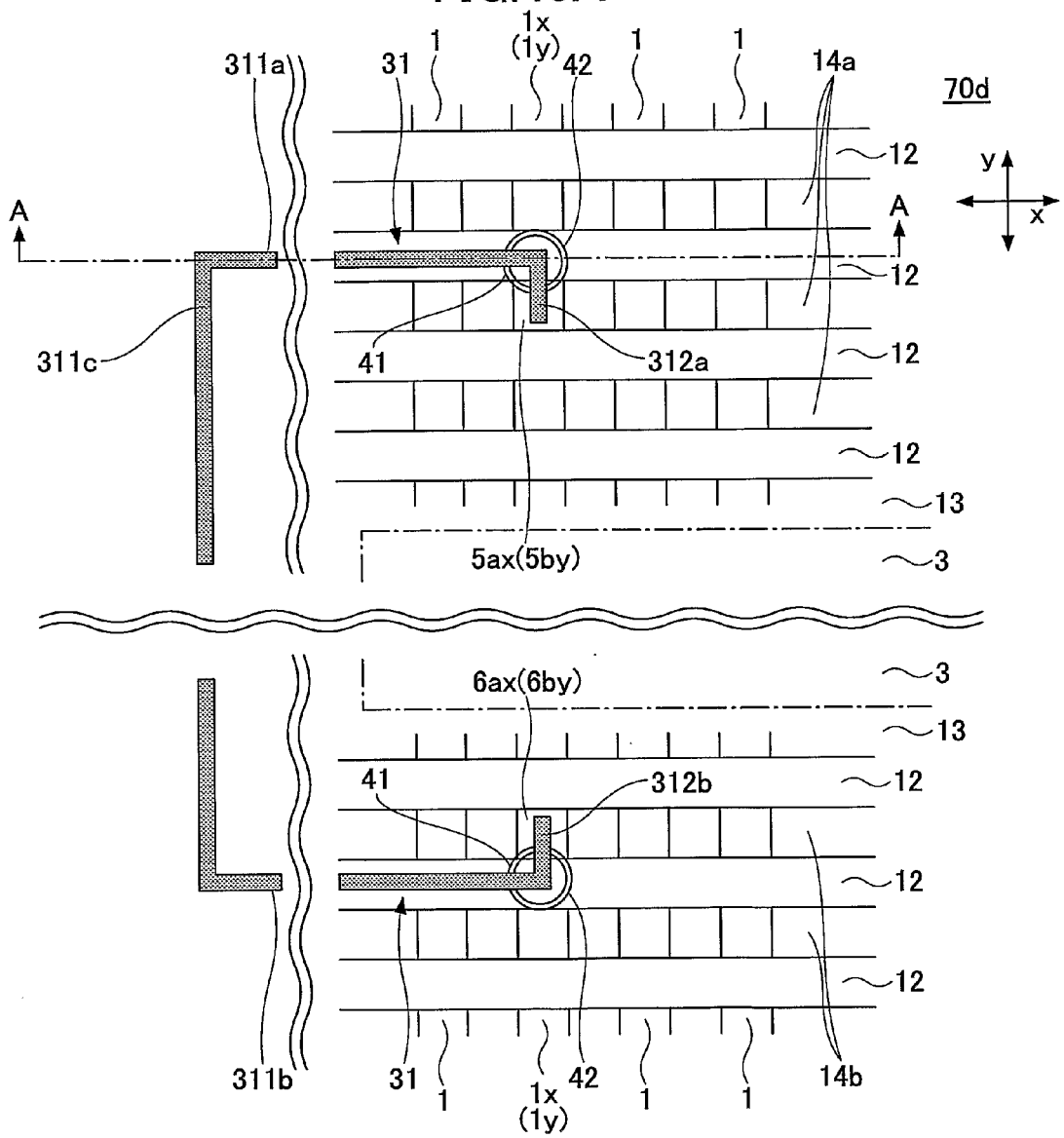
FIGS. 45A and 45B are drawings illustrating an array substrate of the second embodiment where a part of a first insulating film and a second insulating film are omitted.
Figure 45B:
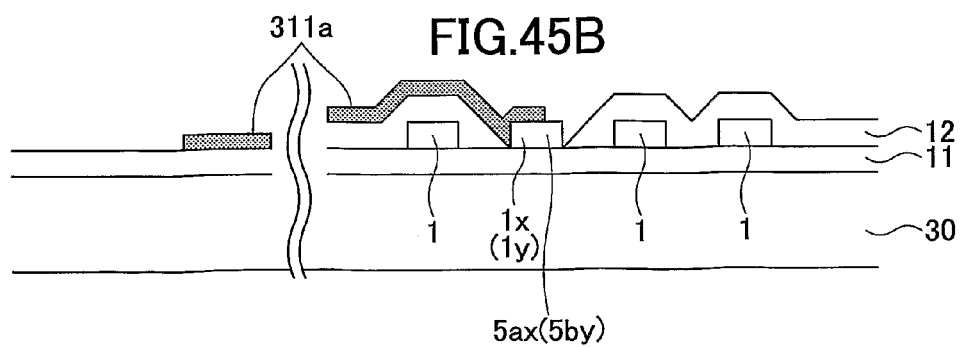

FIGS. 45A and 45B are drawings illustrating an array substrate where the second insulating film and a part of the first insulating film are omitted. The array substrate 70c shown by FIGS. 44A and 44B includes the second insulating film 15 formed on the substrate 30. Meanwhile, the second insulating film 15 is also omitted in an array substrate 70d shown by FIGS. 45A and 45B.

Similar to the array substrate 70a of FIGS. 38A and 38B, the wire 31 formed on the array substrate 70d of FIGS. 45A and 45B may have various shapes as shown in FIGS. 40A through 42B. Also, multiple wires 31 with different shapes may be formed on the array substrate 70d.

Figure 46A:
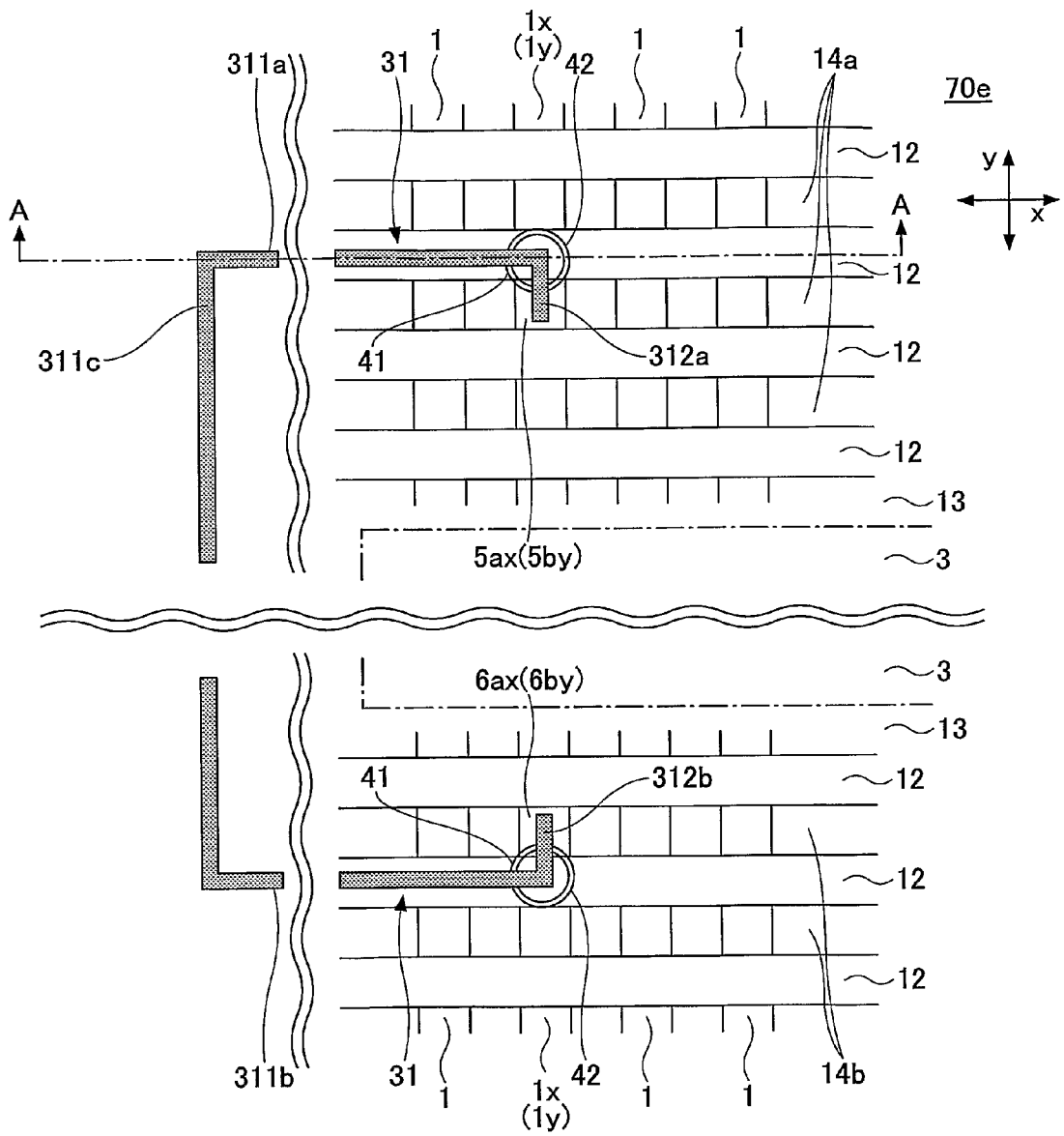
FIGS. 46A and 46B are drawings illustrating an array substrate of the second embodiment where a nonconductive film is omitted.
Figure 46B:
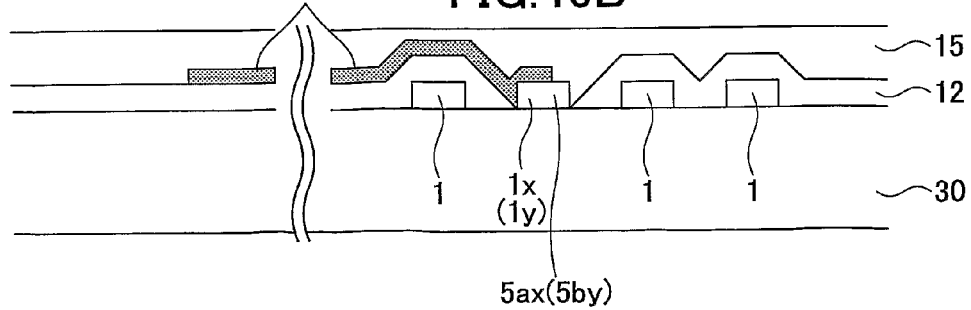

FIGS. 46A and 46B are drawings illustrating an array substrate where the nonconductive film is omitted. The array substrate 70a described above with reference to FIGS. 38A and 38B includes the nonconductive film 11 formed on the substrate 30. Meanwhile, the nonconductive film 11 is omitted in an array substrate 70e shown by FIGS. 46A and 46B.

Similar to the array substrate 70a of FIGS. 38A and 38B, the wire 31 formed on the array substrate 70e of FIGS. 46A and 46B may have various shapes as shown in FIGS. 40A through 42B. Also, multiple wires 31 with different shapes may be formed on the array substrate 70e.

Figure 47A:
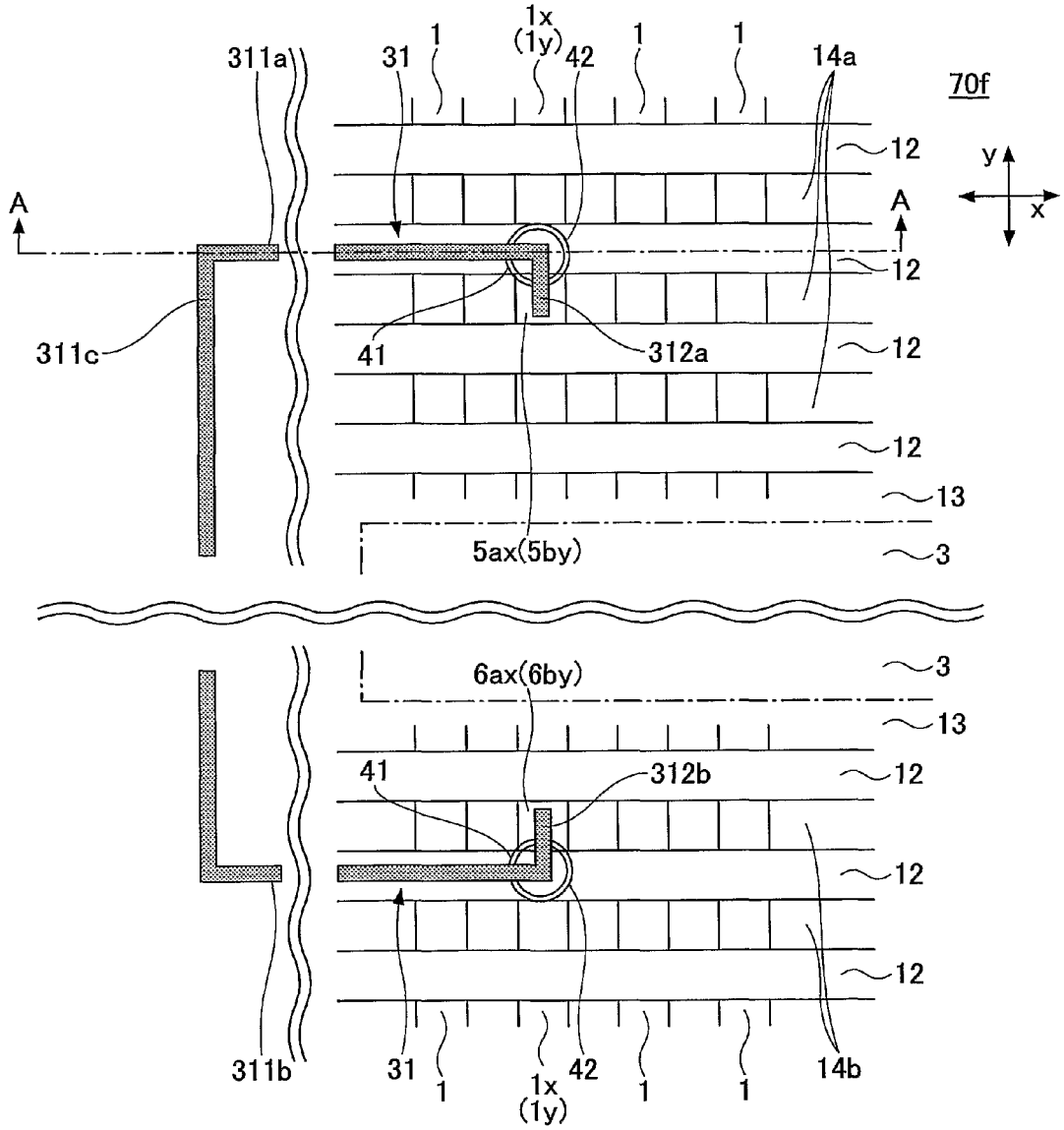
FIGS. 47A and 47B are drawings illustrating an array substrate of the second embodiment where a nonconductive film and a second insulating film are omitted.
Figure 47B:
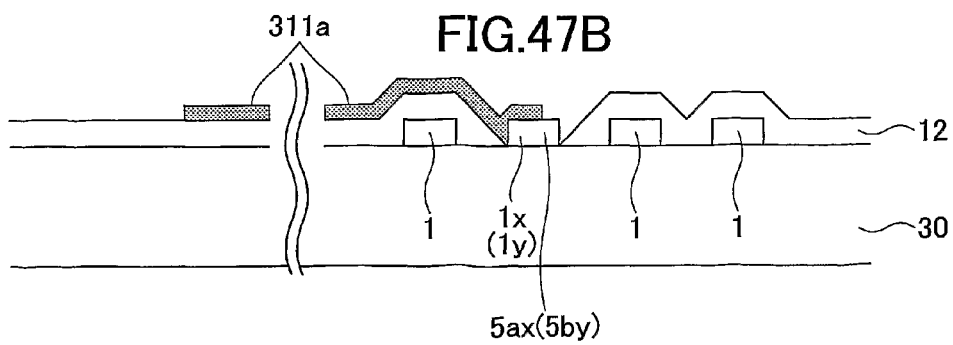

FIGS. 47A and 47B are drawings illustrating an array substrate where the nonconductive film and the second insulating film are omitted. The array substrate 70e shown by FIGS. 46A and 46B includes the second insulating film 15 formed on the substrate 30. Meanwhile, the second insulating film 15 is also omitted in an array substrate 70f shown by FIGS. 47A and 47B.

Similar to the array substrate 70a of FIGS. 38A and 38B, the wire 31 formed on the array substrate 70f of FIGS. 47A and 47B may have various shapes as shown in FIGS. 40A through 42B. Also, multiple wires 31 with different shapes may be formed on the array substrate 70f.

Figure 48A:
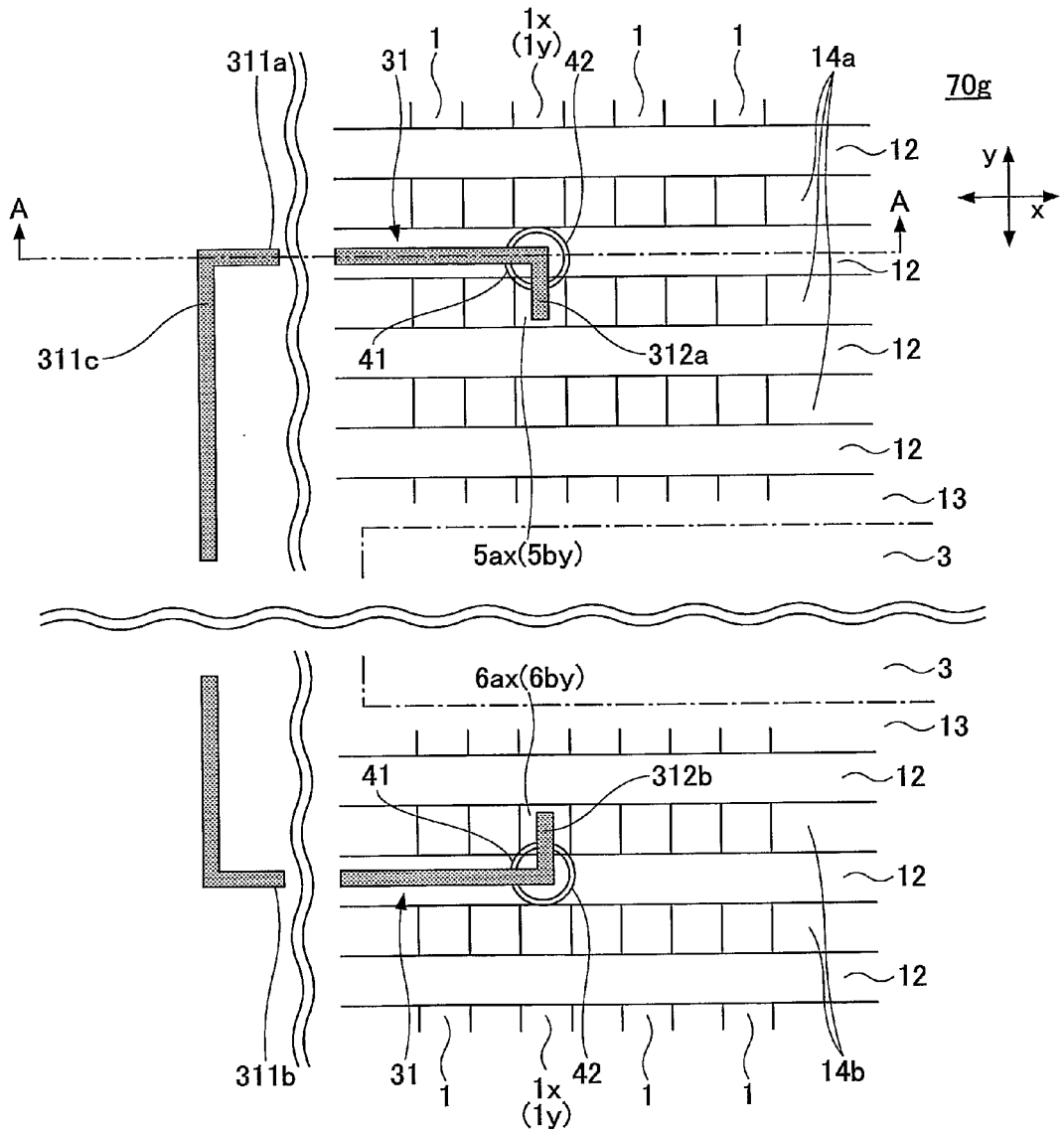
FIGS. 48A and 48B are drawings illustrating an array substrate of the second embodiment where a nonconductive film and a part of a first insulating film are omitted.
Figure 48B:
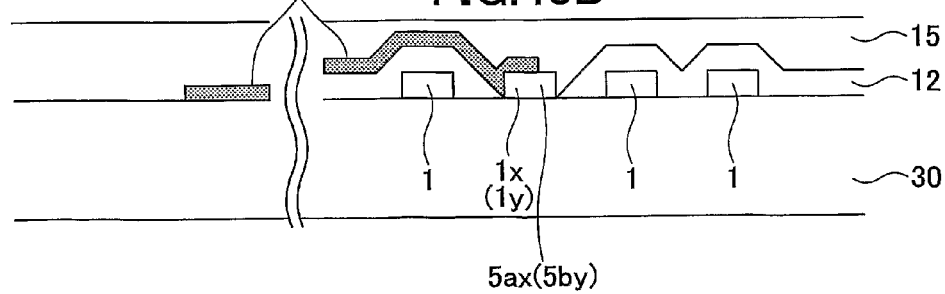

FIGS. 48A and 48B are drawings illustrating an array substrate where the nonconductive film and a part of the first insulating film are omitted. The array substrate 70a described above with reference to FIGS. 38A and 38B includes the nonconductive film 11 and the second insulating film 12 formed on substantially the entire surface of the substrate 30. Meanwhile, the nonconductive film 11 and a part of the first insulating film 12 are omitted in an array substrate 70g shown by FIGS. 48A and 48B.

Similar to the array substrate 70a of FIGS. 38A and 38B, the wire 31 formed on the array substrate 70g of FIGS. 48A and 48B may have various shapes as shown in FIGS. 40A through 42B. Also, multiple wires 31 with different shapes may be formed on the array substrate 70g.

Figure 49A:
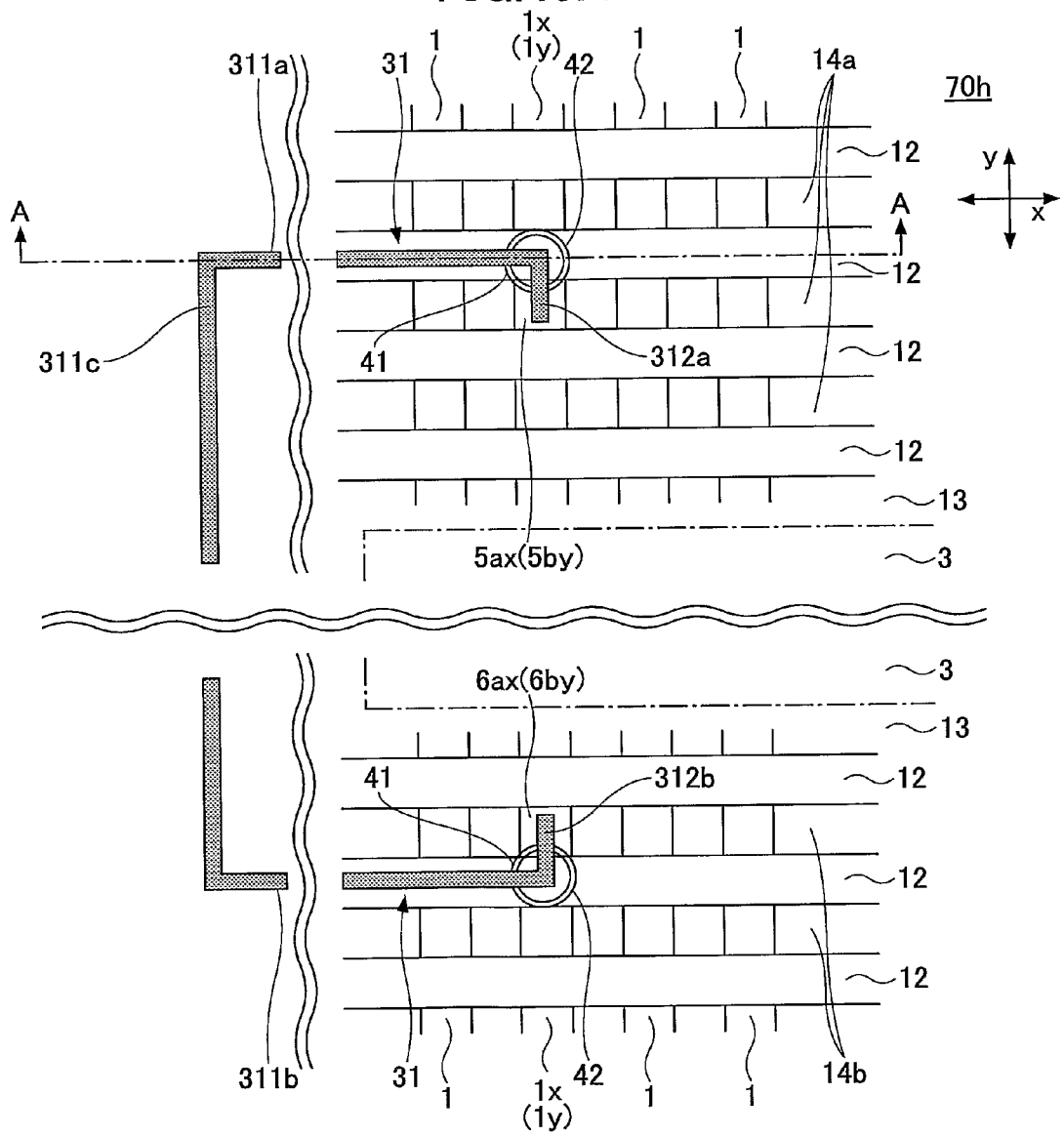
FIGS. 49A and 49B are drawings illustrating an array substrate of the second embodiment where a nonconductive film, a part of a first insulating film, and a second insulating film are omitted.
Figure 49B:
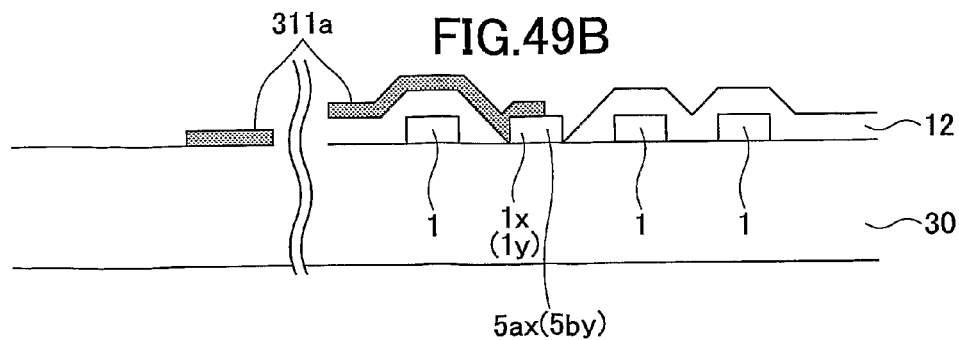

FIGS. 49A and 49B are drawings illustrating an array substrate where the nonconductive film, a part of the first insulating film, and the second insulating film are omitted. The array substrate 70g shown by FIGS. 48A and 48B includes the second insulating film 15 formed on the substrate 30. Meanwhile, the second insulating film is also omitted in an array substrate 70h shown by FIGS. 49A and 49B.

Similar to the array substrate 70a of FIGS. 38A and 38B, the wire 31 formed on the array substrate 70h of FIGS. 49A and 49B may have various shapes as shown in FIGS. 40A through 42B. Also, multiple wires 31 with different shapes may be formed on the array substrate 70h.

The angle between the extending part 311a (or 311b) and the bent part 312a (or 312b) of the wire 31 can be defined by an angle 41 or an angle 42. The angle 41 is less than 180 degrees and the angle 42 is obtained by subtracting the angle 41 from 360 degrees. As in the first embodiment, the angle 41 is preferably between 5 and 175 degrees, and more preferably between 45 and 135 degrees.

Next, a display device repairing method (process) of the second embodiment is described with reference to FIG. 50. FIG. 50 is a flowchart showing display device repairing process of the second embodiment.

As shown in FIG. 50, the repairing process of this embodiment includes a first insulating film forming step, a break detecting step, and a line connecting step. The first insulating film forming step includes step S21, the break detecting step includes step S22, and the line connecting step includes step S23. Different from the first embodiment, the display device repairing process of the second embodiment does not include a backup line forming step.

First, the first insulating film forming step including step S21 is performed. In step S21, a first insulating film having openings in the outer area above the scan lines or the signal lines is formed.

Next, the break detecting step including step S22 is performed. In step S22, the scan lines or the signal lines are tested to find a break. The break detecting step may be performed, for example, by testing the continuity of the signal lines or the scan lines using test pads provided in the outer area at both ends of the signal or scan lines; or by tentatively assembling the array substrate, display elements, and an opposed substrate and testing display operations of respective pixel areas.

Next, the line connecting step including step S23 is performed. If a break of a scan line or a signal line is detected in the display area (active matrix area) in step S22, in step S23, two ends of the scan or signal line located outside of the display area are connected by forming a wire in the outer area. The wire extends from an opening above one end of the scan or signal line to an opening above the other end of the scan or signal line, and connects the ends of the scan or signal line to each other. The wire includes extending parts (311a and 311b) orthogonal to the scan or signal line, bent parts (312a and 312b) bending from the ends of the extending parts toward the openings, and an extending part (311c) extending parallel to the scan or signal line as described above.

Instead of the wire 31 including the extending parts 311a and 311b, the bent parts 312a and 312b, and the extending part 311c, a wire without a bent part may be used. For example, when a signal line having a break is located comparatively close to the left edge of the array substrate on the printed page (e.g., one of the five signal lines from the left edge), to connect the ends of the signal line, a wire without a bent part may be formed such that two extending parts (311a and 311b) of the wire form angles other than 90 degrees (e.g., 100 degrees) with the signal line.

Materials and methods used to form the wire in the line connecting step are substantially the same as those of the first embodiment.

Thus, the second embodiment also provides a display device including an array substrate with a configuration that makes it possible to repair broken lines as well as to reduce cross capacitance and leakage. The switching elements 51 of the array substrate 70 may be implemented by amorphous silicon thin-film transistors (a-Si TFT), polysilicon thin-film transistors (p-Si TFT), or organic thin-film transistors (O-TFT). Other types of switching elements similar to the above thin-film transistors may also be used.

The display device of the second embodiment may be implemented, for example, as a liquid crystal display, an organic EL display, or a plasma display panel (PDP).

Variation of Second Embodiment

A variation of the second embodiment is described below with reference to FIGS. 51 through 61B.

Figure 51:
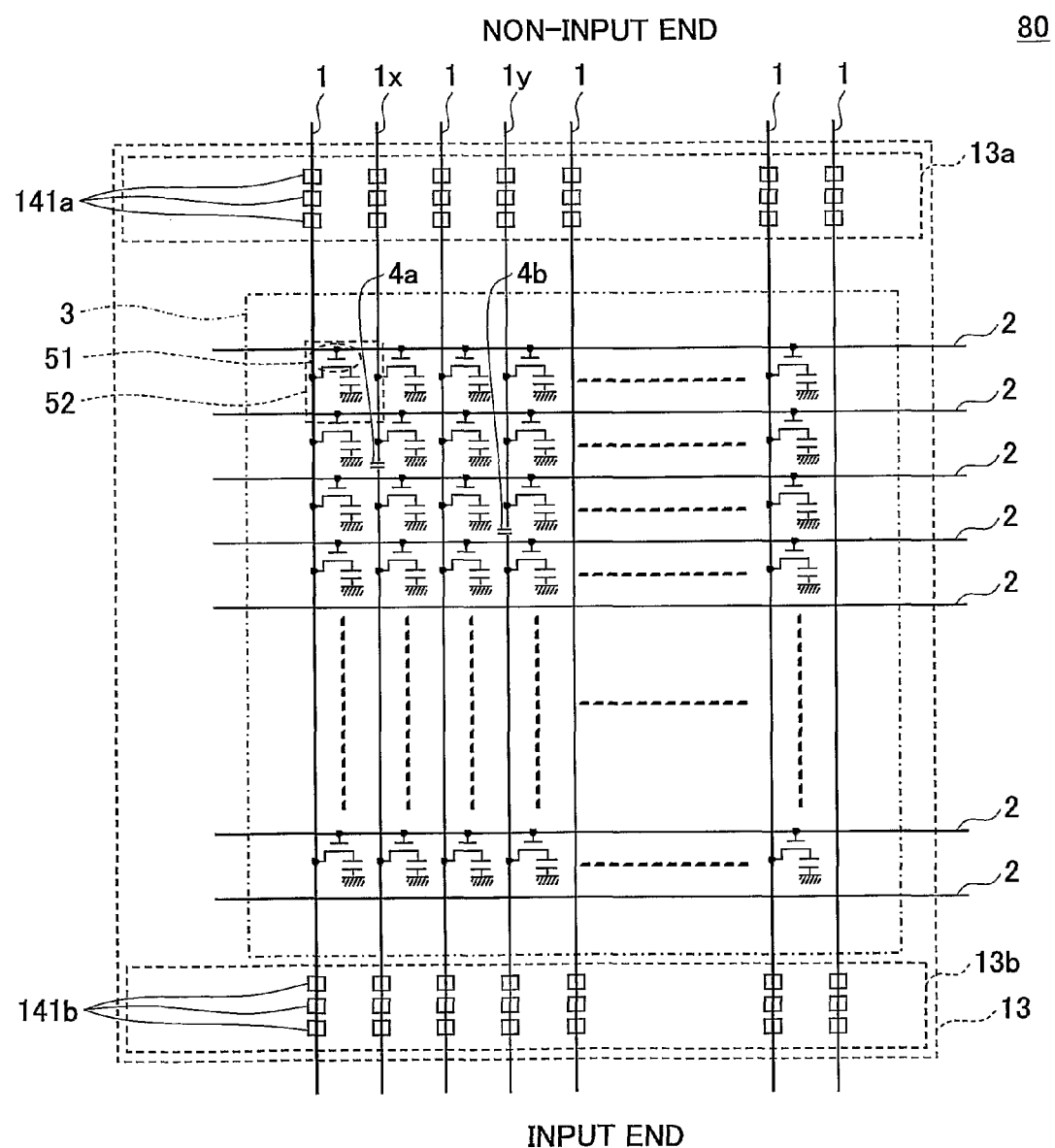
FIG. 51 is a drawing illustrating a configuration of an array substrate of a display device according to a variation of the second embodiment.

FIG. 51 is a drawing illustrating a configuration of an array substrate of a display device according to a variation of the second embodiment.

An array substrate 80 of this variation is different from the array substrate 70 of the second embodiment in that openings are formed like rows of stepping stones in a direction orthogonal to signal lines or scan lines.

In the array substrate 70 of the second embodiment, the openings 14a and 14b are shaped like lines extending in a direction orthogonal to the signal lines 1 or the scan lines 2. Meanwhile, in the array substrate 80 of this variation, as shown in FIG. 51, openings 141a and 141b are formed like rows of stepping stones in a direction orthogonal to signal lines 1 or scan lines 2.

The openings 141a and 141b are formed in a first insulating film 12 in outer areas 13a and 13b outside of a display area 3. The array substrate 80 of this variation has substantially the same configuration as that of the array substrate 70 of the second embodiment except that the openings 141a and 141b are formed like rows of stepping stones.

Figure 52A:
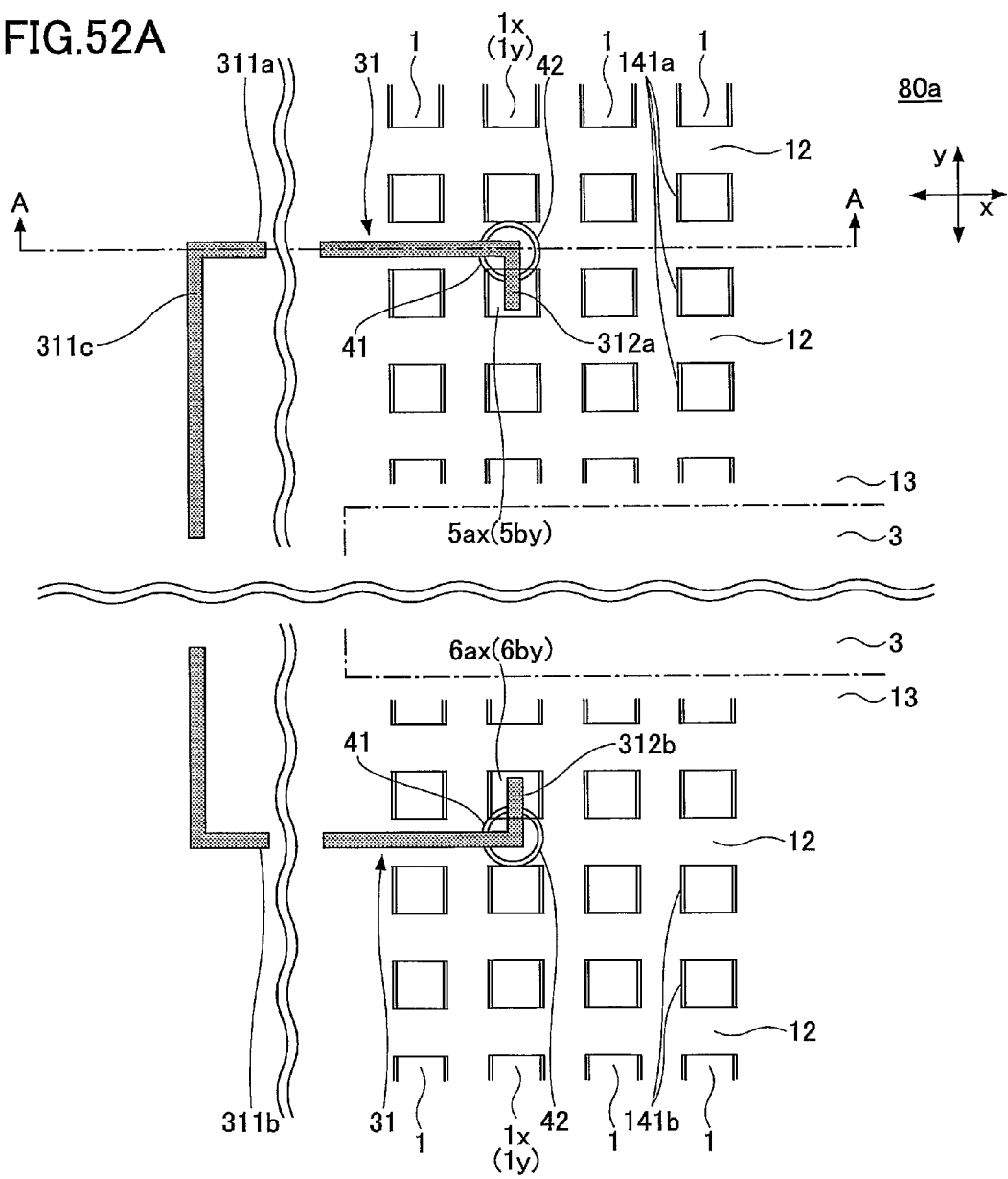
FIGS. 52A and 52B are enlarged views of repaired portions of an array substrate of a display device repaired by a repairing method according to the variation of the second embodiment.
Figure 52B:
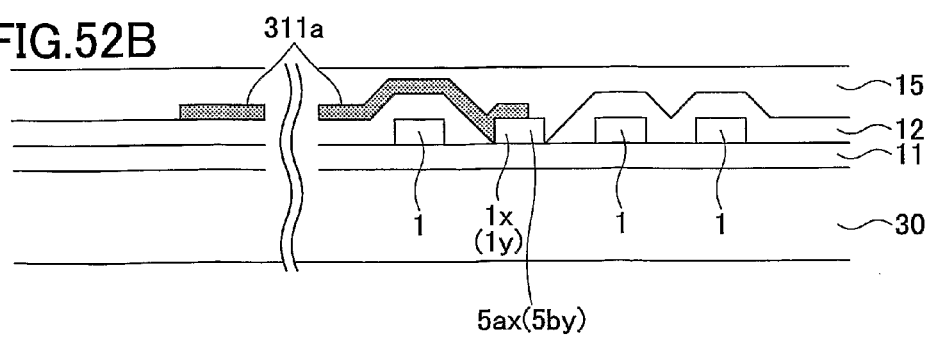

Referring to FIG. 51 together with FIG. 52B, the array substrate 80 (80a) of the display device of this variation includes a substrate 30, a nonconductive film 11, the scan lines 2, the signal lines 1, switching elements 51, the first insulating film 12, and a second insulating film 15. The configurations of components of the array substrate 80 other than the first insulating film 12 are substantially the same as those of the array substrate 70 of the second embodiment.

As shown in FIG. 51, the switching elements 51 are formed in pixel areas 52 in the display area (active matrix area) 3. The switching elements 51 may be implemented by thin-film transistors. For example, the switching elements 51 may be implemented by organic transistors including an organic semiconductor layer, and may be formed by photolithography, inkjet printing, and other printing methods as described above. The scan lines 2 and the signal lines 1 are connected, respectively, to gate electrodes and source electrodes of the switching elements 51, and input and non-input ends of the signal lines 1 (or the scan lines 2) extend across the outer areas 13b and 13a to the outside.

The first insulating film 12 has the openings 141a and 141b in the outer areas 13a and 13b above the signal lines 1 (or the scan lines 2). The openings 141a and 141b may be formed at the same time as the signal lines 1 or the scan lines are formed. The first insulating film 12 is also present in a part of the outer area 13 between the outer area 13a and the outer area 13b.

Next, a display device repairing method of this variation is described with reference to FIGS. 52A through 62B.

The display device repairing method of this variation is substantially the same as that of the second embodiment. The configuration of a repaired array substrate is substantially the same as that shown by FIG. 37.

FIGS. 52A and 52B are enlarged views of repaired portions of the array substrate of the display device repaired by the repairing method of this variation.

Referring to FIG. 52A, a wire 31 includes an extending part 311a formed in the outer area 13a at the non-input end of a broken signal line 1x (or 1y) and extending from a position near an opening 5ax (or 5by) (i.e., extending near one of the openings 141a) in a direction orthogonal to the signal line 1x (or 1y); and a bent part 312a bending from one end of the extending part 311a toward the opening 5ax (or 5by). The wire 31 also includes an extending part 311b formed in the outer area 13b at the input end of the signal line 1x (or 1y) and extending from a position near the opening 6ax (or 6by) (i.e., extending near one of the openings 141b) in a direction orthogonal to the signal line 1x (or 1y); and a bent part 312b bending from one end of the extending part 311b toward the opening 6ax (or 6by). The wire 31 further includes an extending part 311c extending in a direction orthogonal to the extending parts 311a and 311b to connect the extending parts 311a and 311b.

Figure 53A:
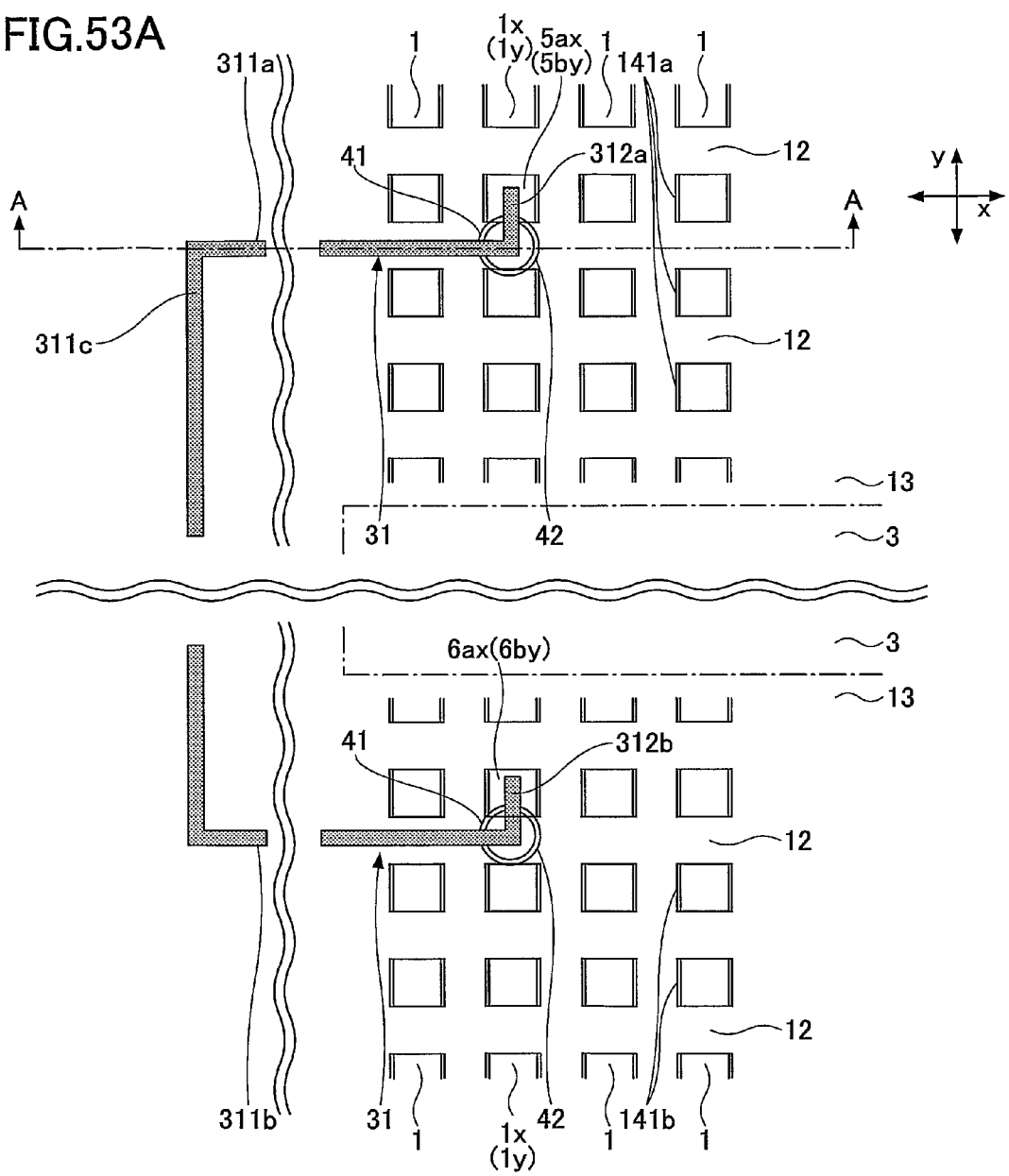
FIGS. 53A and 53B are drawings (1) illustrating shape variations of a wire formed on an array substrate according to the variation of the second embodiment.
Figure 53B:
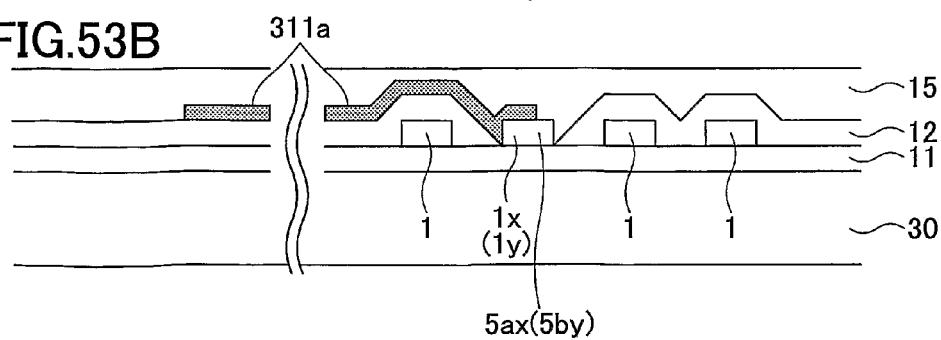
Figure 54A:
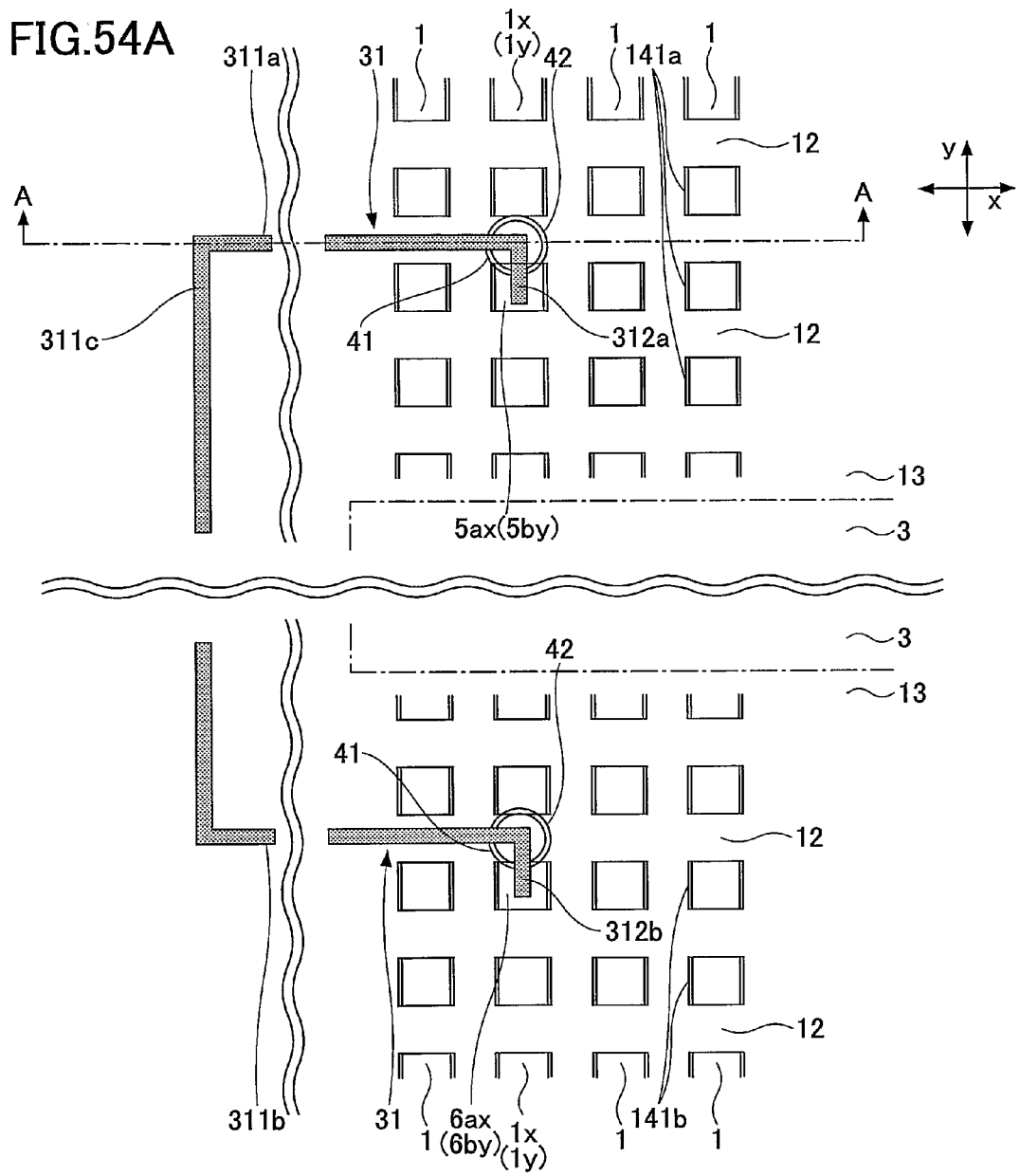
FIGS. 54A and 54B are drawings (2) illustrating shape variations of a wire formed on an array substrate according to the variation of the second embodiment.
Figure 54B:
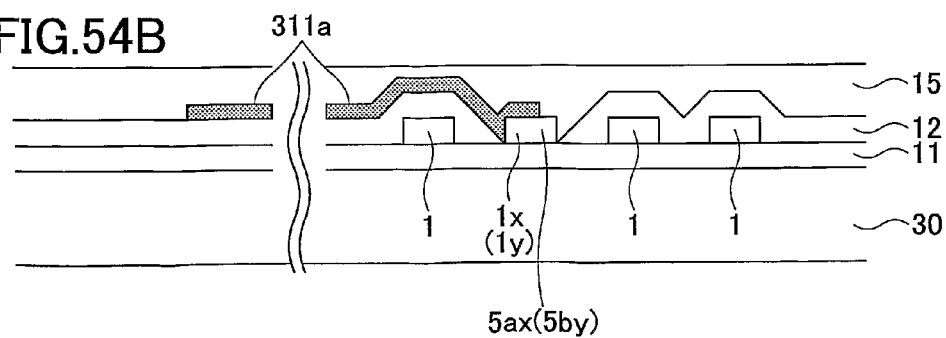
Figure 55A:
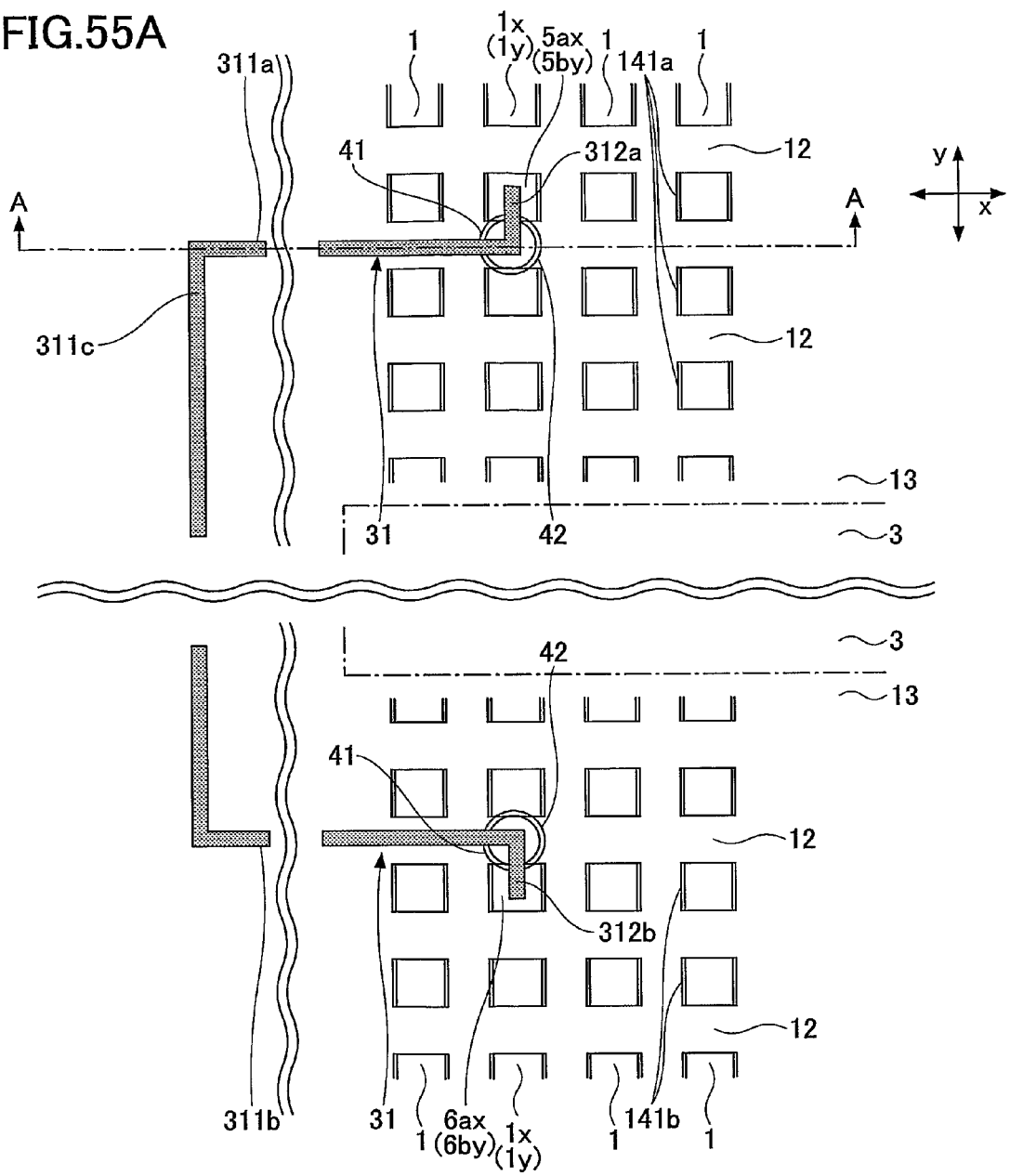
FIGS. 55A and 55B are drawings (3) illustrating shape variations of a wire formed on an array substrate according to the variation of the second embodiment.
Figure 55B:
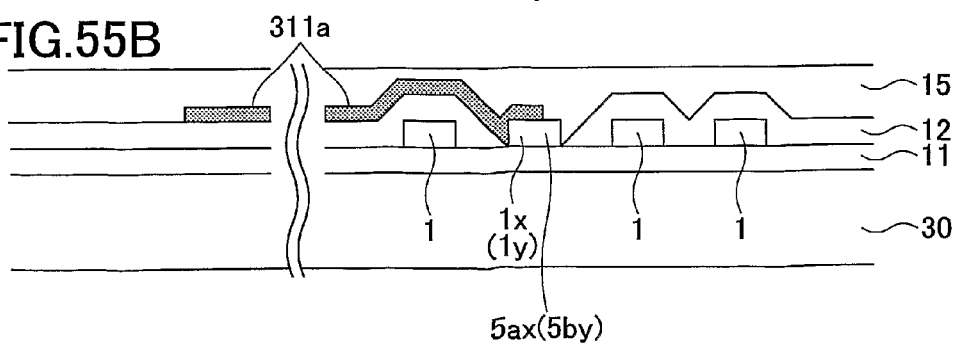

FIGS. 53A through 55B are drawings illustrating shape variations of the wire 31. As shown in FIGS. 53A through 55B, the wire 31 can take various shapes. FIGS. 53A and 53B show the wire 31 having the bent parts 312a and 312b bending upward on the printed page. FIGS. 54A and 54B show the wire 31 having the bent parts 312a and 312b bending downward on the printed page. FIGS. 55A and 55B show the wire 31 having the bent part 312a bending upward and the bent part 312b bending downward on the printed page. Also, multiple wires 31 with different shapes may be formed on the array substrate 80a.

Referring to FIG. 52B, the array substrate 80a includes the second insulating film 15 formed over the first insulating film 12. Similar to the first insulating film 12, the second insulating film 15 may be formed by photolithography, CVD, inkjet printing, and other printing methods.

Figure 56A:
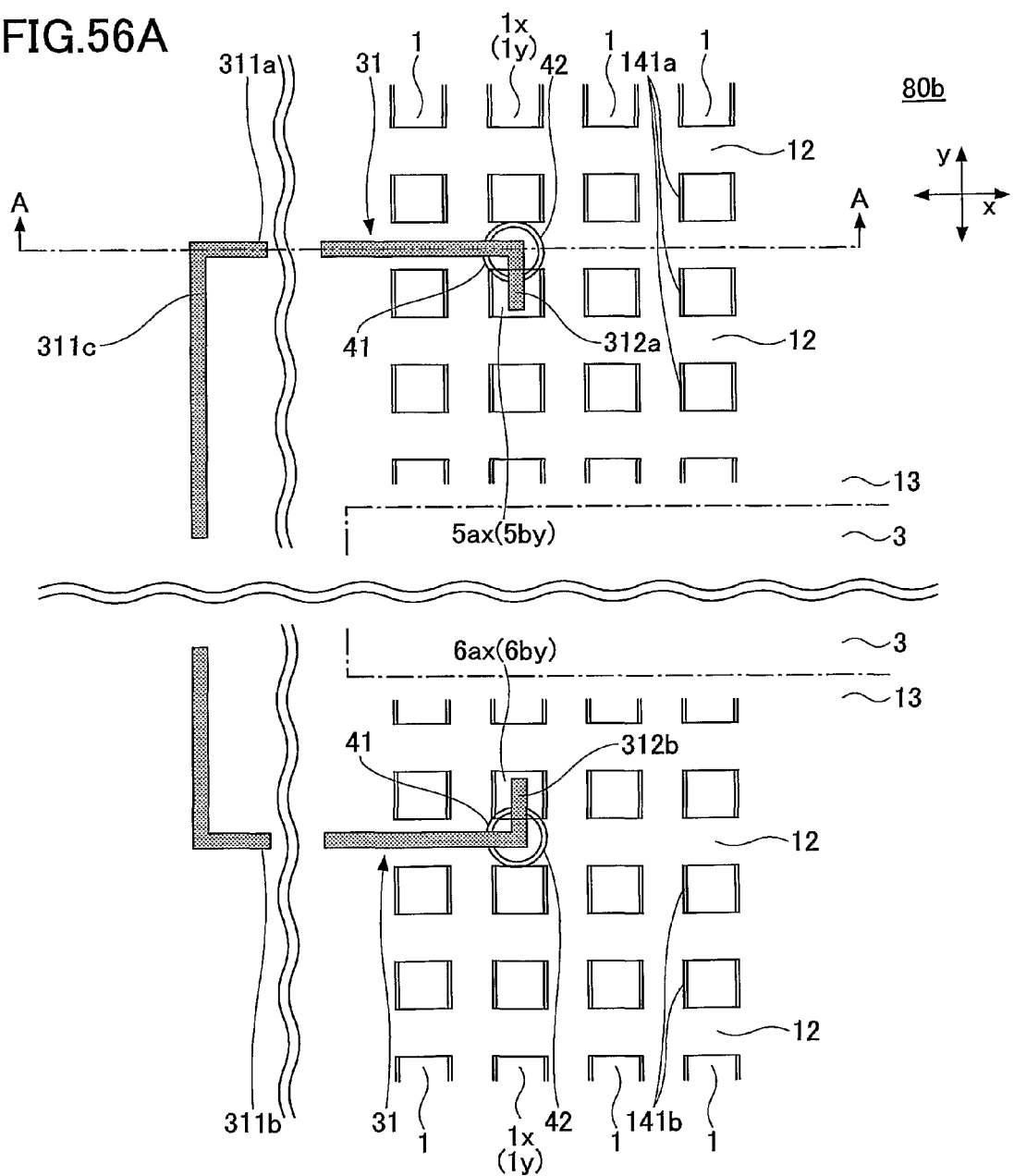
FIGS. 56A and 56B are drawings illustrating an array substrate according to the variation of the second embodiment where a second insulating film is omitted.
Figure 56B:
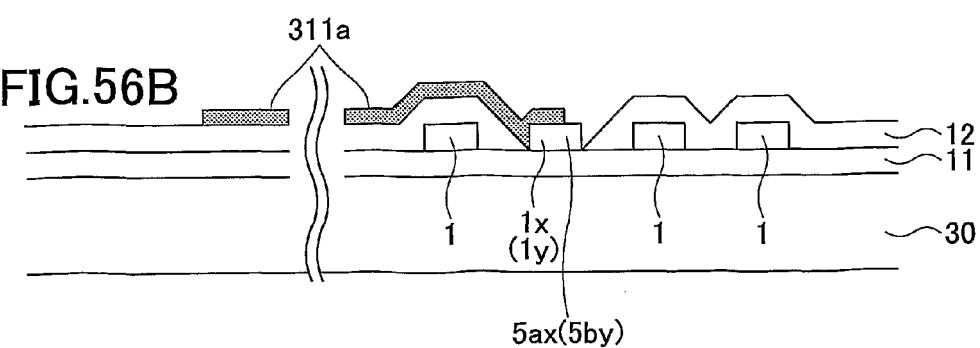

FIGS. 56A and 56B are drawings illustrating an array substrate where the second insulating film is omitted. The array substrate 80a described above with reference to FIGS. 52A and 52B includes the second insulating film 15 formed on the substrate 30. Meanwhile, the second insulating film 15 is omitted in an array substrate 80b shown by FIGS. 56A and 56B.

Similar to the array substrate 80a of FIGS. 52A and 52B, the wire 31 formed on the array substrate 80b of FIGS. 56A and 56B may have various shapes as shown in FIGS. 53A through 55B. Also, multiple wires 31 with different shapes may be formed on the array substrate 80b.

Figure 57A:
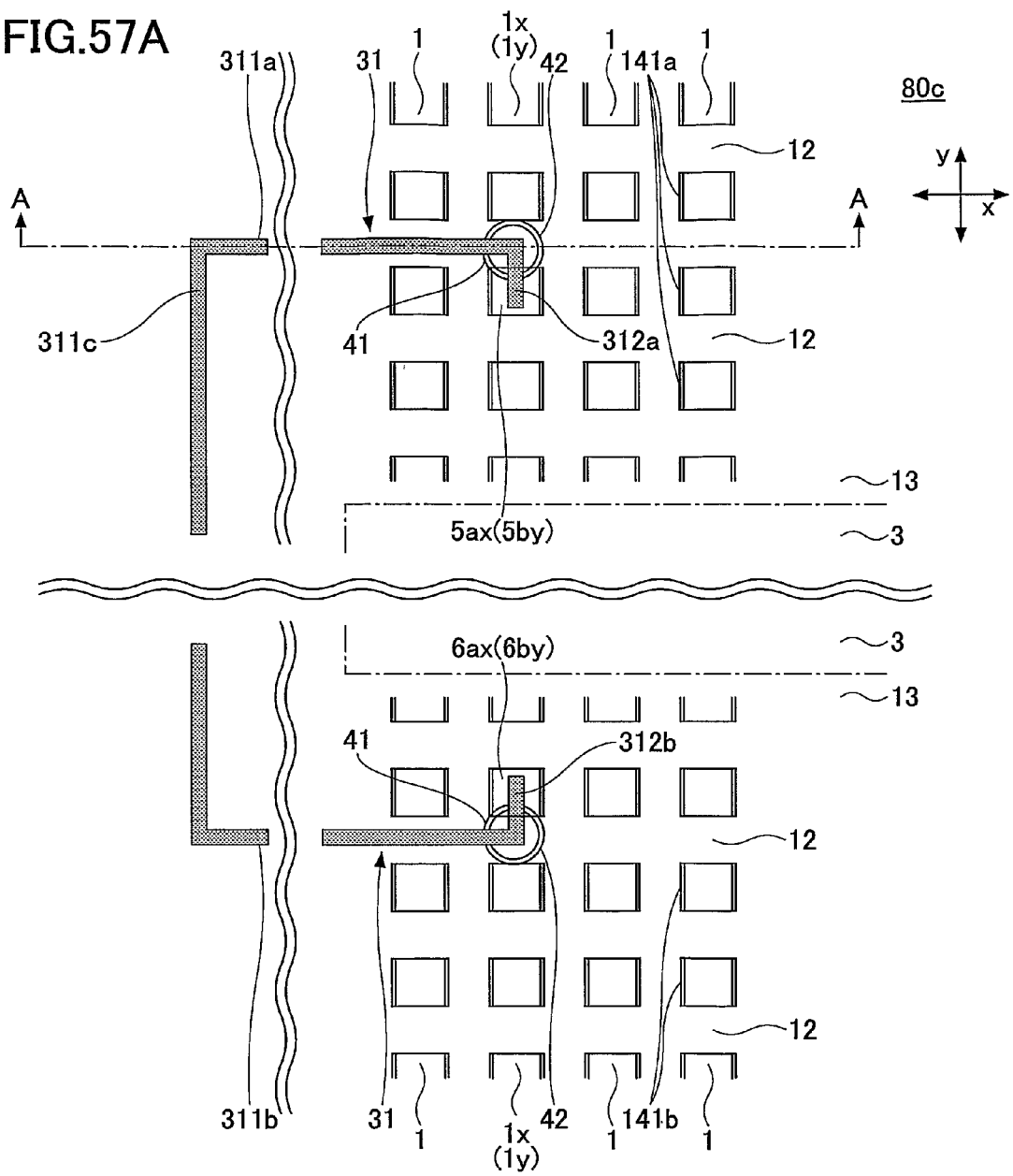
FIGS. 57A and 57B are drawings illustrating an array substrate according to the variation of the second embodiment where a part of a first insulating film is omitted.
Figure 57B:
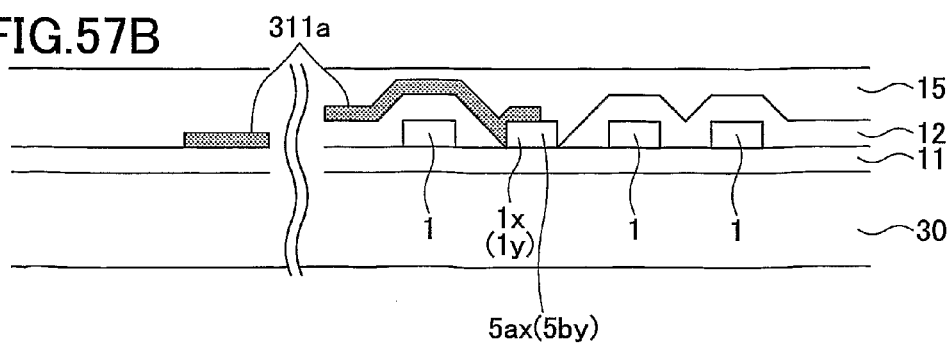

FIGS. 57A and 57B are drawings illustrating an array substrate where a part of the first insulating film is omitted. The array substrate 80a described above with reference to FIGS. 52A and 52B includes the second insulating film 12 formed on substantially the entire surface of the substrate 30. Meanwhile, a part of the first insulating film 12 is omitted in an array substrate 80c shown by FIGS. 57A and 57B.

Similar to the array substrate 80a of FIGS. 52A and 52B, the wire 31 formed on the array substrate 80c of FIGS. 57A and 57B may have various shapes as shown in FIGS. 53A through 55B. Also, multiple wires 31 with different shapes may be formed on the array substrate 80c.

Figure 58A:
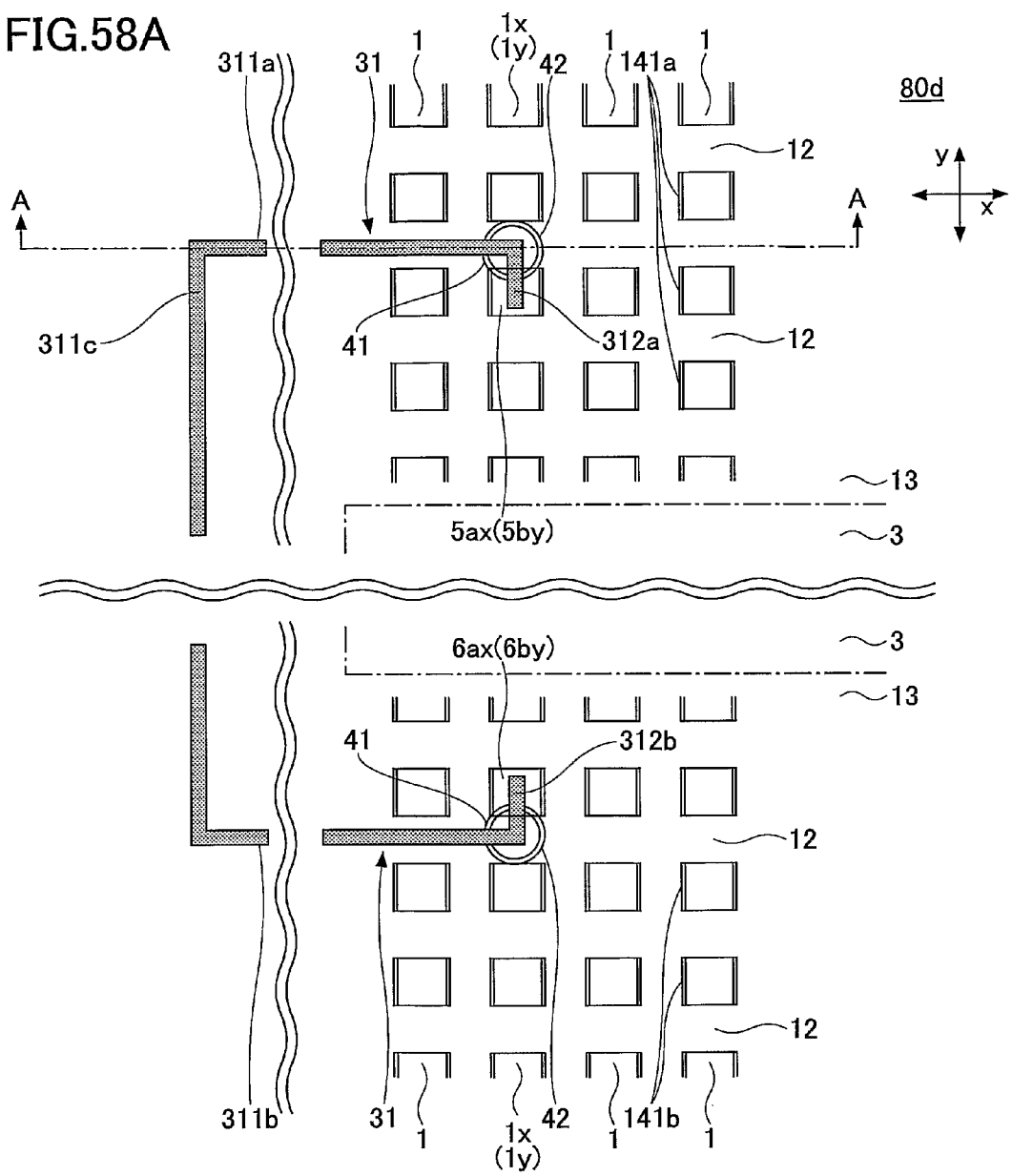
FIGS. 58A and 58B are drawings illustrating an array substrate according to the variation of the second embodiment where a part of a first insulating film and a second insulating film are omitted.
Figure 58B:
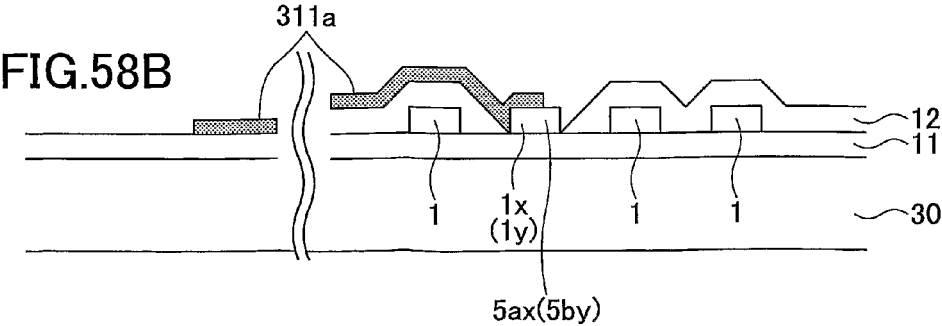

FIGS. 58A and 58B are drawings illustrating an array substrate where the second insulating film and a part of the first insulating film are omitted. The array substrate 80c shown by FIGS. 57A and 57B includes the second insulating film 15 formed on the substrate 30. Meanwhile, the second insulating film 15 is also omitted in an array substrate 80d shown by FIGS. 58A and 58B.

Similar to the array substrate 80a of FIGS. 52A and 52B, the wire 31 formed on the array substrate 80d of FIGS. 58A and 58B may have various shapes as shown in FIGS. 53A through 55B. Also, multiple wires 31 with different shapes may be formed on the array substrate 80d.

FIGS. 59A and 59B are drawings illustrating an array substrate where the nonconductive film is omitted. The array substrate 80a described above with reference to FIGS. 52A and 52B includes the nonconductive film 11 formed on the substrate 30. Meanwhile, the nonconductive film 11 is omitted in an array substrate 80e shown by FIGS. 59A and 59B.

Similar to the array substrate 80a of FIGS. 52A and 52B, the wire 31 formed on the array substrate 80e of FIGS. 59A and 59B may have various shapes as shown in FIGS. 53A through 55B. Also, multiple wires 31 with different shapes may be formed on the array substrate 80e.

FIGS. 60A and 60B are drawings illustrating an array substrate where the nonconductive film and the second insulating film are omitted. The array substrate 80e shown by FIGS. 59A and 59B includes the second insulating film 15 formed on the substrate 30. Meanwhile, the second insulating film 15 is also omitted in an array substrate 80f shown by FIGS. 60A and 60B.

Similar to the array substrate 80a of FIGS. 52A and 52B, the wire 31 formed on the array substrate 80f of FIGS. 60A and 60B may have various shapes as shown in FIGS. 53A through 55B. Also, multiple wires 31 with different shapes may be formed on the array substrate 80f.

Figure 61A:
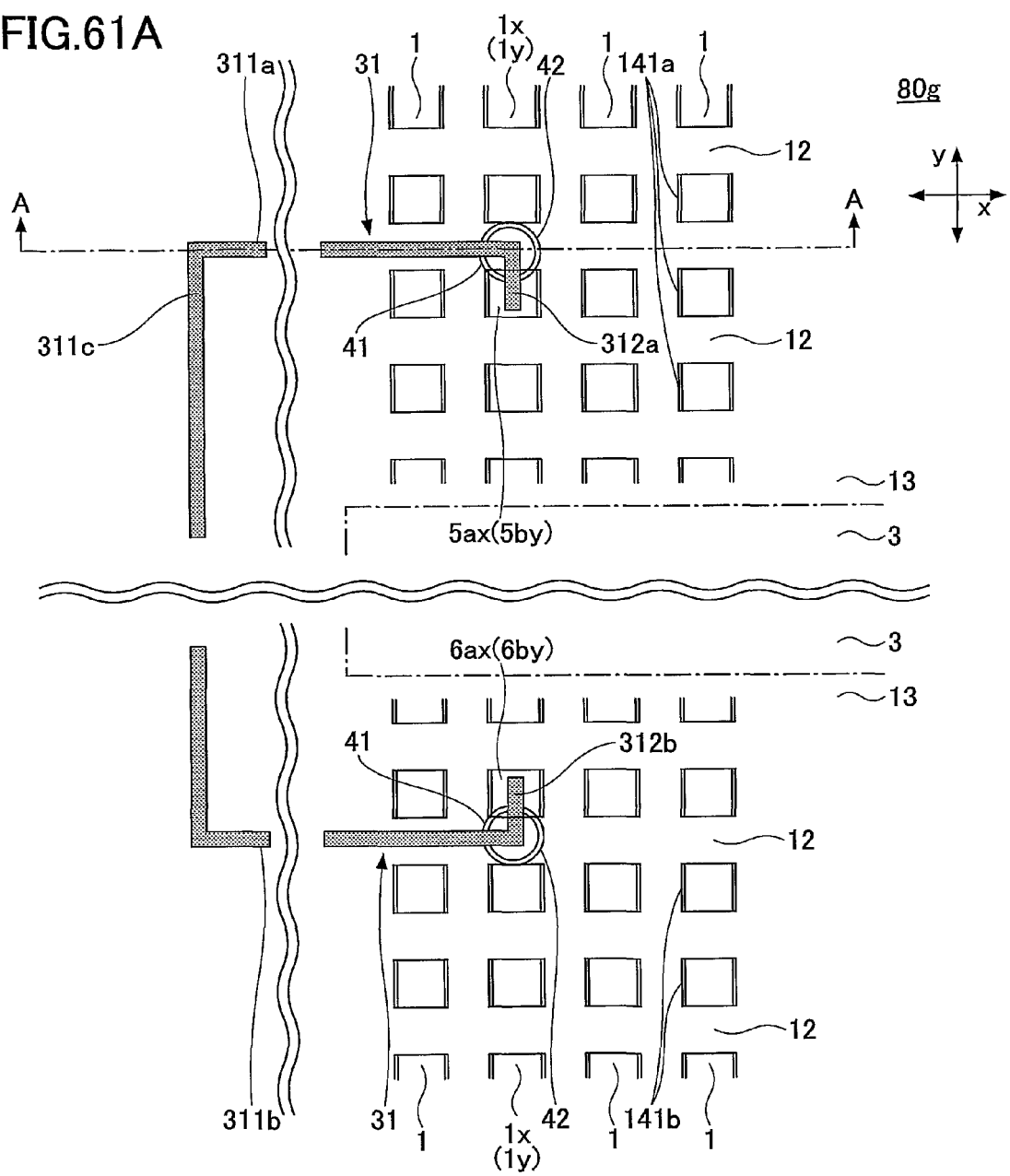
FIGS. 61A and 61B are drawings illustrating an array substrate according to the variation of the second embodiment where a nonconductive film and a part of a first insulating film are omitted.
Figure 61B:
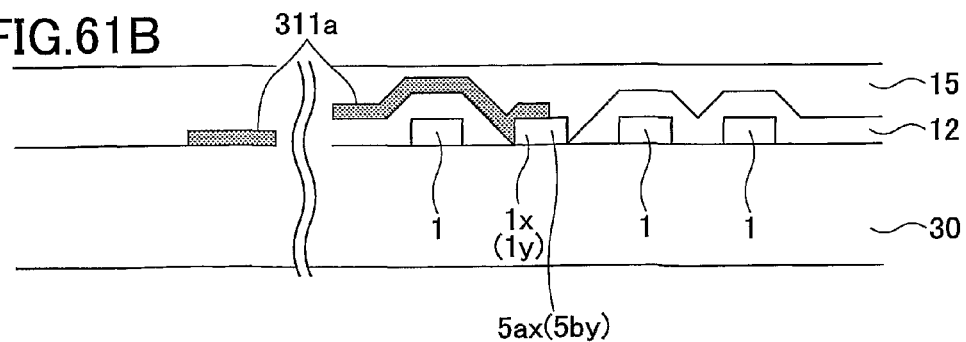

FIGS. 61A and 61B are drawings illustrating an array substrate where the nonconductive film and a part of the first insulating film are omitted. The array substrate 80a described above with reference to FIGS. 52A and 52B includes the nonconductive film 11 and the second insulating film 12 formed on substantially the entire surface of the substrate 30. Meanwhile, the nonconductive film 11 and a part of the first insulating film 12 are omitted in an array substrate 80g shown by FIGS. 61A and 61B.

Similar to the array substrate 80a of FIGS. 52A and 52B, the wire 31 formed on the array substrate 80g of FIGS. 61A and 61B may have various shapes as shown in FIGS. 53A through 55B. Also, multiple wires 31 with different shapes may be formed on the array substrate 80g.

Figure 62A:
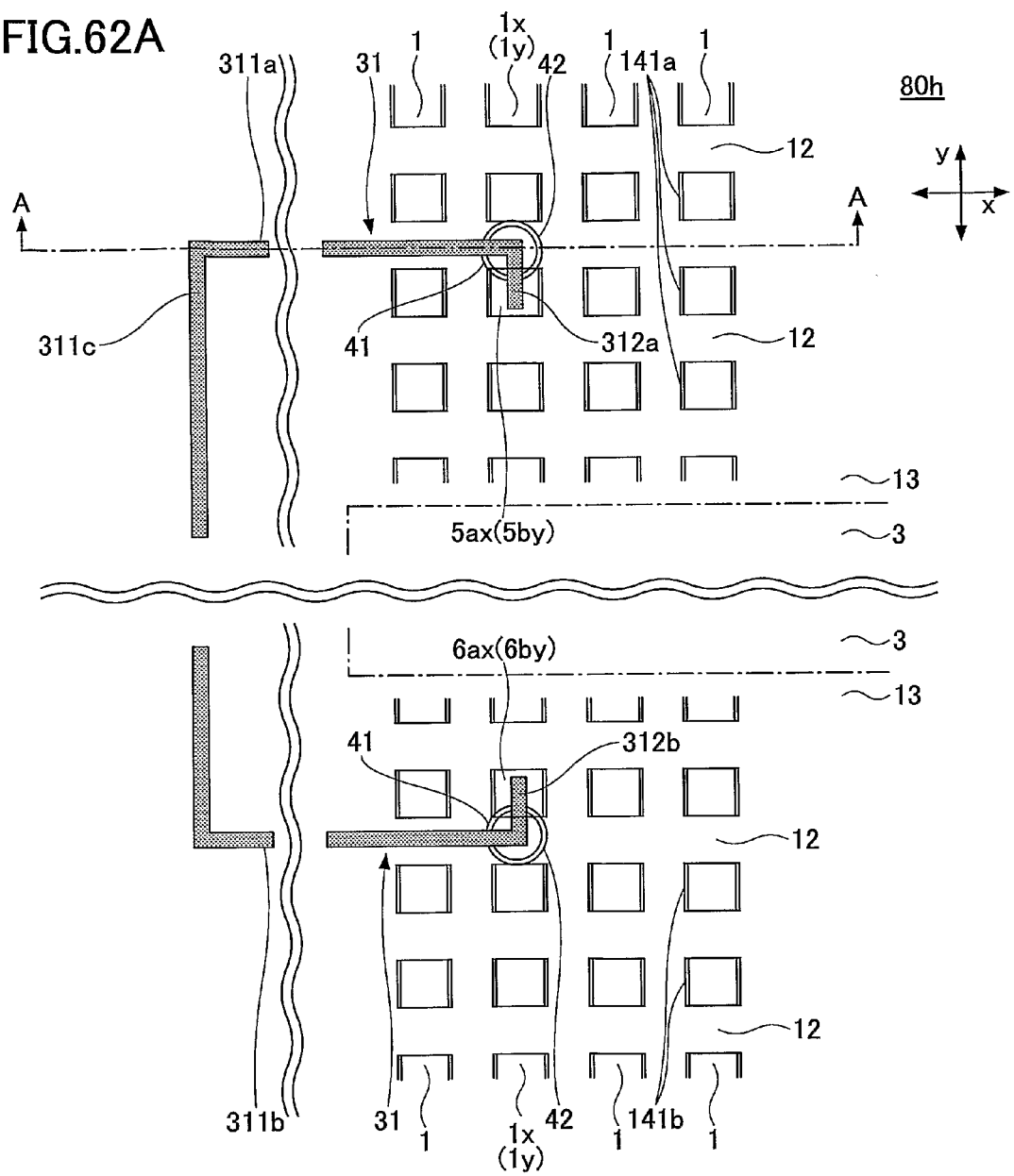
FIGS. 62A and 62B are drawings illustrating an array substrate according to the variation of the second embodiment where a nonconductive film, a part of a first insulating film, and a second insulating film are omitted.
Figure 62B:
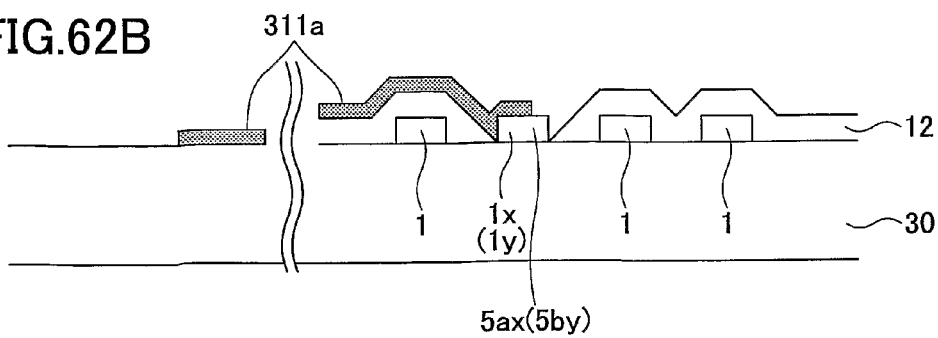

FIGS. 62A and 62B are drawings illustrating an array substrate where the nonconductive film, a part of the first insulating film, and the second insulating film are omitted. The array substrate 80g shown by FIGS. 61A and 61B includes the second insulating film 15 formed on the substrate 30. Meanwhile, the second insulating film 15 is also omitted in an array substrate 80h shown by FIGS. 62A and 62B.

Similar to the array substrate 80a of FIGS. 52A and 52B, the wire 31 formed on the array substrate 80h of FIGS. 62A and 62B may have various shapes as shown in FIGS. 53A through 55B. Also, multiple wires 31 with different shapes may be formed on the array substrate 80h.

The angle between the extending part 311a (or 311b) and the bent part 312a (or 312b) of the wire 31 can be defined by an angle 41 or an angle 42. The angle 41 is less than 180 degrees and the angle 42 is obtained by subtracting the angle 41 from 360 degrees. As in the first embodiment, the angle 41 is preferably between 5 and 175 degrees, and more preferably between 45 and 135 degrees.

A display device repairing method of this variation is substantially the same as that of the second embodiment.

Materials and methods used to form the wire in the line connecting step are substantially the same as those of the first embodiment.

Thus, the above variation of the second embodiment also provides a display device including an array substrate with a configuration that makes it possible to repair broken lines as well as to reduce cross capacitance and leakage.

The switching elements 51 of the array substrate 80 may be implemented by amorphous silicon thin-film transistors (a-Si TFT), polysilicon thin-film transistors (p-Si TFT), or organic thin-film transistors (O-TFT). Other types of switching elements similar to the above thin-film transistors may also be used. The display device of this variation may be implemented, for example, as a liquid crystal display, an organic EL display, or a plasma display panel (PDP).

The present invention is not limited to the specifically disclosed embodiments, and variations and modifications may be made without departing from the scope of the present invention.

As described above, liquid crystal display elements, organic EL display elements, or plasma display elements may be used for display elements of a display device according to an embodiment (or its variation) of the present invention. In other words, a display device according to an embodiment (or its variation) of the present invention may be implemented, for example, as a liquid crystal display, an organic EL display, or a plasma display panel (PDP) used for a mobile terminal, a television, a personal computer, or so on. Organic transistors may be used for switching elements of a display device according to an embodiment (or its variation) of the present invention. Since organic transistors are flexible and thin, a display device of an embodiment (or its variation) of the present invention including organic transistors may be used for a mobile terminal, a large-screen television, a personal computer, electronic paper, and so on.

The present application is based on Japanese Priority Application No. 2009-044706, filed on Feb. 26, 2009, the entire contents of which are hereby incorporated herein by reference.

The invention claimed is:

1. A display device, comprising:
   a substrate;
   a matrix of scan lines and signal lines formed on the substrate;
   switching elements formed in pixel areas defined by the scan lines and the signal lines crossing each other, the pixel areas being located in a display area;
   a first insulating film formed over the scan lines, the signal lines, and the switching elements;
   display elements to be driven by the switching elements; and
   backup lines formed in an outer area outside of the display area, for the scan lines or the signal lines,
   wherein the first insulating film has openings above the scan lines or the signal lines and the backup lines in the outer area, and
   wherein the openings are shaped like lines extending in a direction orthogonal to the scan lines or the signal lines and the backup lines in the outer area.

2. The display device as claimed in claim 1, further comprising:
   a second insulating film formed to cover the openings and the first insulating film having the openings.

* * * * *